United States Patent
Yang et al.

(10) Patent No.: US 9,619,667 B2
(45) Date of Patent: Apr. 11, 2017

(54) METHODS, SYSTEMS AND COMPUTER PROGRAM PRODUCT FOR PROVIDING ENCRYPTION ON A PLURALITY OF DEVICES

(71) Applicant: BicDroid Inc, Petersburg (CA)

(72) Inventors: En-Hui Yang, Petersburg (CA); Xiang Yu, Kitchener (CA); Jin Meng, Waterloo (CA)

(73) Assignee: BICDROID INC., Petersburg, Ontario (CA)

( * ) Notice: Subject to any disclaimer, the term of this patent is extended or adjusted under 35 U.S.C. 154(b) by 59 days.

(21) Appl. No.: 14/737,940

(22) Filed: Jun. 12, 2015

(65) Prior Publication Data
US 2015/0363607 A1    Dec. 17, 2015

Related U.S. Application Data

(60) Provisional application No. 62/011,837, filed on Jun. 13, 2014.

(51) Int. Cl.
*G06F 21/62* (2013.01)
*H04L 9/08* (2006.01)
(Continued)

(52) U.S. Cl.
CPC .......... *G06F 21/6218* (2013.01); *G06F 21/41* (2013.01); *G06F 21/602* (2013.01); *H04L 9/0869* (2013.01); *H04L 9/0894* (2013.01); *H04L 9/0897* (2013.01); *H04L 63/062* (2013.01); *H04L 63/08* (2013.01); *H04L 63/0892* (2013.01)

(58) Field of Classification Search
CPC . G06F 21/6218; G06F 21/602; H04L 63/062; H04L 63/0892
See application file for complete search history.

(56) References Cited

U.S. PATENT DOCUMENTS 5,297,207 A    3/1994 Degele
5,455,862 A *  10/1995 Hoskinson ............ H04L 9/0844
                                              380/244

(Continued)

FOREIGN PATENT DOCUMENTS

EP    2571192    3/2013

OTHER PUBLICATIONS

Chowdhury et al., Stochastic Seed Based Cryptographic Technique [SSCT] Using Dual Formula Key [DFK], Dec. 2011, International Conference on Communication and Industrial Application, pp. 1-5.*

(Continued)

*Primary Examiner* — Kenneth Chang
(74) *Attorney, Agent, or Firm* — Bereskin & Parr LLP/S.E.N.C.R.L., s.r.l.; Ian C. McMillan

(57) ABSTRACT

The described embodiments relate to methods, systems, and products for providing data protection and encryption on a plurality of devices configured for electronic communication with a server. Specifically, the methods, systems, and products can automatically and securely synchronize a user's file encryption/decryption keys across a plurality of devices, authenticating the user on each device before receiving and processing information from the server necessary to recreate the user's file encryption/decryption keys.

33 Claims, 15 Drawing Sheets

(51) Int. Cl.
*H04L 29/06* (2006.01)
*G06F 21/41* (2013.01)
*G06F 21/60* (2013.01)

(56) References Cited

U.S. PATENT DOCUMENTS

| | | | |
|---|---|---|---|
| 8,588,410 B2 | 11/2013 | McCullough et al. | |
| 2002/0131592 A1* | 9/2002 | Hinnant | H04L 9/0662 380/46 |
| 2003/0210787 A1* | 11/2003 | Billhartz | H04L 63/0435 380/270 |
| 2004/0019619 A1* | 1/2004 | Buer | H04L 9/0869 708/254 |
| 2004/0059913 A1* | 3/2004 | de Jong | G06F 21/10 713/165 |
| 2005/0223216 A1 | 10/2005 | Chan et al. | |
| 2006/0177061 A1* | 8/2006 | Orsini | G06F 21/606 380/268 |
| 2007/0067833 A1* | 3/2007 | Colnot | H04L 9/3271 726/9 |
| 2008/0175377 A1* | 7/2008 | Merrill | G06F 21/36 380/30 |
| 2009/0288148 A1 | 11/2009 | Headley et al. | |
| 2010/0254533 A1* | 10/2010 | McCullough | H04L 9/12 380/44 |
| 2011/0154041 A1 | 6/2011 | Godfrey et al. | |
| 2011/0307699 A1* | 12/2011 | Fielder | H04L 63/123 713/172 |
| 2013/0080765 A1 | 3/2013 | Mohanty et al. | |
| 2013/0124855 A1* | 5/2013 | Varadarajan | G06Q 20/3276 713/155 |
| 2013/0227651 A1 | 8/2013 | Schultz et al. | |
| 2014/0040622 A1 | 2/2014 | Kendall et al. | |
| 2015/0178515 A1 | 6/2015 | Cooley et al. | |

OTHER PUBLICATIONS

International Search Report and Written Opinion from the corresponding application No. PCT/CA2015/050543 dated Sep. 15, 2015.

International Search Report and Written Opinion from the corresponding Application No. PCT/CA2016/050663 dated Jul. 26, 2016.

Non-Final Office Action of U.S. Appl. No. 14/738,013 dated Sep. 1, 2016.

* cited by examiner

METHODS, SYSTEMS AND COMPUTER PROGRAM PRODUCT FOR PROVIDING ENCRYPTION ON A PLURALITY OF DEVICES

RELATED APPLICATIONS

This application claims priority from the U.S. patent application No. 62/011,837, filed Jun. 13, 2014 entitled "QUARANTINED SECURITY SYSTEMS FOR DATA PROTECTION AND SYNCHRONIZATION AND SHARING OF ENCRYPTED FILES", the disclosure of which is incorporated herein, in its entirety, by reference.

FIELD

Embodiments of the present invention relate generally to data protection and encryption, and more specifically to methods for encrypted file synchronization and encrypted file sharing.

BACKGROUND

As people become more reliant on computing and Internet technologies, data security is becoming more important than ever. With Internet connections becoming ubiquitous, it is relatively easy to access and distribute data widely through the use of clouds. To enjoy the benefits of cloud computing, people and companies often upload their data to cloud servers. This often includes private or confidential data, or any data a user might want to protect. This increases the chance for private and important data to become unnecessarily exposed if it is left unprotected.

Typically, people rely on cloud service providers to ensure the security of their data. However, cloud storage may have a number of associated security vulnerabilities. In its 2013 report ("The notorious nine: Cloud computing top threats in 2013," http://www.cloudsecurityalliance.org/topthreats), the Cloud Security Alliance identified nine top security threats to cloud computing including data breaches, data loss, malicious insiders, and shared technology issues. Such data security issues are undesirable, and may slow the uptake of cloud services.

One way to mitigate data security issues is by way of encryption. For example, stand-alone tools such as Winzip and secure PDF may be used to encrypt files before those files are saved and stored, uploaded, and/or transmitted. Without the corresponding decryption key, the encrypted file may not be meaningful.

However, using stand-alone tools such as Winzip and secure PDF to encrypt multiple files in a folder has several drawbacks. For example, a user may be required to input a password to encrypt every file, and to input a corresponding password to decrypt the encrypted file for viewing and/or modification. When the number of files increases, this approach becomes tedious and is not user-friendly. As well, the user may easily become confused about which password decrypts which file if different passwords are used to encrypt different files. Furthermore, the encryption strength in these examples depends on how strong the passwords chosen by the user are. Because of the difficulty users experience in coming up with and memorizing strong random passwords, they tend to choose weaker passwords, and the resulting encryption can often be weak. As a result, files encrypted using stand-alone tools may still be vulnerable to sophisticated attacks. Furthermore, if passwords are forgotten or lost, it may be difficult or impossible to recover the original plaintext files from the encrypted files. This effectively results in a permanent loss of data. Finally, when files are encrypted using stand-alone tools, sharing files encrypted among a group of people can be tedious and often requires the use of side channels to exchange passwords.

SUMMARY

In accordance with a first embodiment described herein, there is provided a method of providing encryption on a plurality of devices configured for electronic communication with a server, the plurality of devices including at least a first device and a second device. The method can include generating a first account for a first user in control of the plurality of devices, where the first account stores account data on a non-volatile server memory, and the account data includes a first user identifier and account authentication information. The method can also include, for each device in the plurality of devices, installing an encryption agent on that device, and operating a processor of the first device under the control of the encryption agent to randomly generate a plurality of key indicators to: generate a plurality of encrypted key indicators from the plurality of key indicators using a second device encryption key, each encrypted key indicator corresponding to one of the key indicators in the plurality of key indicators; to transmit the plurality of encrypted key indicators to the server to impede exposure of the key indicators to the server; to generate a plurality of key seeds based on the plurality of key indicators, where for each key seed, the encryption agent may be operable to control the processor of the first device to generate a plurality of independent encryption keys; and to store key seed information based on the plurality of key seeds in the non-volatile first device memory. The method can further include generating a key status string for the first account, the key status string including a server key indicator portion generated based on the plurality of encrypted key indicators; storing the key status string on the non-volatile server memory; receiving putative authentication information at the second device; operating a processor of the second device, under the control of the encryption agent installed on the second device, to generate putative server authentication information based on the putative authentication information and transmit the putative server authentication information to the server; and operating the processor of the server to compare the putative server authentication information with the account authentication information, and to provide the second device with access to the key status string if and only if the putative server authentication information corresponds to the account authentication information. The method can also include operating the processor of the second device under the control of the encryption agent to determine the plurality of key indicators from the plurality of encrypted key indicators in the key status string using the second device decryption key; to generate the plurality of key seeds based on the plurality of key indicators, where for each key seed, the encryption agent may be operable to control the processor of the second device to generate the same plurality of independent encryption keys as the first device, without any of the key seeds, key seed information and encryption keys being provided to the second device; and to store the key seed information based on the plurality of key seeds in the non-volatile second device memory.

In some embodiments, the method may include generating the plurality of key seeds by further operating the server processor to randomly generate server key values for the first account, to store the server key values in the non-volatile server memory, and to transmit the server key values to the first device; and operating the processor of the first device under the control of the encryption agent to generate the plurality of key seeds based on the server key values and the plurality of key indicators; where the processor of the server may be operated to provide the second device with access to the server key values if and only if the putative server authentication information corresponds to the account authentication information; and the processor of the second device may be operated, under the control of the encryption agent, to generate the plurality of key seeds based on the plurality of key indicators and the server key values.

In some embodiments, the method may include operating the processor of the first device, under the control of the encryption agent, to generate the plurality of encrypted key indicators by: defining a first verification code; defining the second device encryption key based on the first verification code; and encrypting the plurality of key indicators using the second device encryption key; where the second device decryption key may be generated by operating the processor of the second device under the control of the encryption agent to define a second verification code and generate the second device decryption key based on the second verification code; and the second verification code may be the first verification code.

In some embodiments, the method may include operating a processor of the first device under the control of the encryption agent to generate an encrypted server code based on the first verification code and transmit the encrypted server code to the server, and storing the encrypted server code in the authentication information of the first account, where the putative authentication information received at the second device may be a putative verification code, the putative server authentication information may be a putative encrypted server code generated based on the putative verification code, and the putative server authentication information corresponds to the account authentication information if and only if the putative encrypted server code matches the encrypted server code.

In some embodiments, the method may further include providing a file to be encrypted and stored to the first device, operating the processor of the first device under the control of the encryption agent to derive one of the encryption keys from the key seed information using keying information, encrypting and storing the file as an encrypted file in the non-volatile first device memory using the derived encryption key, and storing the keying information with the encrypted file in the non-volatile first device memory, where the key seed information may be encrypted using the first verification code prior to storage.

In some embodiments, the method may further include receiving the encrypted file and the keying information at the second device, and operating the processor of the second device under the control of the encryption agent to derive the encryption key from the key seed information stored in the non-volatile second device memory using the received keying information and decrypt the encrypted file using the derived encryption key.

In some embodiments, the method may further include randomly selecting keying information when the encryption agent receives an indication of the file to be encrypted.

In some embodiments, the method may further include operating the processor of the first device under the control of the encryption agent to define a first verification code, generate an encrypted local code based on the first verification code, and store the encrypted local code in the non-volatile first device memory. The method may further include subsequently receiving a request to access files and a local putative verification code at the first device, and operating the processor of the first device under the control of the encryption agent to generate a putative encrypted local code, to compare the putative encrypted local code to the encrypted local code to determine if the local putative verification code is the first verification code, and to provide access to files encrypted by the encryption agent if and only if the putative encrypted local code matches the encrypted local code.

In some embodiments, the method may include storing the key seed information by encrypting the plurality of key seeds using the first verification code, and storing the encrypted plurality of key seeds in the non-volatile first device memory.

In some embodiments of the method, the first user may include a plurality of group users, which may include at least an administrative group user and a second group user. In some embodiments of the method, each of the group users may be in control of at least one of the devices in the plurality of devices, where the administrative group user may be in control of the first device and the second group user may be in control of the second device. In some embodiments of the method, for each group user in the plurality of group users, the account data may further comprise a user-specific public key, where the user-specific public key for each user may be generated based on a user-specific private key stored in a non-volatile memory of a corresponding device in the plurality of devices. In some embodiments of the method, for each group user in the plurality of group users, the processor of the first device may be operated under the control of the encryption agent to generate the plurality of encrypted key indicators by generating a plurality of user-specific encrypted key indicators using the user-specific public key for that user. In some embodiments of the method, the server key indicator portion of the key status string for the first account may further include, for each group user in the plurality of group users, a user-specific string portion that may be generated based on the plurality of user-specific encrypted key indicators for that group user. In some embodiments of the method, the processor of the second device may be operated under the control of the encryption agent to determine the plurality of key indicators from the plurality of user-specific encrypted key indicators in the user-specific portion of the server key indicator portion corresponding to the second group user using the second device private key.

In some embodiments of the method, the account authentication information for the first account may include, for each group user in the plurality of group users, a user-specific server encrypted code. In some embodiments of the method, the user-specific server encrypted code for each user being generated by operating a processor of a device in the plurality of devices corresponding to that user, under the control of the encryption agent to: define a user-specific verification code, generate the user-specific server encrypted code based on the user-specific verification code and transmit the user-specific server encrypted code to the server; and storing the user-specific server encrypted code in the account authentication information of the first account.

In some embodiments of the method, the first user may include a plurality of users, which may in turn include an administrative user in control of the first device and a second user in control of the second device. In some embodiments, the method may further include transmitting a second user authorization to the second user by transmitting a second user identifier of the second user from the first device to the server and operating the processor of the server: to generate second user registration information based on the second user identifier and a second user password, to store the second user registration information on the non-volatile server memory, and to transmit a second user server authorization to the second user. In some embodiments, the method may further include: receiving, by the second user, the second user server authorization, and subsequently installing an encryption agent on the second device; receiving a putative second user password at the second device; operating the processor of the second device under the control of the encryption agent to generate putative second user registration information based on the second user identifier and putative second user password and transmit the putative second user registration information to the server; operating the processor of the server to compare the putative second user registration information with the stored second user registration information, and authenticate the second device for the first account only if the putative second user registration information corresponds to the stored second user registration information; operating the processor of the authenticated second device under the control of the encryption agent to generate the second device decryption key, generate the second device encryption key based on the second device decryption key, and transmit the second device encryption key to the server; receiving the second device encryption key at the first device; and operating the processor of the first device under the control of the encryption agent to generate the plurality of encrypted key indicators from the plurality of key indicators using the received second device encryption key.

In some embodiments of the method, the second device decryption key may be a user-specific private key of the second user. In some embodiments of the method, the user-specific private key may be stored in the non-volatile memory of the second device. In some embodiments of the method, the second device encryption key may be a corresponding user-specific public key generated based on the user-specific private key.

In some embodiments of the method, the first user may include a plurality of users including an administrative user in control of the first device and a second user in control of the second device. In some embodiments of the method, the method further include: providing a file to be encrypted to the first device; operating the processor of the first device under the control of the encryption agent to derive one of the encryption keys from the key seed information using keying information, and encrypt the file as an encrypted file using the derived encryption key; and transmitting the encrypted file, the keying information, and a second user authorization to the second user. In some embodiments, the method may further include: receiving, by the second user, the second user authorization and subsequently installing an encryption agent on the second device; receiving the encrypted file and the keying information at the second device; operating the processor of the second device under the control of the encryption agent to derive the encryption key from the key seed information stored in the non-volatile second device memory using the received keying information and decrypt the encrypted file using the derived encryption key.

In some embodiments of the method, the first user may be a single user in control of the plurality of devices, and the first user identifier may include a plurality of user alias identifiers. In some embodiments of the method, each user alias identifier may share the same account authentication information.

In some embodiments of the method, the first user may include a plurality of users, each user being in control of at least one of the devices in the plurality of devices and having a user-specific identifier, and for at least one of the users in the plurality of users, the user-specific identifier for that user may include a plurality of user-specific alias identifiers, with each user-specific alias identifier sharing the account authentication information for that user.

In accordance with a further example embodiment described herein, there is provided a computer program product for use on a plurality of devices to provide encryption for the plurality of devices, the plurality of devices being configured for electronic communication with a server and including at least a first device having a first device processor and a non-volatile first device memory and a second device, the server having stored thereon a first account for a first user in control of the plurality of devices, the first account storing account data including a first user identifier and account authentication information on a non-volatile server memory, and the computer program product including a non-transitory recording medium and instructions recorded on the recording medium, with the instructions for configuring the first device processor to: randomly generate a plurality of key indicators; generate a plurality of encrypted key indicators from the plurality of key indicators using a second device encryption key, each encrypted key indicator corresponding to one of the key indicators in the plurality of key indicators, the second device encryption key corresponding to a second device decryption key unknown to the server; transmit the plurality of encrypted key indicators to the server to impede exposure of the key indicators to the server, the server being operable to generate a key status string for the first account including a server key indicator portion based on the plurality of encrypted key indicators and to provide the second device with access to the key status string if and only if putative server authentication information received from the second device corresponds to the account authentication information; generate a plurality of key seeds based on the plurality of key indicators, where for each key seed, the first device processor may be operable to generate a plurality of independent encryption keys; and store key seed information based on the plurality of key seeds in the non-volatile first device memory. In some embodiments of the computer program product, the plurality of key indicators may be determinable at the second device from the plurality of encrypted key indicators in the key status string using the second device decryption key such that the same plurality of key seeds can be generated based on the plurality of key indicators, and for each key seed, a processor of the second device may be able to generate the same plurality of independent encryption keys as the first device, without any of the key seeds, key seed information and encryption keys being provided to the second device.

In some embodiments, the computer program product may further include instructions for configuring the first device processor to generate the plurality of key seeds by receiving a plurality of randomly generated server key values from the server, the server key values being stored in the first account, and generating the plurality of key seeds based on the server key values and the plurality of key indicators.

In some embodiments, the computer program product may further include instructions for configuring the first device processor to define a first verification code, define the second device encryption key based on the first verification code, and encrypt the plurality of key indicators using the second device encryption key, where the second device decryption key may also be generated based on the first verification code.

In some embodiments, the computer program product may further include instructions for configuring the first device processor to generate an encrypted server code based on the first verification code and transmit the encrypted server code to the server for storage in the account authentication information of the first account, where the server may be configured to provide access to the key status string if and only if the putative server authentication information received from the second device corresponds to the encrypted server code stored in the account authentication information of the first account.

In some embodiments, the computer program product may further include instructions for configuring the first device processor to receive a file to be encrypted, derive one of the encryption keys from the key seed information using keying information, encrypt and store the file as an encrypted file in the non-volatile first device memory using the derived encryption key, store the keying information with the encrypted file in the non-volatile first device memory, and encrypt the key seed information using the first verification code prior to storage.

In some embodiments, the computer program product may further include instructions for configuring the first device processor to receive an encrypted file and keying information, derive the encryption key from the key seed information stored in the non-volatile first device memory using the received keying information; and decrypt the encrypted file using the derived encryption key.

In some embodiments, the computer program product may further include instructions for configuring the first device processor to randomly select the keying information after receiving an indication of the file to be encrypted.

In some embodiments, the computer program product may further include instructions for configuring the first device processor to define a first verification code, generate an encrypted local code based on the first verification code, store the encrypted local code in the non-volatile first device memory, subsequently receive a request to access files and a local putative verification code, generate a putative encrypted local code, compare the putative encrypted local code to the encrypted local code to determine if the local putative verification code is the first verification code, and provide access to files encrypted by the encryption agent if and only if the putative encrypted local code matches the encrypted local code.

In some embodiments, the computer program product may further include instructions for configuring the first device processor to store the key seed information by encrypting the plurality of key seeds using the first verification code, and storing the encrypted plurality of key seeds in the non-volatile first device memory.

In some embodiments of the computer program product, the first user may include a plurality of group users including at least an administrative group user and a second group user, each of the group users being in control of at least one of the devices in the plurality of devices, where the administrative group user may be in control of the first device and the second group user may be in control of the second device. In some embodiments of the computer program product, for each group user in the plurality of group users, the account data may further include a user-specific public key, where the user-specific public key for each user is generated based on a user-specific private key stored in a non-volatile memory of a corresponding device in the plurality of devices. In some embodiments, the computer program product may further include instructions for configuring the first device processor to generate the plurality of encrypted key indicators by, for each group user in the plurality of group users, generating a plurality of user-specific encrypted key indicators using the user-specific public key for that user. In some embodiments, the computer program product may further include instructions to transmit the plurality of user-specific encrypted key indicators to the server. In some embodiments of the computer program product, the server may be operable to generate the server key indicator portion of the key status string by generating, for each group user in the plurality of group users, a user-specific string portion based on the plurality of user-specific encrypted key indicators for that group user. In some embodiments of the computer program product, the plurality of key indicators may be determinable at the second device from the plurality of user-specific encrypted key indicators in the user-specific portion of the server key indicator portion corresponding to the second group user using the second device private key.

In some embodiments of the computer program product, the account authentication information for the first account may include, for each group user in the plurality of group users, a user-specific server encrypted code. In some embodiments, the computer program product may further include instructions for configuring a processor of a device in the plurality of devices corresponding to that group user to define a user-specific verification code, generate the user-specific server encrypted code based on the user-specific verification code, and transmit the user-specific server encrypted code to the server for storage in the account authentication information of the first account.

In some embodiments of the computer program product, the first user may include a plurality of users including an administrative user in control of the first device and a second user in control of the second device. In some embodiments, the computer program product may further include instructions for configuring the first device processor to transmit a second user authorization to the second user by transmitting a second user identifier of the second user from the first device to the server, the server being operable to generate second user registration information based on the second user identifier and a second user password, store the second user registration information on the non-volatile server memory, and transmit a second user server authorization to the second user. In some embodiments, the computer program product may further include instructions for configuring a processor of the second device, when installed thereon, to: receive a putative second user password; generate putative second user registration information based on the second user identifier and the putative second user password; transmit the putative second user registration information to the server, the server being operable to compare the putative second user registration information with the stored second user registration information, and authenticate the second device for the first account only if the putative second user registration information corresponds to the stored second user registration information; and once the second device is authenticated; generate the second device decryption key; generate the second device encryption key based on the second device decryption key; and transmit the second device encryption key to the server. In some embodiments, the computer program product may further include instructions for configuring the first device processor to receive the second device encryption key and generate the plurality of encrypted key indicators from the plurality of key indicators using the received second device encryption key.

In some embodiments of the computer program product, the second device decryption key may be the user-specific private key of the second user and the second device encryption key may be the corresponding public key of the second user.

In some embodiments of the computer program product, the first user may include a plurality of users, which in turn may include an administrative user in control of the first device and a second user in control of the second device. In some embodiments, the computer program product may further include instructions for configuring the first device processor to receive a file to be encrypted, derive one of the encryption keys from the key seed information using keying information, encrypt the file as an encrypted file using the derived encryption key, and transmit the encrypted file, the keying information, and a second user authorization to the second user. In some embodiments, the computer program product further include instructions for configuring a processor of the second device, when installed thereon, to: register the second device with the server based on the second user authorization; determine the plurality of key indicators based on the plurality of encrypted key indicators in the key status string using the second device decryption key; generate the plurality of key seeds based on the plurality of key indicators; store key seed information based on the key seeds in a non-volatile second device memory; receive the encrypted file and the keying information; derive the encryption key from the key seed information stored in the non-volatile second device memory using the received keying information; and decrypt the encrypted file using the derived encryption key.

In some embodiments of the computer program product, the first user may be a single user in control of the plurality of devices, and the first user identifier may include a plurality of user alias identifiers, with each user alias identifier sharing the account authentication information.

In some embodiments of the computer program product, the first user may include a plurality of users, with each user being in control of at least one of the devices in the plurality of devices and having a user-specific identifier, and for at least one of the users in the plurality of users, the user-specific identifier for that user may include a plurality of user-specific alias identifiers, with each user-specific alias identifier sharing the account authentication information of that user.

In accordance with another example embodiment described herein, there is disclosed a device for providing encryption for a plurality of devices including the device. In some embodiments of the device, each device within the plurality of devices including the device may be configured for electronic communication with a server. In some embodiments of the device, the server may have stored on it a first account for a first user in control of the plurality of devices. In some embodiments of the device, the first account may store account data including a first user identifier and account authentication information on a non-volatile server memory. In some embodiments, the device may include a processor and a non-volatile device memory having stored on it instructions for configuring the processor to: randomly generate a plurality of key indicators; generate a plurality of encrypted key indicators from the plurality of key indicators using a second device encryption key, each encrypted key indicator corresponding to one of the key indicators in the plurality of key indicators, the second device encryption key corresponding to a second device decryption key unknown to the server; transmit the plurality of encrypted key indicators to the server to impede exposure of the key indicators to the server, the server being operable to generate a key status string for the first account including a server key indicator portion based on the plurality of encrypted key indicators and to provide a second device in the plurality of devices with access to the key status string if and only if putative server authentication information received from that device corresponds to the account authentication information; generate a plurality of key seeds based on the plurality of key indicators, where for each key seed, the processor may be operable to generate a plurality of independent encryption keys; and store key seed information based on the plurality of key seeds in the non-volatile device memory. In some embodiments of the device, the plurality of key indicators may be determinable at the second device from the plurality of encrypted key indicators in the key status string using the second device decryption key such that the same plurality of key seeds can be generated based on the plurality of key indicators, and for each key seed, a processor of the second device can generate the same plurality of independent encryption keys as the device, without any of the key seeds, key seed information and encryption keys being provided to the second device.

BRIEF DESCRIPTION OF DRAWINGS

For a better understanding of the described embodiments and to show more clearly how they may be carried into effect, reference will now be made, by way of example, to the accompanying drawings in which.

DETAILED DESCRIPTION

Figure 1:
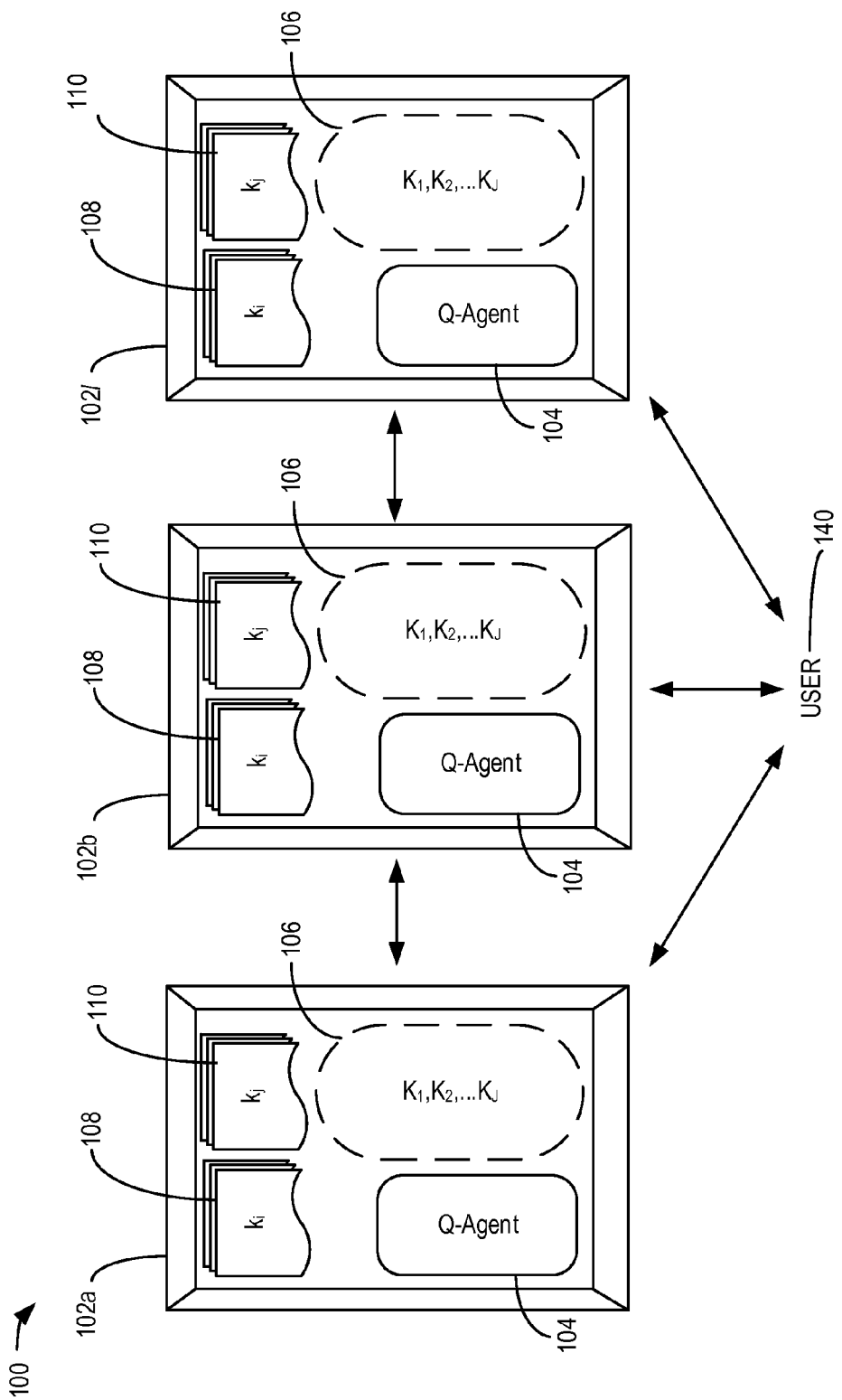
FIG. 1 shows a block diagram of a system that can be used to provide encryption on a plurality of devices in accordance with an embodiment.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the drawings and the description is not to be considered as limiting the scope of the embodiments described herein.

It should also be noted that, as used herein, the wording "and/or" is intended to represent an inclusive- or. That is, "X and/or Y" is intended to mean X or Y or both, for example. As a further example, "X, Y, and/or Z" is intended to mean X or Y or Z or any combination thereof.

Described herein are various embodiments of systems, methods, computer program products, and devices for providing data protection for a plurality of devices. The various embodiments described herein may enable encrypted file synchronization and sharing between multiple devices controlled by a single user, and/or between one or more devices controlled by multiple different users. Various embodiments described herein may also provide systems, methods, and computer program products for recovering a verification code defined by a user. Various embodiments may also provide systems, methods, and computer program products for remotely authenticating a user. In general, features of the various embodiments described herein can be used in any combination with one another except where otherwise noted.

Some embodiments described herein provide a security system that enables automatic encryption and decryption of data files of a user on devices of the user. Some embodiments described herein may store file encryption and decryption (FED) keys on the devices of the user. In some cases, the FED keys may not be stored on the devices. Rather key seeds can be stored on the device. These key seeds may enable the FED keys to be derived using keying information. In some cases, the FED keys can be generated randomly to increase the resulting encryption strength.

The FED keys or key seeds can be stored in non-volatile device memory in encrypted format and protected by a verification code defined by the user. In some embodiments, the verification code may be known only to the user. Local authentication information can be generated based on the verification code and stored on a user's device. The authentication information can be used to authenticate a user attempting to access or modify encrypted files. In some cases, the verification code may not be determinable from any of the stored authentication information.

Files managed by the example systems described herein may remain encrypted at all times when stored in non-volatile memory—whether on devices of the user or other devices, such as a cloud server. The embodiments described herein may also ensure that the plaintext files corresponding to the stored encrypted files can be seen and/or modified only inside installed encryption agents. The plaintext files may be accessible only after being decrypted upon request from the user and are only temporarily stored in the volatile memory of devices of the user while being accessed.

A first example system may be referred to as a Quarantined Security System with Manual Synchronization of FED Key seeds (QSSMS). FIG. 1 shows an example of a system 100 that can be used to implement the QSSMS system.

System 100 may include a plurality of devices 102a-102l controlled by a first user 140. Applications referred to as Q-Agents or encryption agents 104 can be installed on each of the devices 102 controlled by the user 140. One Q-Agent 104 may be installed in each device 102. The Q-Agent 104 installed on each device 102 may be responsible for the encryption and decryption operations on that device 102. The Q-Agent 104 may also generate encryption/decryption keys and protect the keys once generated. The Q-Agents 104 can generate FED key seeds 106 which can be stored on each device 102. The FED key seeds 106 can be used by the Q-Agent 104 to generate one or more encryption/decryption keys. In some cases, the Q-Agent 104 may generate a large set of FED keys, i.e., the FED keystore, from the FED key seeds 106.

In some cases, the first user 140 may wish to move encrypted files 108/110 from the first device 102a to one or more of the other devices 102b-102l. The first user 140 may transmit one or more encrypted files 108/110 from the first device 102a to a second device 102b in various ways such as using cloud services, telecommunications networks or other file transfer mechanisms such as a USB or Firewire key. Once the files have been received at the second device 102b, it may be necessary to decrypt the files on the second device 102b. To allow files 108/110 encrypted by the Q-Agent 104 on the first device 102a to be decrypted by the Q-Agent 104 on the second device 102b, the FED key seeds 106 used by the Q-Agents 104 on the first device 102a and second device 102b may be synchronized. In system 100, the FED key seeds 106 can be synchronized manually. However, it may be desirable to enable the FED key seeds 106 to be automatically synchronized. This could allow the FED key seeds 106 to be synchronized between a user's remotely located devices 102. This may also allow different users to synchronize FED key seeds 106 without having to share the key seeds directly. As well, this may simplify the process for synchronizing FED key seeds for a plurality of devices controlled by one or more users.

Figure 2:
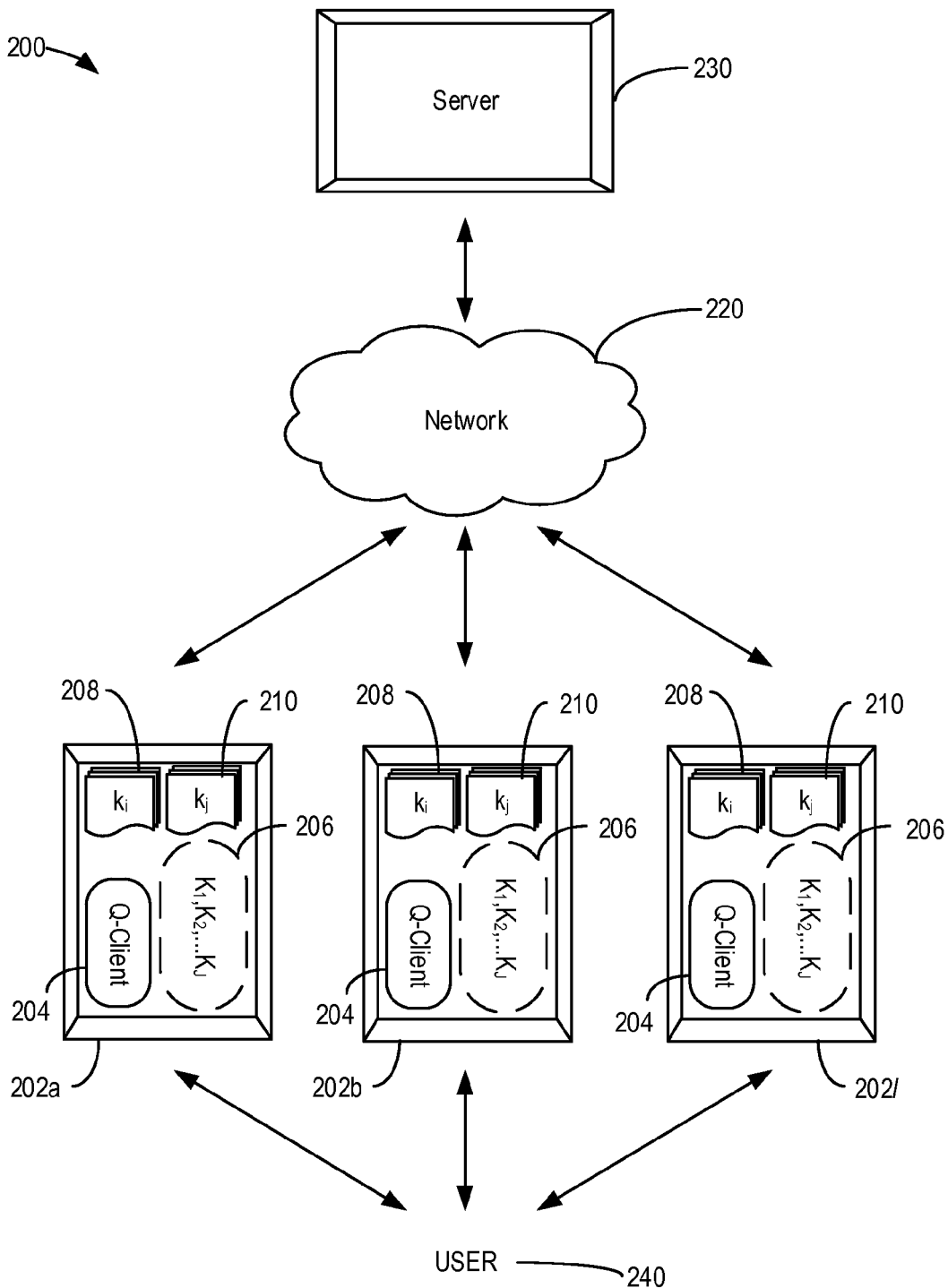
FIG. 2 shows a block diagram of another system that can be used to provide encryption on a plurality of devices in accordance with an embodiment.

FIG. 2 shows a system 200 that may be used to implement an example embodiment of a system for providing encryption on a plurality of devices. System 200 is an example embodiment of a system that may be referred to as a Quarantined Security System with Automatic Synchronization of FED Key seeds (QSSAS). System 200 may be used to automatically sync FED key seeds 206 between a plurality of devices 202 associated with the first user 240. System 200 includes a server 230 (which may be referred to as a Q-Server or a security server) and the plurality of devices 202a-202l. Each device 202 may have installed thereon a client 204 which may be referred to as a Q-Client or an encryption agent. The encryption agent 204 on a device 202 is similar to Q-Agent 104 in that it is responsible for the encryption and decryption operations on that device 202. The server 230 may communicate with the devices 202 via network 220.

The encryption agents 204 can be used to generate FED key seeds 206. The FED key seeds 206 can then be used to derive FED keys. In some cases, the FED key seeds 206 may be generated involving communication between a particular encryption agent 204 and Q-Server 230. In some cases, there may be no direct communication between and among the encryption agents 204 on different devices 202. Thus, the Q-Server 230 can be used to automatically synchronize the encryption and decryption keys used on the devices 202.

The system 200 may implement concepts related to one-way functions and public key cryptosystems to provide automatic and secure synchronization of the keys. In some embodiments, the Q-Server 230 may not have access to any of the files 208/210 stored on devices 202. The Q-Server 230 may also not be exposed to any of the FED key seeds 206 and/or FED keys either.

In some cases, the system 200 can also be extended to allow sharing of encrypted files among a group of users. The first user may be a super-user for the group and may include a plurality of group users, the plurality of group users including at least an administrative user and a second group user. An example of such as system will be described below with reference to FIG. 7. In general, the level of security that can be achieved in embodiments of the automatic synchronization security systems (QSSAS) is comparable to that of QSSMS.

Features of the systems and methods of the described embodiments, such as systems 100 and 200 may be implemented on one or more server computers, desktop computers, notebook computers, tablets, PDAs, smartphones, or other programmable computers. The programmable computers may include a connection with a network such as network 220. Network 220 may be a wired or wireless connection to the Internet. In some cases, the network 220 may include other types of computer or telecommunication networks.

In some embodiments, each of the programmable computers may include an input device for entering information into the device. For example, the input device may be a keyboard, key pad, cursor-control device, touch-screen, camera, scanner or microphone. In some embodiments, input information may be received through the communication interface from other programmable computers over a network. In some embodiments, the computing devices may include a display device for presenting visual information. For example, display device may be a computer monitor, a flat-screen display, a projector or a display panel. In some embodiments, the display device displays one or more files to the user that have been encrypted by an encryption agent in accordance with systems and methods described herein.

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as devices, computing devices or servers) may be a personal computer, laptop, personal data assistant, cellular telephone, smartphone device, tablet computer, and/or wireless device. For any software components, program code is applied to input data to perform the functions described herein and generate output information. The output information is applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Example embodiments of the QSSMS system employing manual synchronization of FED key seeds will be described first. Various example embodiments of the QSSAS system with automatic synchronization of FED key seeds will also be described. As well, embodiments of the QSSAS system will be described that support sharing of encrypted files among a group of users. Further embodiments of systems for providing recovery of a verification code defined by a user will also be described.

QSSMS

In this section, example embodiments of the QSSMS system are described with reference to FIG. 1. For background, the concept of a one-way function is discussed.

Definition 1 A function $f(x)$ is a one-way function if it is easy to compute $f(x)$ for every x in the domain of $f$, but for almost all y in the range of $f$, it is computationally infeasible to find a x such that $f(x)=y$. (W. Diffie and M. Hellman, "*New directions in cryptography,*" *IEEE Transactions on Information Theory*, vol. 22, no. 6, pp. 644-654, November 1976.)

In general, system 100 may be used by a first user 140 in control of a plurality of devices 102. For example, the plurality of devices 102 may include L devices 102a-102l. The first user 140 may want to use the devices 102 to manage and store certain types of encrypted files 108/110. For each device 102 in the plurality of devices, the first user 140 can install an encryption agent or Q-Agent 104 on that device 102. For example, the first user 140 may download a Q-Agent 104 and install the Q-Agent 104 on the first device 102. In some examples, the first user 140 may then initialize the Q-Agent 104 before using the Q-Agent 104 to encrypt and decrypt files.

The first user 140 may use the Q-Agent 104 to define a verification code. For example, the first user 140 may define a verification code C. In some cases, the verification code C, or values generated based on the verification code C, can be used by the Q-Agent 104 to verify the first user 140. For example, such verification could take place when the first user 140 wants to open the Q-Agent 104 to access files 108/110 managed by the Q-Agent 104 on the first device 102a. In general, if a Q-Agent 104 has been successfully installed and initialized on another device 102l, the first user 140 should be able to use the same verification code as the one defined for device 102l to verify with the Q-Agent 104 installed at the first device 102a.

After the first user 140 defines the first verification code, for example at the first device 102a, the encryption agent 104 may generate an encrypted local code based on the first verification code. The encryption agent 104 can then store the encrypted local code in the non-volatile memory of the first device 102a. For example, the encryption agent 104 may generate the encrypted local code by computing $\beta = \phi(C)$, where $\phi(\cdot)$ is an invertible one way function. The encryption agent 104 can then save $\beta$ in the non-volatile memory of the first device 102a.

The encryption agent 104 can then determine a plurality of key seeds for the first device 102a. In some cases, the plurality of key seeds may be imported from another device 102. For example where the first user 140 has previously generated key seeds on another device 102, the first user 140 may import the same key seeds to the first device 102a. If the first user 140 has not yet generated key seeds on any other devices 102, then the encryption agent 104 of the first device 102a can generate the key seeds.

The encryption agent 104 on the first device 102a can generate a plurality of key seeds. For example, the Q-Agent 104 may randomly generate a plurality of independent FED key seeds $K_1, K_2, \ldots, K_J$. The encryption agent 104 can then store key seed information based on the plurality of key seeds in the non-volatile memory of the first device 102a. For example, the key seed information may be generated by encrypting the key seeds, and then storing the encrypted key seeds as the key seed information. In some cases, the verification code C can be used to encrypt the key seeds $K_1, K_2, \ldots, K_J$ into encrypted key seeds $E_C(K_1, K_2, \ldots, K_J)$. These encrypted key seeds $E_C(K_1, K_2, \ldots, K_J)$ can then be saved on the non-volatile memory of the first device 102a.

If another device 102l has a Q-Agent 104 installed thereon and has key seeds generated and stored on that device 102l, the first user 140 may import the key seeds from the device 102l. In system 100, the first user 104 can access the Q-Agent 104 on the device 102l to get a copy of the encrypted FED key seeds $E_C(K_1, K_2, \ldots, K_J)$ generated by that Q-Agent 104. The first user 140 can then transfer the copied key seeds to the Q-Agent 104 on the first device 102a. The encryption agent 104 can then import the key seeds and store them in the non-volatile memory of the first device 102a.

Once the key seeds have been generated on the first device 102a, the Q-Agent 104 on that device can generate one or more FED keys. In some cases, the Q-Agent 104 may generate a plurality of encryption/decryption keys, i.e., the FED keystore on the first device 102a. In general the plurality of encryption/decryption keys generated by an encryption agent may be symmetrical encryption/decryption keys. The plurality of encryption keys can then be stored on the non-volatile memory of the first device 102a. In some cases, the plurality of encryption keys may be encrypted (e.g. using the verification code) prior to being stored on the non-volatile memory of the first device 102a.

For example, the Q-Agent 104 may derive a plurality of encryption keys (i.e. FED keystore $\Psi$) $\Psi = \{k_i: 1 \leq i \leq \Lambda\}$ from the random key seeds $K_1, K_2, \ldots, K_J$, where A is a large number. When the Q-Agent 104 receives a file for encryption, the file can be encrypted using one of the derived encryption keys from the FED keystore $\Psi$. Similarly, when a file is moved to the encryption agent 104, or modified under the control of the encryption agent 104, the encryption agent 104 can encrypt and store the new or modified file using the derived encryption key. For example, the Q-Agent 104 may select an encryption key from the keystore to use to encrypt the file. In some cases, the encryption agent 104 may randomly select the particular encryption key from the plurality of encryption keys when the encryption agent 104 receives an indication of the file to be encrypted (e.g. an indication that a file is being moved to the encryption agent 104, created in the encryption agent 104 for storage, or modified in the encryption agent 104). The Q-Agent 104 can then store the encrypted file along with keying information, which indicates how to derive the particular encryption key for that file from the key seeds $K_1, K_2, \ldots, K_J$ or from the FED keystore W.

For example, the Q-Agent 104 may generate a key index for the plurality of derived encryption keys. The key index may define a key index value for each encryption key in the plurality of encryption keys or FED keystore. When a particular encryption key is selected from the plurality of encryption keys and used to encrypt a file, the keying information for that file may include the key index value for that particular encryption key.

In some cases, the Q-Agent 104 may not derive all of the encryption keys from the key seeds to generate a keystore in advance. The Q-Agent 104 may derive the encryption keys from the key seeds only as needed, i.e. when receiving an indication of a file to be encrypted. In such cases, the encryption agent 104 may also store keying information along with the encrypted file that indicates how to derive the encryption key from the key seed information stored on the non-volatile memory of the first device. As well, the Q-Agent 104 may erase the derived encryption key from the first device 102a after the file is encrypted.

The Q-Agent 104, installed for example on the first device 102a, may ensure that the files 108/110 managed under its control remain encrypted for the duration that such files are stored in the non-volatile memory of that device. When the first user 140 wants to access these files 108/110, the encryption agent can authenticate the user prior to providing access to the files 108/110.

The encryption agent 104 on the first device 102a may receive a request to access files 108/110 and a putative local verification code. For example, on receiving a request to access files 108/110, the Q-Agent 104 may ask the first user 140 to input the verification code C. The first user 140 may then input the putative local verification code.

The encryption agent 104 may generate a putative encrypted local code based on the putative local verification code. The encryption agent 104 can then compare the putative encrypted local code to the encrypted local code to determine if the local putative verification code is the first verification code. The encryption agent 104 may then provide access to encrypted files managed by the encryption agent 104 if and only if the putative local code matches the encrypted local code.

For example, the encryption agent may apply the same one-way function $\phi(\cdot)$ to the putative local verification code to generate the putative encrypted local code. The output of the one-way function $\phi(\cdot)$ can then be compared with the value of the encrypted local code $\beta$ saved by the Q-Agent 104 to determine if the verification code entered is the correct verification code. Once the first user 140 has been authenticated, then the files may be decrypted and accessed by the first user 140.

The Q-Agent 104 can decrypt the files 108/110 selected by the first user 140 and store the decrypted plaintext files temporarily in the volatile memory of the first device 102a for the first user 140 to read and/or edit. After the first user 140a closes each plaintext file, the Q-Agent 104 can erase the plaintext file from the volatile memory of the first device 102a if there is no change. The encryption agent 104 may encrypt the plaintext file again using a particular FED key (e.g. a new randomly picked FED key from the keystore Ψ, the same key, or a newly derived encryption key), and store the encrypted file in the non-volatile memory of the first device 102a.

In some embodiments, the Q-Agent 104 may temporarily store decrypted files in the non-volatile memory of the first device 102a. This may be desirable for example where the decrypted file is larger than the available volatile memory on the first device 102a. In such cases, the Q-Agent 104 may erase the decrypted file from the non-volatile memory of the first device 102a once the first user 140a closes that file, or ceases to access the Q-Agent 104.

The encryption agent 104 may overwrite the original encrypted file in the non-volatile memory of the first device 102a with the newly encrypted file, and then wipe out the plaintext file from the volatile memory of first device 102a if, on ceasing to access the plaintext file, the first user 140 has made any change to the plaintext file. Once again, the encryption agent 104 may store keying information along with the encrypted file to enable the encryption key for that file to be derived from the key seed information or from the FED keystore.

In order for files encrypted by the Q-Agent 104 on first device 102a to be decrypted by the Q-Agent 104 on the second device 102b (or any other device 102) of the first user 140 after files are moved from the first device 102a to the second device 102b, the set of FED key seeds $\{K_1, K_2, \ldots, K_J\}$, in some example operations, can be synced across the L devices 102 of the first user 140. As mentioned above, in system 100 the FED key seeds may need to be manually synced between the L devices 102.

In some cases, the FED keystore Ψ may be generated from the random key seeds $K_1, K_2, \ldots, K_J$ using any means such that for any two independent i and j, $1 \le i,j \le \Lambda$, the probability that a first encryption key is equal to a second encryption key $Pr\{k_i = k_j\}$ is not significantly larger than $1/\Lambda$. For example, the means used to generate the FED keystore from the random key seeds may essentially be collision-free. In some embodiments this may be referred to as property (1) of the FED keystore Ψ.

In some cases, the FED keystore Ψ may be generated from the random seeds $K_1, K_2, \ldots, K_J$ such that for any $1 \le i \le \Lambda$, the FED key $k_i$ is more or less uniformly distributed and hence statistically independent of i. In such cases, disclosing information i may not reveal any essential information about $k_i$. In some embodiments this may be referred to as property (2) of the FED keystore Ψ.

In some cases, the FED keystore Ψ may be generated from the random seeds $K_1, K_2, \ldots, K_J$ such that for any two independent i and j, $1 \le i,j \le \Lambda$, knowing i, j, and a single FED key $k_i$ does not reduce the amount of uncertainty about another FED key $k_j$ significantly, i.e., the conditional Shannon entropy $H(k_j|i,j,k_i)$ is close to $H(k_j|j)$. In such cases, knowing one FED key $k_i$ does not provide any essential information about another FED key $k_j$. In some embodiments this may be referred to as property (3) of the FED keystore Ψ.

A large Λ may provide increased entropy regarding the keys generated. However, storing all the keys generated with a large value of Λ may require a significant amount of storage space. This may not be desirable when the systems described herein are mobile devices or other devices with storage capacity constraints. In some cases, the FED keystore Ψ may be generated from the random seeds $K_1, K_2, \ldots, K_J$ such that for any $1 \le i \le \Lambda$, it is easy to compute $k_i$ from the seeds $K_1, K_2, \ldots, K_J$ and the index i. In such cases, as mentioned above, there is no need to actually store Ψ on the devices 102 of the first user 140. This may be desirable particularly when Λ is large. In some embodiments this may be referred to as property (4) of the FED keystore Ψ.

In some cases, the encryption agent 104 may store key seeds, where each key seed has a first bit length. The encryption agent 104 may derive one or more encryption keys from the stored key seeds, where each of the derived encryption keys has a second bit length. In some embodiments, the second bit length can be shorter than the first bit length. For example, the key seeds may have a first bit length of 4096 bits, and the encryption keys may each have a second bit length of 256 bits.

An example process for generating one or more encryption keys from a key seed will now be described. In the example, the randomly selected key seed $K_1$ is used. $K_1$ has a first bit length of 4096 bits, and each FED key $k_i$ has a second bit length of 256 bits. We can write the key seed $K_1$ as a plurality of key seed bits $K_1 = K_1(0)K_1(1)\ldots K_1(4095)$. A plurality of encryption key derivation values m can be determined for each encryption key, with each encryption key corresponding to a unique plurality of derivation values m. For each encryption key, the plurality of encryption key derivation values m corresponding to that encryption key indicates how to derive that encryption key from the key seed K.

In some embodiments, for any $0 \le m_1 < m_2 < \ldots < m_5 \le 4095$, we can define:

$$k(m_1, m_2, \ldots, m_5) = \sum_{i=1}^{5} K_1(m_i) K_1(m_i + 1) \ldots K_1(m_i + 255)$$

where the string summation is the binary addition and the integer addition is with respect to module 4096. One way to generate a keystore Ψ including a plurality of encryption keys from the random seed $K_1$ is as follows:

Ψ={HMAC($k(m_1,m_2,\ldots,m_5)$,
   $m_1\|m_2\|m_3\|m_4\|m_5\|$OtherInput): $0 \le m_1 <$
   $m_2 < \ldots < m_5 \le 4095$} where HMAC stands for the keyed-hash message authentication code with, here, for example, the SHA-256 hash as its embedded hash function (see for example, National Institute of Standards and Technology, The Keyed-Hash Message Authentication Code (HMAC). Federal Information Processing Standards Publication 198-1, July 2008), ∥ denotes concatenation, and OtherInput represents other keying materials which, along with $m_1, m_2, \ldots, m_5$, can be appended to encrypted data. In the above example, to generate any individual encryption key from the key seed $K_1$ the values of $m_1, m_2, \ldots, m_5$ can be specified.

Note that in this example, $\Lambda \ge 2^{53}$. It can be further shown that in this case, Properties (1) to (4) mentioned above are satisfied. Specifically, the following hold:

a) Given any $0 \le m_1 < m_2 < \ldots < m_5 \le 4095$, $k(m_1, m_2, \ldots, m_5)$ is uniformly distributed over $\{0,1\}^{256}$.

b) For any $(m_1, m_2, \ldots, m_5) \neq (\hat{m}_1, \hat{m}_2, \ldots, \hat{m}_5)$ with $0 \leq m_1 < m_2 < \ldots < m_5 \leq 4095$ and $0 \leq \hat{m}_1 < \hat{m}_2 < \ldots < \hat{m}_5 \leq 4095$, $\Pr\{k(m_1, m_2, \ldots, m_5) = k(\hat{m}_1, \hat{m}_2, \ldots, \hat{m}_5)\} = 2^{-256}$ c) For any two independent $(m_1, m_2, \ldots, m_5)$ and $(\hat{m}_1, \hat{m}_2, \ldots, \hat{m}_5)$ with $0 \leq m_1 < m_2 < \ldots < m_5 \leq 4095$ and $0 \leq \hat{m}_1 < \hat{m}_2 < \ldots < \hat{m}_5 < 4095$, one has:

$H(k(\hat{m}_1, \hat{m}_2, \ldots, \hat{m}_5)|m_1, m_2, \ldots, m_5, \hat{m}_1, \hat{m}_2, \ldots, \hat{m}_5, k(m_1, m_2, \ldots, m_5)) \geq 0.6 \times 256$ Results (a) to (c), together with the properties of HMAC, in turn imply Properties (1) to (4) above.

In some cases, the systems described herein may not require the verification code C to be recoverable. In such cases, the one-way function used to generate the encrypted local code from the verification code need not be invertible. If the recovery of C is not required when C is lost or forgotten, the one-way function $\phi$ may not be invertible. In such cases, any cryptographic hash function $\phi$ could be used to generate the encrypted local code from the verification code C. In some cases, however, it may be desirable that C is recoverable when lost or forgotten. The invertibility of the one-way function $\phi$ can make it possible to securely recover C when C is lost or forgotten. Systems and methods for enabling recovery of the verification code C will be described in further detail below.

Assume that there is no exposure of $E_C(K_1, K_2, \ldots, K_J)$ when it is manually synced across those L devices by first user 240. We now analyze the security of the example QSSMS embodiments described above. There are two aspects to consider: (1) security risks arising from possible exposure of data such as the encrypted local code $\beta$ and the key seed information (e.g. encrypted key seeds $E_C(K_1, K_2, \ldots, K_J)$) saved locally by each Q-Agent 104 (storage security risks); and (2) security risks arising from possible exposure of encrypted files 108/110 (encryption security risks).

The data stored on a device 102, such as $\beta$ and $E_C(K_1, K_2, \ldots, K_J)$ may be exposed if one or more devices 102 with Q-Agents 104 installed thereon are lost or attacked. However, the exposure of encrypted files 108/110 may occur more often since such files may be easily transmitted to other devices, uploaded to a cloud server and/or transmitted over the Internet. If we assume that all symmetric key cryptographic algorithms used have equal cryptographic strength, then because the encrypted local code is generated using a one-way function $\phi$ and the key seeds $K_1, K_2, \ldots, K_J$ are generated randomly, the storage security risks of QSSMS are not higher than those of any other password protected systems.

For encryption security risks, again under the assumption that all symmetric key cryptographic algorithms used have equal cryptographic strength, encryption security may then depend on how strong the FED keys are. In embodiments of the QSSMS system with FED keys $k_i$ that are random and uniformly distributed, file encryption strength of QSSMS is not weaker than that of any other symmetric key systems. Thus, if there is no fault on the part of the first user 140—i.e. no device 102 with Q-Agent 104 inside is lost and the verification code C is strong and not forgotten—then the embodiments described above of QSSMS are as secure as any other system using symmetric keys.

However, some embodiments of QSSMS described above may be limited to manual synchronization. The set of random key seeds $\{K_1, K_2, \ldots, K_J\}$ may have to be manually synced across those L devices by first user 240, as mentioned. This may cause inconvenience to first user 240, but also may prevent sharing of encrypted files among a group of different users. To overcome this problem, it may be desirable to automatically synchronize key seeds between devices. Embodiments of the QSSAS system described below can automatically and securely sync the set of random seeds $\{K_1, K_2, \ldots, K_J\}$ across Q-Agents on devices of first user 240 and across Q-Agents on devices of a group of users, as the case may be.

QSSAS

FIG. 2 illustrates one example configuration of a QSSAS system 200. The system 200 may be considered an extension or modification of system 100, and the general operations described above with reference to system 100 may also be applied in system 200. In the description that follows, system 200 will generally be described with reference to embodiments in which the first user 240 is a single user in control of each of the devices 202. However, in some embodiments, the first user 240 may include a plurality of group users, with each group user in control of one of the devices 202.

The system 200 includes a plurality of devices 202 configured for electronic communication with a server 230 which may be referred to as a Q-Server 230. The plurality of devices 202 includes a first device 202a and a second device 202b. Each device has installed thereon an encryption agent 204, which may be referred to as Q-Agents or encryption agents. In some embodiments, once a encryption agent 204 is installed on a device 202 and successfully registered with Q-Server 230, it can work either online or offline. In general, the encryption agents 204 can perform the same operations as the encryption agents 104. The devices 202 may communicate with the server 230 using a network 220.

In some cases, when the encryption agent 204 is running on a device 202 and there is network connection between the device 202 and Q-Server 230, the encryption agent 204 may periodically communicate with Q-Server 230. For example, the encryption agent 204 may communicate with Q-Server 230 to check the status of the system 200 and/or request or initiate certain actions. In some cases, there may be no direct communication between and among encryption agents 204 on different devices 202 of the first user 240. In some embodiments, the system 200 enables encryption agents 204 on different devices 202 to work autonomously while the set of FED keys (e.g. the random key seeds and/or the FED keystore) used by the devices 202 can be automatically and securely synced. Embodiments of system 200 described herein may incorporate concepts such as one-way function and public key cryptosystems to enable the secure synchronization.

It should be noted that in some embodiments, the encryption agents 204 in FIG. 2 may be installed and registered with Q-Server 230 several days, months or years apart. For example, the first user 240 may buy a new device 202 and install an encryption agent 204 on the new device 202. Then the encryption agent 204 on the new device 202 may be configured to automatically and securely synchronize the FED key seeds and/or FED keys for the new device with the set of FED keys used by one or more encryption agents 204 installed on other devices controlled by the first user 240 and previously registered with the server 230.

The operations of various embodiments of the system 200 will now be described in two parts. The first part describes system operations in example embodiments from the perspective of the first user 240 and the encryption agent 204 on the first device 202a. The second part describes some example procedures of actions between the encryption agent 204, the first user 240, the Q-Server 230 and in some cases the other devices 202.

System Operation

From the perspective of the first user 240 and the encryption agent 204 on the first device 202a, the system 200 may appear to operate as a finite state machine. As such, we begin with describing some example states that may be encountered in various embodiments of the QSSAS system 200. These example states include:

A non-registered user state (NRU). NRU indicates that the first user 240 has not been registered at Q-Server 230.

A registered user with non-registered encryption agent state (RUNRC). This state may indicate that the first user 240 has been registered at the Q-Server 230, but the encryption agent 204 for the first device 202a has not been registered at the Q-Server 230.

An encryption agent running and open to user state (ROU). This state may indicate that the first user 240 and the encryption agent 204 on the first device 202a have been registered at the Q-Server 230, the encryption agent 204 is running, and the first user 240 has been authenticated by the encryption agent 204 to access files 208/210 managed by the encryption agent 204, create or add new files for the encryption agent 204 to manage, and/or take or request the encryption agent 204 to take certain actions. The first user 240 may be authenticated in the same manner as described above in system 100.

An encryption agent running in the background, but closed to user state (RCU). This state may indicate that both the first user 240 and the encryption agent 204 on the first device 202a have been registered at Q-Server 230, the encryption agent 204 is running in the background, but the first user 240 has not been authenticated by the encryption agent 204.

An encryption agent execution terminated state (EXIT). This state may indicate that both the first user 240 and the encryption agent 204 on the first device 202a have been registered at Q-Server 230, and the execution of the encryption agent 204 has been terminated.

A content viewing and/or editing state (CVE). This state may be a transient state. In some embodiments, the system 200 may transit to the state of CVE from the state of ROU when the first user 240 selects some encrypted files 208/210 in the encryption agent 204 for viewing and/or editing.

A content re-encryption state (CRE). This state may be a transient state. In some embodiments, the system 200 transits to the state of CRE from the state of ROU when the first user 240 requests the encryption agent 204 to use new FED keys to re-encrypt old encrypted files managed by the encryption agent 204. The new FED keys may be generated as described above with reference to FIG. 1.

A user name and/or password changed state (UPC). This state may indicate that the first user 240 has changed the user name and/or password at the Q-Server 230 through means other than the encryption agent 204 running on the first device 202a.

A verification code changed state (VCC). This state may indicate that the first user 240 has changed the verification code using an encryption agent 204 on another device 202 controlled by the first user 240.

In various embodiments there may be greater or fewer states of system 200. There may also be many state transitions in which the system transits from one of the above states to another, or to other states not specifically mentioned. The system 200 may transit from one state to another in response to actions from the first user 240, the encryption agent 204, the first device 202a, another device 202 and/or the server 230.

In different embodiments, the first user 240, the encryption agent 204, and/or the first device 202a may take a number of different actions. Examples of such actions include user registration (UR); encryption agent registration and keystore seed generation (CRKG); encryption agent re-registration (CRR); ID (user name and password) change at Q-Server 230 (IDCS); encryption agent closing (CC), i.e. closes the encryption agent 204, but keeping the encryption agent 204 running in the background; user authentication by the encryption agent 204 (UAC); encryption agent execution (CE); encryption agent termination (CT); ID change through the running registered encryption agent 204 (IDCC); ID change through means other than the running registered encryption agent 204 on the first device 202a (IDCO); content accessing (CA); re-encryption by using a new symmetric key cryptographic algorithm (RE); active new keystore seed generation (ANKG); passive new keystore seed generation (PNKG); active verification code change (AVCC); passive verification code change (PVCC); pin change (PC); verification code updating (VCU); and content creation and/or addition (CCA).

Some of the example actions mentioned above may require collaboration from Q-Server 230. In general, the Q-Server 230 is passive and acts in response to requests from one of the encryption agent 204 on a device 202 and/or the first user 240. In some embodiments Q-Server 230 may have no access to the first user's 240 files. As well, in some embodiments, the Q-server 230 may not know any of the key seeds and/or FED keys. These embodiments may minimize risks arising from attacks on Q-Server 230 and malicious insiders.

Figure 3:
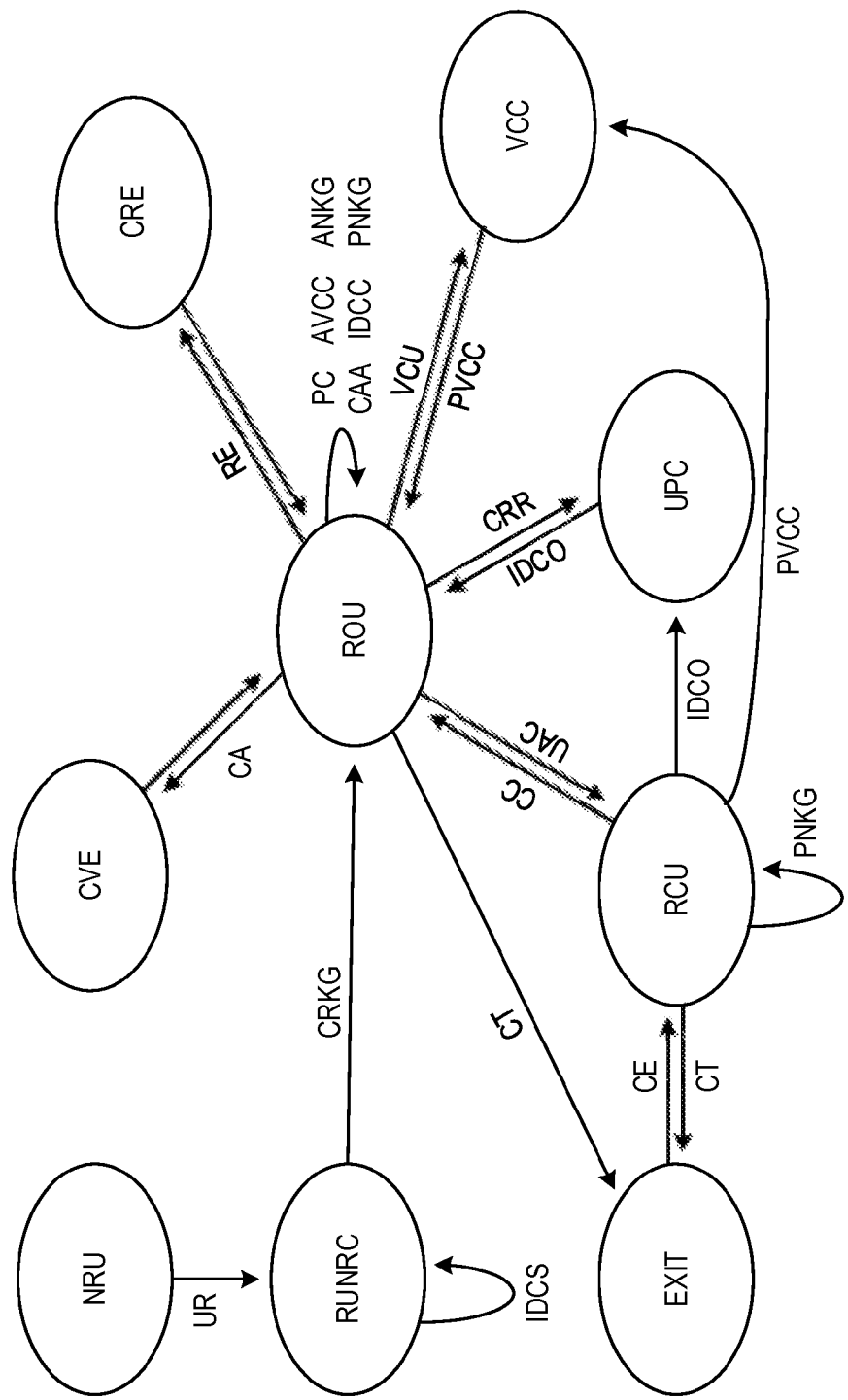
FIG. 3 shows a block diagram illustrating the states of the system of FIG. 2 in accordance with an embodiment.

FIG. 3 shows an example state transition diagram, in an embodiment of system 200, from the perspective of the encryption agent 204 on the first device 202a and the first user 240. In general, the system 200 may begin with the state NRU if the first user 240 has not been registered at the Q-Server 230. If the first user 240 has been registered at the server 230, the system 200 may begin at the state RUNRC.

If the first user 240 is registered at the server 230, a first account can be generated for the first user 240. The first account can store account data in the non-volatile memory of the server 230. The account data can include a first user identifier identifying the first user in the control of the devices 202. The account data can also include account authentication information, the account authentication information may be used to authenticate a user trying to access files stored on an encryption agent 204 associated with the first account or to access information or data associated with the first account that is stored on the server 230. For example, as will be described in further detail below, the account authentication information can be used to authenticate a user and/or a device when synchronizing key seeds between devices 202.

To transition from NRU to RUNRC the UR action can be taken. An example of the UR procedure will be described in detail further below. In response to the action of UR, the system 200 can transit from NRU to RUNRC. At the state RUNRC, the first user 240 can take the action of IDCS. IDCS may allow the first user 240 to change his ID directly at the Q-Server 230. This may be helpful when one of the L devices 202 with an encryption agent 204 installed thereon is lost or stolen and first user 240 has no access to other encryption agents 204 at that moment. In such cases, the first user 240 can communicate with the Q-Server 230 directly to change his ID at the Q-Server 230. In some embodiments, if the lost or stolen device 202 has a network connection and the encryption agent 204 is running, the encryption agent 204 on the lost or stolen device 202 can automatically log itself out after discovering through communication with the server 230 that the first user 240's ID has been changed.

Another example action that can be taken at the state RUNRC is CRKG. The action CKRG can allow the encryption agent 204 on the first device 202a to be registered at Q-Server 230. In some cases, a PIN can be set up for authenticating the first user 240 by the encryption agent 204 whenever the first user 240 wants to access files managed by the encryption agent 204 later on through the encryption agent 204. In some cases, a verification code C can be set up, e.g. if the encryption agent 204 on the first device 202a is the first encryption agent the first user 240 has installed on any of the L devices 202.

In some cases, a set of FED key seeds (i.e. a plurality of key seeds) can be generated by the encryption agent 204. The plurality of key seeds can be used by the encryption agent to derive one or more encryption keys, e.g. when encrypting a file or to generate a FED keystore. In some cases, the plurality of key seeds can be generated through communication between the encryption agent 204 and Q-Server 230. The encryption agent can then determine key seed information based on the plurality of key seeds, and store the key seed information in the non-volatile memory of the first device 202a. For example, the encryption agent can generate the key seed information by encrypting the key seeds using the verification code C as their encryption key. The encrypted key seeds can then be stored as the key seed information in the non-volatile memory of the first device 202a.

If the first user 240 has already generated a plurality of key seeds on another device 202, the first user 240 may generate the plurality of key seeds on the first device to be the same as the key seeds used by the encryption agent on the other device. Example embodiments of system 200 in which the key seeds are synchronized between devices 202 will be described in more detail further below.

The system 200 can transit from the state RUNRC to the state ROU, e.g. after CKRG. At the state ROU, the first user 240 may take a number of different actions. For example, the first user 240 may change the authentication PIN used by the encryption agent 204, change his ID through the encryption agent 204, create and/or add new files for the encryption agent 204 to manage, change the verification code, and request to generate a new set of FED key seeds through the actions of PC, IDCC, CCA, AVCC, and ANKG, respectively. In the example shown, the first user 240 can take these actions without the system 200 leaving the state ROU.

In some cases, while at the state ROU, the encryption agent 204 may automatically generate a new set of FED key seeds through based on communication with the Q-Server 230 by way of the action of PNKG. For example, this may occur if the encryption agent 204 determines based on communication with Q-Server 230 that a new set of FED key seeds has been generated by another encryption agent 204 of the first user 240, in some cases with collaboration from Q-Server 230. Any newly created and/or added file can be automatically encrypted by the encryption agent 204 using a FED key selected from the FED keystore or derived from the key seeds (e.g. on a per-file basis) available at the encryption agent 204 and designated for the first user 204 unless the added file is already encrypted by another encryption agent 204 of the first user 204. The resulting encrypted file along with keying information (such as the index of the FED key used in the keystore, or information indicating how to derive the key from the key seeds) from which the FED key can be derived can then be saved as the encrypted file in the non-volatile memory of the first device 202a.

In some cases, the system 200 may remain at the state ROU unless one of the CA, RE, PVCC, IDCO, CC, CT actions is taken. Examples of these actions will now be described.

CA: With the system 200 at the state ROU, the first user 240 may want to access his files 208/210 managed by the encryption agent 204 to view and/or make changes. In this case, the encryption agent 204 can decrypt the files 208/210 selected by the first user 240 and store the decrypted plaintext files in the volatile memory of the first device 202a for the first user 240 to read and modify. In such cases, the system 200 may transit from the state ROU to the transient state CVE.

After first user 240 closes each plaintext file, the encryption agent 204 can erase the plaintext file from the volatile memory of the first device 202a if there is no change. In some cases, the encryption agent 204 can encrypt the plaintext file again using a FED key derived from the key seed information (e.g. on a per file basis or selected from the keystore) and overwrite the original encrypted file in the non-volatile memory of the first device 202a with the newly encrypted file. This may occur whether the first user 240 has made any change to the plaintext file or not. Then, the encryption agent 204 can wipe out the plaintext file from the volatile memory of the first device 202a. After all selected files are closed the system 200 can transit back to the state ROU.

RE: In some embodiments, when the encryption agent 204 is updated with a new symmetric key cryptographic algorithm due to either encryption standard evolution or other reasons, files 208/210 encrypted with the old symmetric key cryptographic algorithm inside the encryption agent 204 may have to be re-encrypted with the new symmetric key cryptographic algorithm. If the action of RE is taken, the system 200 can temporarily transit to the transient state CRE, at which the encryption agent 204 can first use the old cryptographic algorithm to decrypt all files 208/210 under its management on the first device 202a, and then use the new cryptographic algorithm to re-encrypt all decrypted files again. Afterwards, QSSAS can transit back to the state ROU. This may allow the same encryption agent 204 to remain current and updated with the desired level of security, e.g. if vulnerabilities are detected in the encryption algorithm being used by the encryption agent 204, or if more secure encryption algorithms are developed.

PVCC: In some embodiments, if the first user 240 has changed the verification code through one of his other devices 202 via the encryption agent 204 therein, the encryption agent 204 on the first device 202a at the state ROU can automatically log itself out after detecting such the change based on communication with Q-Server 230. In such embodiments, the system 200 may transit from the state ROU to the state VCC, at which the encryption agent 204 on the first device 202a may not operate unless the first user 240 inputs both the old and new verification codes to enable the encryption agent 204 on the first device 202a to update its encrypted local code, and the key seed information stored on the first device 202a via the action of VCU. After the action of VCU, QSSAS may then transit back to the state ROU.

IDCO: In some embodiments, if the first user 240 has changed his ID through means other than the encryption agent 204 on the first device 202a, with the system 200 at the state ROU, the encryption agent 204 on the first device 202a can automatically log itself out after detecting a changed ID based on communication with Q-Server 230. In such cases, the system 200 may transit from the state ROU to the state UPC. In the state UPC, the encryption agent 204 on the first device 202a can become non-registered. If the encryption agent 204 on the first device 202a becomes non-registered, the encryption agent 204 may not operate unless it is re-registered with Q-Server 230 with first user 240's new ID (e.g. via the action of CRR). After the action of CRR, the system 200 can go back to the state ROU.

CC: In some embodiments, if the system 200 is left at the state ROU for a certain period of time without any activity from the first user 240 or if the first user 240 closes the encryption agent 204 (e.g. closing the screen or folder of the encryption agent on the first device 202a), the system 200 can transit from ROU to the state RCU. In the state RCU, the encryption agent 204 can be running in the background, but the first user 240 may not be able to access files 208/210 under its management unless the first user 240 is authenticated again by the encryption agent 204 by inputting the correct PIN or verification code (i.e., via the action of UAC). After the action of UAC, the system 200 can transit back to ROU.

CT: In some embodiments, if the encryption agent execution is terminated by either the first user 240 or the first device 202a, the system 200 can transit from ROU to the state EXIT. To get back to ROU from EXIT, the encryption agent 204 may have to be executed again by inputting the correct user name, password, and verification code (i.e., via the action of CE), and then the first user 240 may have to be authenticated again by the encryption agent 204 via the action of UAC.

The transitions of the system 200 from RCU to UPC via the action of IDCO, to VCC via the action of PVCC, to EXIT via the action of CT, and to RCU itself via the action of PNKG in FIG. 3 may be similar to those respective transitions of the system 200 from ROU described above.

In general, files 208/210 managed by encryption agents 204 and stored in non-volatile memory (whether on the L devices 202 of the first user 240 or elsewhere, such as in a cloud server) can remain encrypted all the time. Their plaintext files may be viewable only inside the encryption agents 204 of the first user 240 when they are decrypted and temporarily stored in the volatile memory of the first user 240's devices 202 at the transient state CVE. In some embodiments, other than the encryption agents 204 of the first user 240, no other parties including Q-Server 230 know any of the FED key seeds and/or FED keys available at the encryption agents 204, the files 208/210 cannot be decrypted and hence are not meaningful outside the encryption agents 204 of the first user 240 for such embodiments. In such embodiments, the files 208/210 may be considered "alive" only inside the encryption agents 204 and "dead" as long as they are taken out of the encryption agents 204. In this manner, the encryption agents 204 may be considered to provide a quarantined security system in which the files are only accessible within the quarantine zone of the encryption agent. Since the set of FED key seeds used by each encryption agent 204 and designated for the first user 240 can be automatically and securely synced across all encryption agents 204 of the first user 240, files managed by the encryption agents 204 of the first user 240 can be decrypted by any of those encryption agents 204. This, together with the quarantined nature of the system 200, can also allow the first user 240 to securely sync files managed by those encryption agents 204 either through some third party cloud computing service or other means via the Internet.

Figure 5:
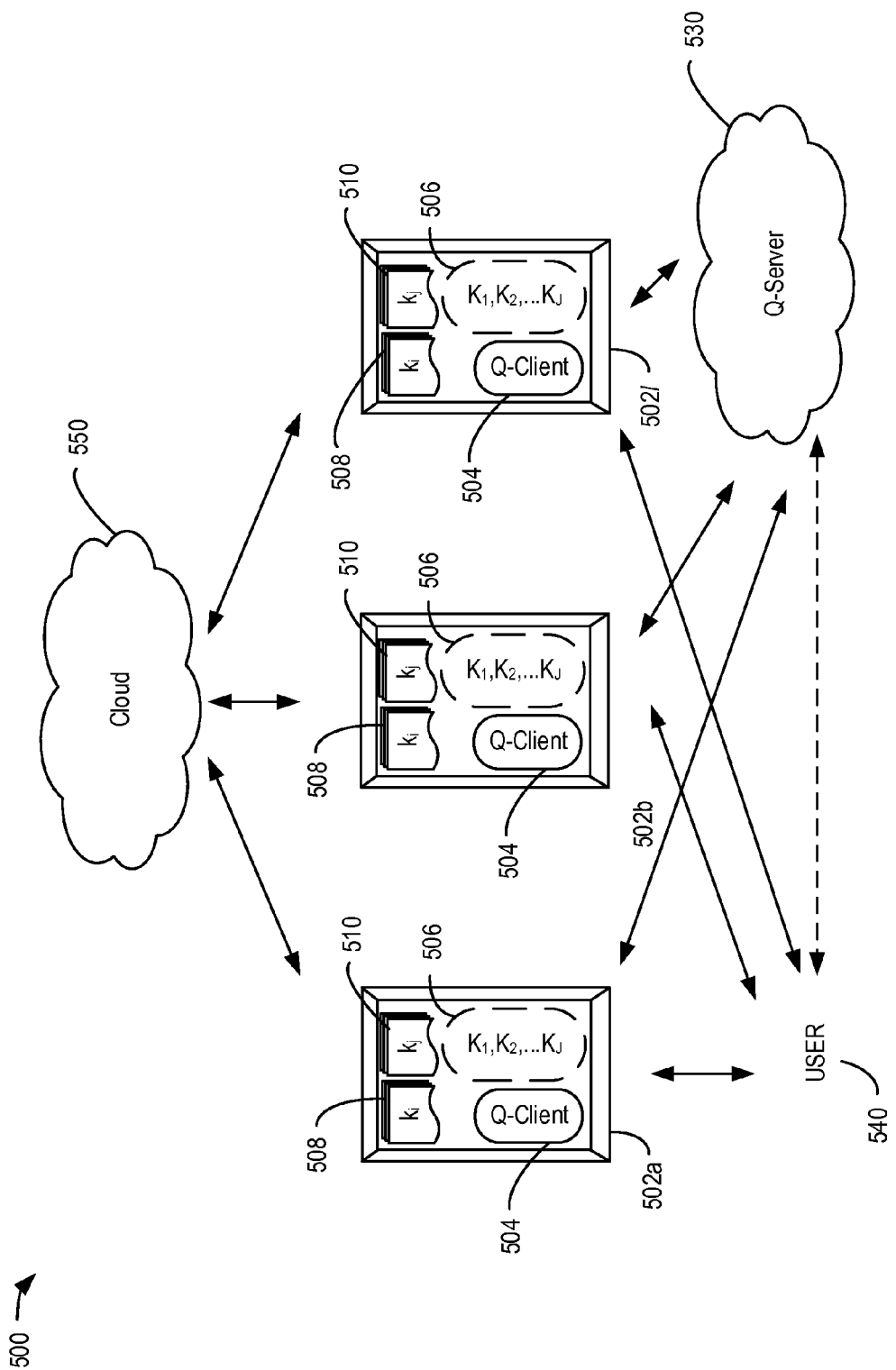
FIG. 5 shows a block diagram of a further system that can be used to provide encryption on a plurality of devices in accordance with an embodiment.

FIG. 5 illustrates an example embodiment of a system 500 implemented in conjunction with a cloud computing service 550. System 500 generally corresponds to system 200, with a plurality of devices 502a-502l configured to communicate with the server 530. The files 508/510 managed by the encryption agents 504 of the first user 540 can be synced with the cloud 550 and across those L devices 502 of the first user 540 through the cloud computing service 550. Due to the quarantined nature of the systems 200/500, the security risks inherent in cloud computing can be significantly reduced, thus enabling the first user 540 to enjoy the benefits of cloud computing without increased security concerns.

Procedures of Actions

The procedures of those actions in FIG. 3 which have not been fully explained in the above subsection, namely UR, IDCS, IDCC, CRKG, AVCC, VCU, ANKG, and PNKG will now be described. Once again, with reference to FIG. 2, we use the encryption agent 204 on the first device 202a as an example.

Procedure of UR

When the first user 240 wants to register with Q-Server 230, the first user 240 can first provide a pair of user name, or first user identifier, U and a first user password P. Q-Server 230 can store the first user identifier in the first account for the user U. The server 230 may also make two copies of U, one saved and designated as $U_0$, which can be used to denote the old first user identifier when the first user 240 wishes to change the first user identifier later on, and the other saved and designated as the initial registration first user identifier $U_r$ for the first user 240.

The system 200 (e.g. either device 202a or server 230) can determine first user password information based on the first user password. The server 230 can store the first user password information as the current first user password information. The server may also store a copy of the first user password information as the old first user password information and another copy of the first user password information as the initial registration first user password information for the first user 240.

For example, the system 200 may determine the first user password information by computing a hash value E(P) of the password P. The Q-Server 230 can store the password hash E(P) as the current first user password information, and also make two copies of E(P), one saved and designated as the old first user password information $E(P_0)$ and the other saved and designated as the initial registration first user password information $E(P_r)$ for the first user 240. In some cases, the initial registration first user password information $E(P_r)$ may not be changed even when the first user 240 changes the first user password later on.

The Q-Server 230 may initialize a string called the key status string. The key status string may include a key status portion and a server key indicator portion. The key status string may be initialized to having a key status portion indicating that no key seeds have been generated for the first user 240. In some cases, at the initialization stage, prior to the generation of key seeds, the server key indicator portion may be blank, or may include random data. For example, where the key status string is represented as $S=S_0S_1S_2\ldots S_{2(i+1)}$, the key status string can be initialized to be $S=0$.

In some cases, the system 200 may request the first user 240 to provide a valid email address or phone number to Q-Server if the provided user name is not an email address. In such cases, the email address or phone number may be considered the first user identifier. In some cases, as explained further below, the first user 240 may have a plurality of alias identifiers (such as multiple email addresses, user names and/or telephone numbers, or other identifiers). The first user identifier may include each of the alias identifiers.

Procedures of IDCS and IDCC

As mentioned before, in some cases the first user 240 can change his ID directly at Q-Server 230 to provide some additional security. In this example, we use password change as an example to illustrate the procedure. The first user password that first user 240 currently has with Q-Server 230 may be referred to as the current first user password $P_C$, and the password that the first user 240 wants to change to is called the new first user password $P_n$. An example procedure of changing the first user password directly at Q-Server 230 will now be described.

The first user 240 may transmit a password change request to the server 230. In response, Q-Server 230 may request the first user identifier (e.g. the user name U), the current first user password $P_C$, and the new first user password P. The first user 240 may then provide the first user identifier and a putative first user password to the server 230.

The server 230 may determine putative first user password information based on the putative first user password. The server 230 may then use the first user identifier to identify the first account and compare the putative first user password information with the first user password information stored in the account authentication information of the first account.

For example, the system 200 (e.g. either device 202a or server 230) can compute hash values of the putative first user password and the new password ($P_C$ and $P_n$), and check the user name U and hash of the putative first user password $E(P_C)$ with the record of the current user name and password hash stored on Q-Server for authentication.

Once the first user 240 has been authenticated, Q-Server 230 can update the current password hash on its record to $E(P_n)$, and the old password hash on its record to $E(P_O)=E(P_C)$ while keeping the initial registration password hash $E(P_r)$ untouched.

Similar procedures apply to changing the first user identifier/user name or changing the user name and password directly at Q-Server 230. Once the first user 240 is successfully authenticated, Q-Server 230 can, for any credential the first user 240 wants to change (and is authorized to change), update the respective current credential on its record to the respective old credential, and update the respective new credential to the respective current credential on its record. Likewise, when ID changes are made through the encryption agent 204 on the first device 202a, changes can be recorded at both the encryption agent 204 and Q-Server 230 once the first user 240 is successfully authenticated.

Procedure of CRKG without Verification Code Recovery

To securely and automatically sync the set of FED key seeds used by each encryption agent 204 and designated for the first user 240 across all encryption agents 240 of the first user 240, we can integrate the concepts of one-way function and public key cryptosystem into the workings of the system 200 including CRKG, AVCC, VCU, ANKG, and PNKG. The generation and synchronization of key seeds will now be described with reference to FIGS. 2, and 4A-4C.

Figure 4A:
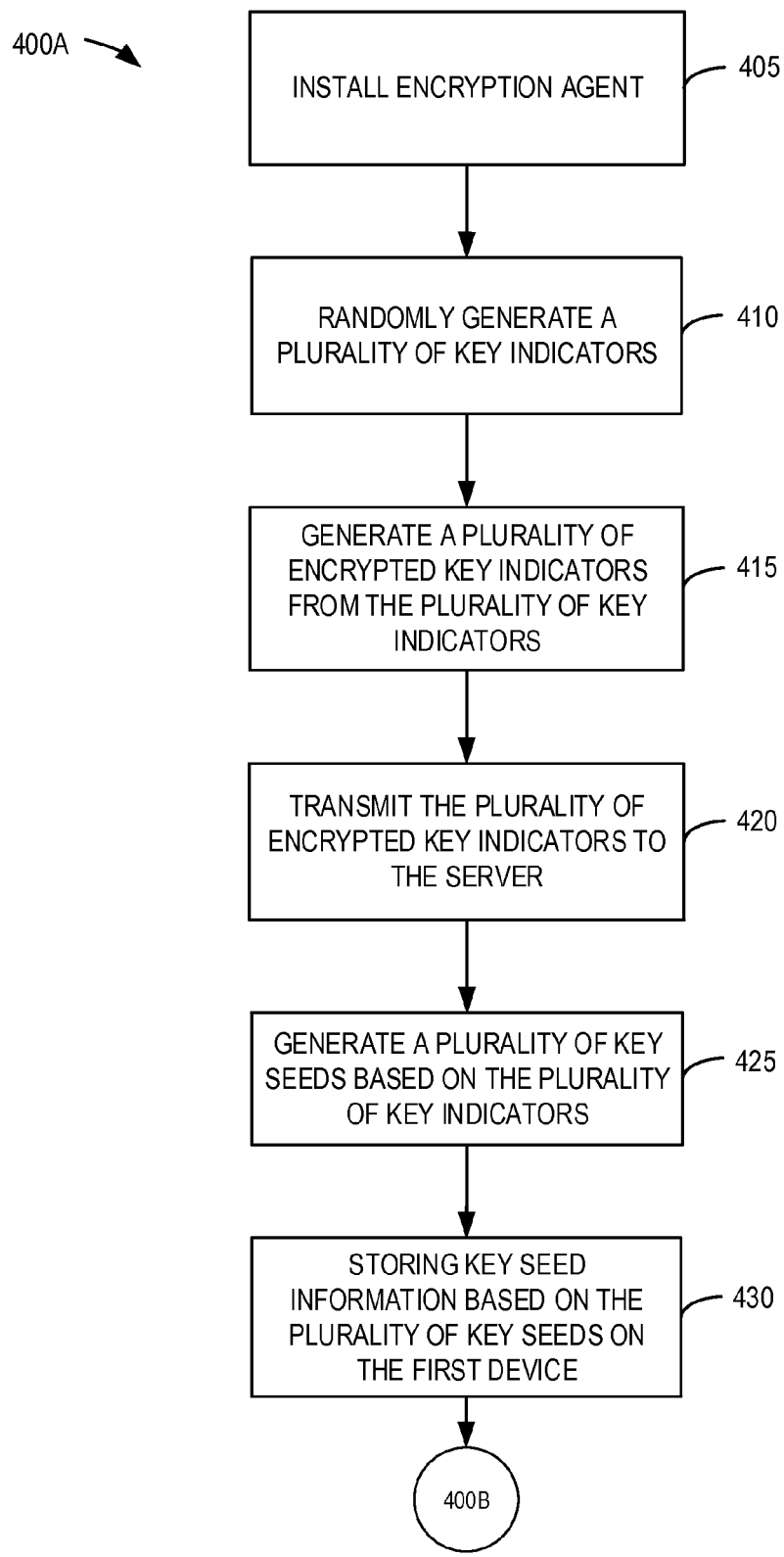
FIGS. 4A-4C show a series of flowcharts of an example embodiment of a method for providing encryption on a plurality of device.
Figure 4B:
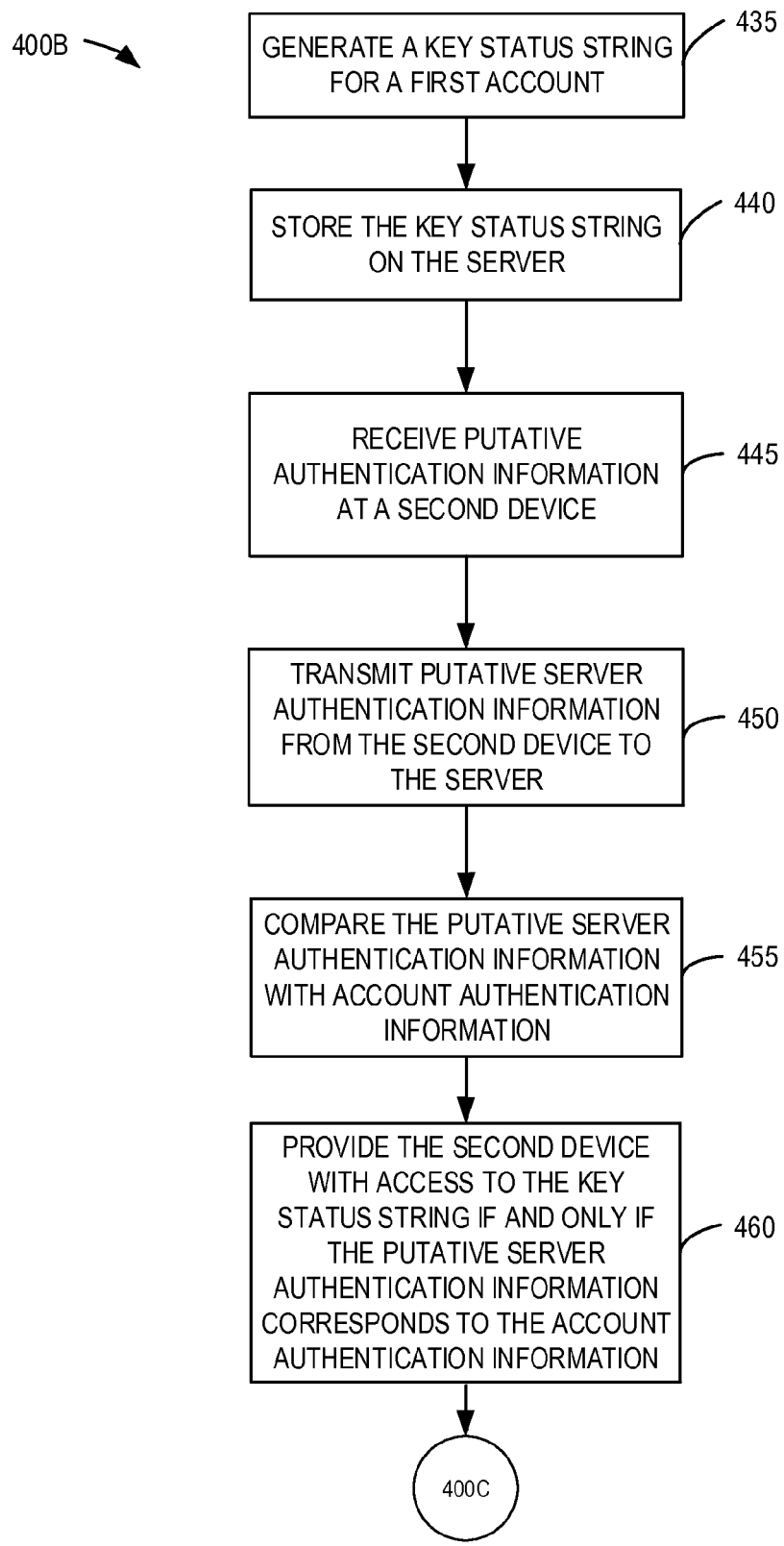
Figure 4C:
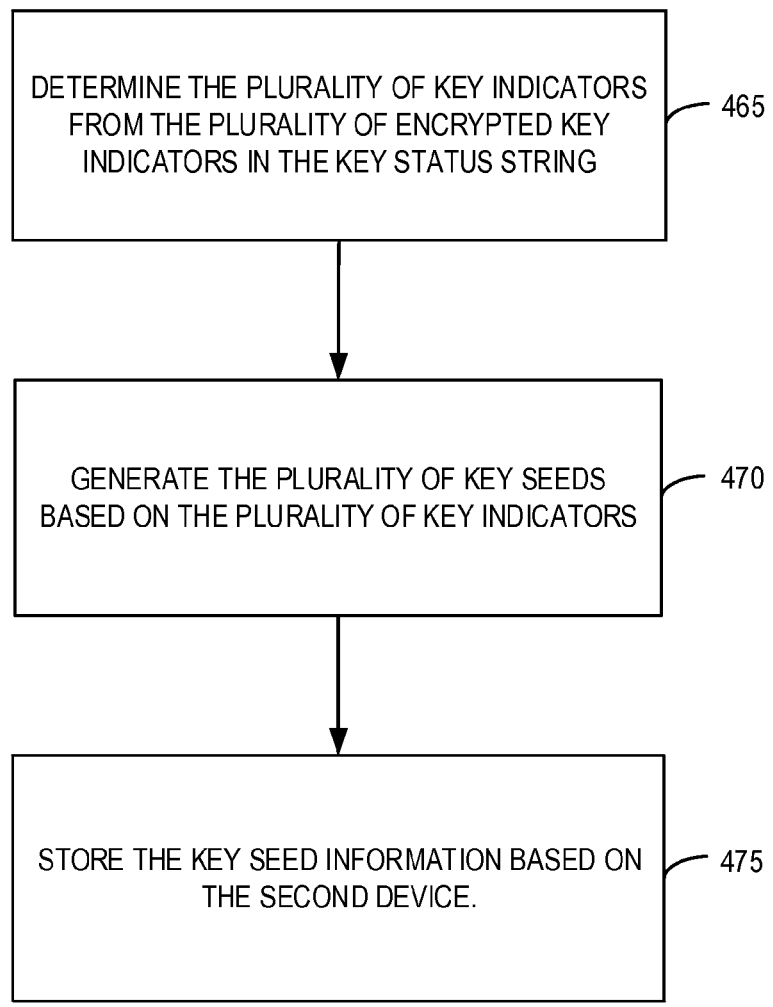

FIGS. 4A-4C show a series of a series of flowcharts of an example embodiment of a method 400 for providing encryption on a plurality of device. For example, the system 200 may be used to implement method 400 to provide encryption on the devices 202 controlled by the first user 240. Extensions of method 400 when the first user includes different users in control of the devices 202 or a plurality of groups users will be described later with reference to FIGS. 6C, 8 and 9.

In method 400, the server 230 has generated a first account for the first user 240 in control of the plurality of devices 202. As mentioned above, the first account stores account data on the non-volatile server memory, where the account data includes a first user identifier and account authentication information.

While the operations of system 200 and method 400 will be described in detail, in some cases, specific example will be described incorporated aspects of a well-known public key cryptosystem. Since there are several well-known public key cryptosystems such as RSA (R. L. Rivest, A. Shamir, and L. Adleman, "*A method for obtaining digital signatures and public-key cryptosystems,*" *Comm. ACM*, vol. 21, no. 2, pp. 120-126, February 1978) ElGamal (T. ElGamal, "*A public-key cryptosystem and a signature scheme based on discrete logarithms,*" *IEEE Transactions on Information Theory*, vol. 31, no. 4, pp. 469-472, July 1985), and ECC public key cryptosystems (I. F. Blake, G. Seroussi, and N. P. Smart, *Elliptic Curves in Cryptography*. Cambridge University Press, 1999), to be specific, some specific examples below will be described incorporating aspects of the ElGamal public key system as an example. However, it will be apparent to the skilled person that other embodiments of the systems and methods described herein may not incorporate any aspects of the ElGamal cryptosystem.

In some specific examples below, aspects of the system 200 may be described in the context of a large safe prime number N (i.e., (N−1)/2 is also a prime) and the finite field $GF(N) = \{0, 1, 2, \ldots, N-1\}$. A primitive root $\alpha$ from GF(N), is also fixed in those examples (i.e., $1 \leq \alpha \leq N-1$ where $\alpha$ is an integer whose powers under the module of N yields every nonzero element in GF(N)).

At 405, for each device 202 in the plurality of devices 202, an encryption agent 204 is installed thereon. The encryption agent 204 can be used to control the operation of the processor of the device, when implementing aspects of the method 400. The encryption agent 204 may be installed using the various client registration processes described herein.

For example, the first user 240 may input the first user identifier and putative first user password into the encryption agent 204 installed on the first device 202a. The encryption agent 204 can generate putative first user password information based on the putative first user password, and transmit the first user identifier, putative first user password information, and a first device identifier to the server 230. For example, the encryption agent 204 can computes a hash value E(P) of the putative first user password P, which is not necessarily the same as the first user password hash stored at Q-Server, and then sends the user name U, password hash E(P), and device identifier (D) of the first device 202a (e.g. a MAC address) to Q-Server 230 for authentication. In some embodiments, the device identifier D of first user device 202a is unique.

The Q-Server 230 can compare the first user identifier U and putative first user password information E(P) with its current record (i.e., the current user name and current password hash recorded at Q-Server 230). If a match is found, the user name and password authentication succeeds. In some cases, another round of verification may conducted by letting Q-Server 230 send some authentication verification messages to the email address or phone number provided by the first user 240 at the user registration stage. The Q-Server 230 asks first user 240 to provide the messages to the encryption agent, which in turn forwards the messages to Q-Server for confirmation. In some cases, the user authentication process may include biometric identifying information of the first user 240. An example of such a remote authentication process will be described in detail further below.

If the first user 240 is authenticated, Q-Server 230 associates the first device identifier D of the first device 202a with the first user 240. If the first user 240 is not authenticated, the authentication process described above may be repeated until successful authentication and message confirmation are reached.

The Q-Server 230 may send an acknowledgement of successful authentication along with the key status string $S=S_0S_1S_2 \ldots S_{2(i+1)}$ to the encryption agent 204. Upon receiving the acknowledgement of successful authentication along with the key status string $S=S_0S_1S_2 \ldots S_{2(j+1)}$, the encryption agent 204 can store the first user identifier (e.g. user name U) and first user password information (e.g. password hash E(P)) in the non-volatile memory of the first device 202a.

If the status indicator portion of the received key status string indicates that no key seeds have been generated, this suggests that the first device 202a is the first device 202 registered by the first user 240 with the server 230 (this is not necessarily the case, but indicates that key seeds have not yet been generated on another device 202 associated with the first user 202a). For example, if the key status string S begins with 0, i.e., $S_0=0$, this may indicate that the encryption agent 204 on the first device 202a is the first encryption agent 204 registered by the first user 240 with Q-Server 230. The encryption agent 204 may then request the first user 240 set up a first verification code C. In some embodiments, the verification code C may be used to manage and synchronize key seeds across the devices 202 controlled by the first user. The verification code may also enable the generation of the first user 240's private key across all encryption agents 204 of the first user 240.

The encryption agent 204 may generate a plurality of codewords from the verification code. The plurality of codewords can be generated such that the verification code is determinable from all of the codewords in the plurality of codewords, but is not determinable from less than all of the codewords. In some cases, the plurality of codewords may consist of a first codeword and a second codeword.

For example, the encryption agent 204 can convert the verification code C into a pair of codewords $C_1$ and $C_2$ via $f(C)=(C_1, C_2)$. The conversion may be done via a one to one function $f$ such that both $C_1$ and $C_2$ look like random numbers from GF(N). The verification code C can be determined back from both the first codeword $C_1$ and the second codeword $C_2$, but not from either $C_1$ or $C_2$ alone.

The encryption agent 204 can determine an encrypted local code based on the first verification code. For example, the encryption agent may determine a first encrypted local value from the first codeword and the second codeword, wherein neither of the first codeword and the second codeword is determinable from the first encrypted local value alone. In some cases, the first encrypted local value can be generated by multiplying the second codeword with a raised to the power of the first codeword. The encryption agent 204 may also determine a second encrypted local value from the second codeword. The second codeword may be a discrete logarithm of the second encrypted local value with a base α.

For example, the encryption agent may determine the encrypted local code $\beta=(\beta_1, \beta_2)=(\alpha^{C_1}C_2, \alpha^{C_2})$, (where $\beta_1$ corresponds to the first encrypted local value, and $\beta_2$ corresponds to the second encrypted local value). The encryption agent 204 can save the encrypted local code β in the non-volatile memory of the first device 202a for the purpose of verifying a local putative verification code input by first user 240 in the future.

The encryption agent 204 can also determine an encrypted server code based on the first verification code. The encrypted server code may include a first encrypted server value determined from the first codeword and the second codeword. The encrypted server code may also include a second encrypted server value determined from the first codeword. In some embodiments, neither of the first codeword and the second codeword is determinable from the first encrypted server value. In general the first codeword and the second codeword may be computationally infeasible to determine from the first encrypted server value and/or the second encrypted server value either alone or in combination, i.e. due to the difficulty of determining discrete logarithms. For example, encryption agent 204 can determine the encrypted server code as $\hat{\beta}=(\hat{\beta}_1, \hat{\beta}_2)=(\alpha^{C_1C_2}, \alpha^{C_1})$. The encrypted server code can be transmitted to Q-Server 230. The server 230 can store the encrypted server code in the authentication information of the first account.

In some cases, the server 230 can generate independent server encryption values and randomize (or further encrypt) the encrypted server code based on the independent server encryption values prior to storage. The server 230 may generate the independent server encryption values as independent random numbers $V_{-1}, V_{-2}$ based on $U_r$, $E(P_r)$, and its own secret key v. The independent random numbers $V_{-1}, V_{-2}$ may be uniformly distributed over $\{1, 2, \ldots, N-1\}$. The server 230 can then randomize $\hat{\beta}$ by converting it into $D(\hat{\beta})=(D(\hat{\beta}_1, V_{-1}), D(\hat{\beta}_2, V_{-2}))$, and save $D(\hat{\beta})$ along with the user name And password hash. The function $D(\cdot, \cdot)$ may be one to one and onto from $\{1, 2, \ldots, N-1\}$ to $\{1, 2, \ldots, N-1\}$ given either $\hat{\beta}_j$ or $V_{-j}$. In some cases, the server encrypted server code may be generated using a hash value (e.g. a hash value derived from HMAC) with the secret server key v as its key and the encrypted server code $\hat{\beta}$ as its input.

At 410, the encryption agent 204 can randomly generate a plurality of key indicators. For example, the encryption agent 204 may generate independently random numbers $X_j$, $j=0, 1, \ldots, J$ as the plurality of key indicators. In some cases, each random number (i.e. each key indicator) can be uniformly distributed over $\{1, 2, \ldots, N-1\}$.

At 415, the encryption agent 204 can generate a plurality of encrypted key indicators from the plurality of key indicators using a second device encryption key. Each of the encrypted key indicators can correspond to one of the key indicators in the plurality of key indicators. The second device encryption key may correspond to a second device decryption key unknown to the server.

In some cases (e.g. when using the ElGamal system), the encryption agent 204 may also randomly generate a plurality of encryption values. For example, the encryption agent may generate the plurality of encryption values as independent random numbers Y. The encryption agent 204 can then generate the plurality of encrypted key indicators from the plurality of key indicators using the second device encryption key and the plurality of encryption values. In such cases, each of the encrypted key indicators also corresponds to one of the encryption values in the plurality of encryption values. The encryption agent 204 can also generate a plurality of key indicator public keys. Each key indicator public key may correspond to one of the encryption values in the plurality of encryption values. For example, the encryption agent may compute the plurality of encrypted key indicators as $\epsilon_j = \hat{\beta}_2^{Y_j} X_j$ and the plurality of key indicator public keys as $\mu_j = \alpha^{Y_j}$, j=0, 1, ..., J.

At 420, the encryption agent 204 can transmit the plurality of encrypted key indicators to the server 230. The encrypted key indicators can be transmitted to the server 230 to impede exposure of the key indicators to the server 230. At the same time, the encrypted key indicators can be used by the server 230 to update the key status string for the first account. The updated key status string can then be used to synchronize the key seeds on other devices controlled by the first user.

In some cases, the encryption agent 204 can also transmit the plurality of key indicator public keys to the server 230. For example, the encryption agent 204 may send $(\epsilon_j, \mu_j)$, j=0, 1, ..., J, to Q-server 230.

At 425, the encryption agent 204 can generate a plurality of key seeds based on the plurality of key indicators. For each key seed, the encryption agent 204 may be operable to generate a plurality of independent encryption keys. As mentioned above, in some embodiments, the encryption agent 204 may generate an encryption keystore comprising a plurality of encryption keys. In other embodiments, the encryption agent 204 may derive encryption keys as needed in response to an indication of a file to be encrypted.

In some cases, the encryption agent 204 may generate the plurality of key seeds with assistance from the server 230. The server 230 may randomly generate server key values for the first account. The server key values can be stored in the non-volatile memory of the server and transmitted to the first device 202a. The encryption agent 204 can generate the plurality of key seeds based on the server key values and the plurality of key indicators.

In some embodiments, encryption agent 204 may send a key indicator amount to Q-Server 230. The key indicator amount may identify the number of key indicators generated by the encryption agent at 410. The key indicator amount may be in the form of a pair of integers (0, J). The key indicator amount may indicate to server 230 that its assistance is requested to generate FED key seeds.

Upon receiving the key indicator amount (e.g. the pair of integers (0, J), Q-Server 230 can generate, based on $U_r$, $E(P_r)$, and its own secret key v, the server key values as independent random numbers $V_0, V_1, \ldots, V_J$. The server key values may be random numbers uniformly distributed over $\{1, 2, \ldots, N-1\}$. The server 230 can send $V_0, V_1, \ldots, V_J$ back to the encryption agent 204. Based on $V_0, V_1, \ldots, V_J$ and $X_0, X_1, \ldots, X_J$, the encryption agent 204 can generate J independent FED key seeds $K_j = A(X_j, V_j)$, j=1, 2, ..., J.

In some cases, the encryption agent 204 may also generate a first user decryption key based on the plurality of key indicators (and, in some embodiments, the plurality of server key values). The encryption agent 204 can generate a first user encryption key based on the first user decryption key and transmit the first user encryption key to the server 230. The first user encryption key may be stored in the first account.

For example, the encryption agent 204 may generate the first user 240's decryption key as $K_0 = A(X_0, V_0)$, where the function $A(\cdot, \cdot)$ is one to one and onto from $\{1, 2, \ldots, N-1\}$ to $\{1, 2, \ldots, N-1\}$ given either $X_j$ or $V_j$. The encryption agent 204 can then send the first user 240's public key $\gamma = \alpha^{K_0}$ to Q-Server 230, which in turns saves and records $\gamma$ along with the user name and password hash for the first user.

At 430, key seed information based on the plurality of key seeds can be stored in the non-volatile memory of the first device 202a. In some embodiments, storing the key seed information may include encrypting the plurality of key seeds using the first verification code, and storing the encrypted plurality of key seeds in the non-volatile memory of the first device 202a.

For example, the encryption agent 204 can use the verification code C to encrypt the plurality of key indicators ($X_0, X_1, \ldots, X_J$) and the plurality of key seeds ($K_0, K_1, \ldots, K_J$) into first device encrypted key indicators $E_C(X_0, X_1, \ldots, X_J)$ and encrypted key seeds $E_C(K_0, K_1, \ldots, K_J)$ respectively. The encryption agent 204 can then save $E_C(X_0, X_1, \ldots, X_J)$ and $E_C(K_0, K_1, \ldots, K_1)$ in the non-volatile memory of the first device 202a. The encryption agent 204 can then encrypt and decrypt files 208/210 under management by the encryption agent 204 even when network connection between the encryption agent 204 and Q-Server 230 is not available when the first user 240 is authenticated and verified by the encryption agent 204 on the first device 202a. Example embodiments of the encryption and decryption of files will be described in further detail below with reference to FIGS. 6A-6C.

At 435, a key status string for the first account can be generated. The key status string can include a server key indicator portion generated based on the plurality of encrypted key indicators. In some cases, the key status string for the first account may already exist. For example, as mentioned above the key status string may be initialized when the first user 240 registers the encryption agent 204 on the first device 202a with the server 230. In such cases, the key status string for the first account can be generated by updating the previously stored key status string.

In some cases, the server key indicator portion can be generated based on the plurality of encrypted key indicators and the plurality of key indicator public keys. For example, upon receiving $(\epsilon_0, \mu_0, \epsilon_1, \mu_1, \ldots, \epsilon_J, \mu_J)$, the server 230 can update the key status string from S=0 to $S = S_0 S_1 S_{2(J+1)} = 1 \epsilon_0 \mu_0 \ldots \epsilon_J \mu_J$. The key status string may be updated by adding the plurality of encrypted key indicators to the key status string. Where key indicator public keys are used, these can also be added to the key status string and associated with the encrypted key indicators to which they correspond. The status indicator portion may also be updated to identify the current server key indicator portion.

At 440, the key status string can be stored on the non-volatile memory of the server 230. In general, the key status string can be used to synchronize key seeds on the devices 202 associated with the first user 240.

If the key status string received by the first device 202a indicates that the server key indicator portion has already been generated for the first account, the first device 202a may then synchronize key seeds using the key status string. For example, each device may use the values stored in the server key indicator portion to generate the plurality of key indicators and then generate the plurality of key seeds based on the plurality of key indicators.

For example, the received key status string $S = S_0 S_1 S_2 \ldots S_{2(i+1)}$ may have a status indicator portion such as $S_0 = 1$, indicating that at least one other encryption agent 204 on one of those L devices 202 of the first user 240 has been registered with Q-Server 230 already, the verification code C has been defined, and the set of FED key seeds $\{K_1, K_2, \ldots, K_i\}$, where i is an integer multiple of J, have been generated. In some cases, the first user 240's private key $K_0$ (corresponding to the first user 240's public key $\gamma = \alpha^{K_0}$) will also have been generated.

For simplicity, the process of synchronizing key seeds will be described with reference to the second device 202b. However, as noted above, the processes described herein can generally be performed by an encryption agent 204 on any of the devices 202 in system 200. As well, the process is described in the context of a single user being in control of the first device 202a and the second device 202b, but similar process can be used when different users are in control of the devices 202, as will be described in detail further below.

In general, prior to providing the second device 202b with access to the key status string, the server 230 may authenticate the first user 240 at the second device 202b. In some cases, the server 230 may transmit the status indicator portion of the key status string to the encryption agent 204 on the second device 202b prior to requiring authentication. For example, the server 230 may receive a registration request for the second device 202b. The registration request may include the first user identifier of the first account and a putative user password.

In response, the server 230 may compare the first user identifier and putative user password to the stored account data and account authentication data. The status indicator portion of the key status string can be transmitted to the second device 202b and may indicate to the encryption agent 204 on the second device 202b that the verification code has been defined and authentication of the first user 240 is required. The server 230 may also send an authentication request to the second device 202b along with the status indicator portion. The encryption agent 204 on the second device 202b can prompt the first user 240 to input the verification code C.

At 445, putative authentication information may be received at the second device 202b. The putative authentication information can be a putative verification code.

At 450, the encryption agent 204 on the second device 202b can generate putative server authentication information based on the putative authentication information. The encryption agent 204 can transmit the putative server authentication information to the server 230. For example, the encryption agent 204 can generate the putative server authentication information as a putative encrypted server code based on the putative verification code. The encryption agent 204 can compute $\hat{\beta}$ using the same function as above and send this value to the server 230.

At 455, the server 230 can compare the putative server authentication information with the account authentication information. The server 230 may compare the putative server authentication information with the encrypted server code stored in the account authentication information of the first account. The server 230 may compare the received value of $\hat{\beta}$ received from the second device 202b with the stored value of $\hat{\beta}$.

In some cases, the server 230 may further generate server encrypted putative server authentication information. This can be used when the encrypted server code is a further encrypted server code generated at the server prior to storage. For example, the server 230 may compute $D(\hat{\beta})$ of the received encrypted server code using the same function D (ie. with values $V_{-1}$ and $V_{-2}$) used to randomize the server encrypted code prior to storage. This can then be compared to the stored value of $D(\hat{\beta})$ saved on the non-volatile memory of the server 230 to determine if the putative encrypted server code matches the encrypted server code.

At 460, the server 230 can provide the second device 202b with access to the key status string if and only if the putative server authentication information corresponds to the account authentication information. In some cases, the putative server authentication information corresponds to the account authentication information if and only if the putative encrypted server code matches the encrypted server code. In embodiments where the key seeds were generated using server key values, the server 230 can also provide the second device 202b with access to the server key values if and only if the putative server authentication information corresponds to the account authentication information. The server 230 can transmit the server key values stored in the first account to the encryption agent 204 on the second device 202b after the first user 240 is authenticated at the second device 202b.

If the authentication is successful at 460, the encryption agent 204 on the second device 202b may accept the putative verification code received from the first user 240 as the as the correct verification code. The encryption agent 204 can then compute the encrypted local code and store the encrypted local code in the non-volatile memory of the second device 202b. For example, the encryption agent 204 can compute the encrypted local code as described above (e.g. $\beta = (\alpha^{C_1} C_2, \alpha^{C_2})$) and save $\beta$ in the non-volatile memory of the second user device 202b.

At 465, the encryption agent 204 on the second device 202b can determine the plurality of key indicators from the plurality of encrypted key indicators in the key status string using the second device decryption key. For example, the plurality of encrypted key indicators may be encrypted using the second device encryption key. The second device encryption key corresponds to the second device decryption key, and may be generated based on the second device decryption key.

For example, the second device encryption key may be generated based on the verification code. Similarly, the second device decryption key may also be generated based on the verification code. In the single user scenario, the verification code defined at the first device 202a and the second device 202b can be the same. Accordingly, the second device decryption key and the second device encryption key may be generated separately. For instance, the first device 202a may generate the second device encryption key and encrypt the plurality of key indicators using the second device encryption key even prior to the second device 202b being registered with the server 230. When the second device 202b is registered with the server 230, the second device 202b can then generate the corresponding second device decryption key based on the verification code defined at the second device 202b.

In some embodiments, as described below, the second device 202b may generate the second device decryption key and transmit the second device encryption key to the server 230. The first device 202a may then generate the plurality of encrypted key indicators for the second device 202b using the second device encryption key received from the server 230. In some cases, this may even occur after some files 208/210 have been transmitted from the first device 202a to the second device 202b.

In some embodiments, the encryption agent 204 on the second device 202b may determine the plurality of key indicators from the key indicator portion of the key status string by determining $X_j$, $j=0, 1, \ldots, i$, out of the key status string $S = S_0 S_1 S_2 \ldots S_{2(i+1)}$ using $X_{j-1} = S_{2j-1} S_{2j}^{-C_1}$, $j=1, 2, \ldots, i+1$. The key indicators determined by the encryption agent 204 on the second device 202b can be the same as the plurality of key indicators generated on the first device 202a. This allows the encryption agent 204 on the second device 202b to generate the same plurality of key seeds as were generated by the encryption agent 204 on the first device 202a.

At 470, the encryption agent 204 on the second device 202b can generate the plurality of key seeds based on the plurality of key indicators. For each key seed, the encryption agent 204 on the second device 202b can generate the same plurality of independent encryption keys as the first device 202a, without any of the key seeds, key seed information and encryption keys being provided to the second device 202b. The plurality of key seeds can be generated on the second device 202b in the same manner as described above for the first device 202a. In some embodiments, as with the first device 202a, the encryption agent 204 on the second device 202b may generate the plurality of key seeds based on the plurality of key indicators and the server key values received from the server 230.

The encryption agent 204 on the second device 202b can generate the plurality of key seeds in a similar manner as described above for the first device 202a at 425. For example, with the verification code C and random numbers $X_j$, j=0, 1, . . . , i, available, the encryption agent 204 on the second device 202b can perform the operations described at 425 with J replaced by i. Where the first user 240's public key has already been generated and stored in the first account, there is no need for the second device 202b to send the public key γ to Q-Server 230. The encryption agent 204 on the second device 202b can complete the registration of the second device 202b and generate the key seeds and the first user 240's private key (or second device decryption key) for the encryption agent 204.

In some embodiments, all the computations involving numbers in the method 400 described above can be carried out in the finite field GF(N). We can also verify that the plurality of FED key seeds and first user 240's private key generated and saved by the encryption agent 204 on the second device 202b are the same as those used by all up-to-date encryption agents 204 on other devices 202 registered before the newly registered encryption agent (in the single user case). For example, suppose that i=J. One can verify that the plurality of key indicators $X_j$, j= 0, 1, 2, . . . , J, determined by the encryption agent 204 of the second device 202b at 465 are the same as those generated by the encryption agent 204 of the first device 202a at 410:

$$S_{2j-1}S_{2j}^{-C_1}=\hat{\beta}_2^{Y_{j-1}}X_{j-1}\alpha^{-Y_{j-1}C_1}=X_{j-1} \text{ for } j=1,2,\ldots,J+1$$

At 475, the encryption agent 204 on the second device 202b can store the key seed information based on the plurality of key seeds in the non-volatile memory of the second device 202b. The encryption agent 204 on the second device 202b can store the key seed information in the same manner as described above for the first device 202a, at 430.

In some embodiments, the communications and handshakes between the encryption agent 204 and Q-Server 230 can be assumed secure. In addition, the integer i in the description above can be an integer multiple of J and increase by J each time a new set of FED key seeds is requested by any of registered encryption agents 204 of first user 240. When each $K_j$ is long, but each FED key k is relatively short, J may be small. For example, one may select J=1 when $K_j$ is 4096 bits long and k is 256 bits long. In embodiments of the above description, when the independent and uniformly distributed random server values and server key values $V_{-2}, V_{-1}, V_0, V_1, \ldots, V_i$ are generated for the first time, they may be encrypted by Q-Server 230 with its own secret key v and then saved in the first account for first user 240 for other possible requests for generation of key seeds and the first user 240's private key made thereafter by registered encryption agents of first user 240.

In some embodiments, whether or not the encryption agent 204 on the first user device 202a is the first encryption agent of the first user 240 registered with Q-Server 230, at the end of CRKG process, the registered encryption agent 204 on the first user device 202a can have some or all of the following information stored in the non-volatile memory of the first user device 202a:

the user identifier or user name U;
first user password information such as password hash E(P);
the PIN hash E(R);
the encrypted local code, e.g. $\beta=(\beta_1, \beta_2)=(\alpha^{C_1}C_2, \alpha^{C_2})$ based on the verification code C;
the plurality of encrypted key indicators (e.g. random numbers $E_C(X_0, X_1, \ldots X_i)$) and;
key seed information, such as encrypted key seeds $E_C(K_0, K_1, \ldots, K_i)$ Correspondingly, in some embodiments, the Q-Server 230 can have some or all of the following information stored in its non-volatile memory, e.g. in the first account for first user 240:

the first user identifier, e.g. the current, old, and initial registration user names U, $U_0$, and $U_r$;
the first user password information, e.g. current, old, and initial registration password hash values E(P), $E(P_0)$, and $E(P_r)$;
the device identifiers of all devices 202 of first user 240 that have installed thereon encryption agents 204 and are registered with the server 230;
the first user 240's second device encryption key, such as public key γ;
the encrypted server code, or further encrypted server code based on the verification code C, e.g. $\hat{\beta}$ and/or $D(\hat{\beta})$; and
the key status string including the server key indicator portion, and in some cases the status indicator portion, e.g. $S=S_0S_1S_2 \ldots S_{2(j+1)}$.

In some embodiments, the information stored by a registered encryption agent 204 in the non-volatile memory of the first user device 202a and the information stored in the non-volatile memory of the server 230 for the first user 240 can satisfy one or more of the following properties:

$$U \text{ at } Q\text{-Client} = U \text{ at } Q\text{-Server} \quad (1)$$

$$E(P) \text{ at the } Q\text{-Client} = E(P) \text{ at } Q\text{-Server} \quad (2)$$

$$\beta \equiv D(\hat{\beta}) \quad (3)$$

$$X_{j-1}=S_{2j-1}S_{2j}^{-C_1}, j=1,2,\ldots,i+1 \quad (4)$$

$$K_0 \equiv \gamma \quad (5)$$

$$K_j = A(X_j, V_j), j=0,1,2,\ldots,i \quad (6)$$

In properties (2), (3), and (5), E indicates that the right side is consistent with the left side. In general these six consistent properties may remain valid until there is any change requested by the first user 240 in the user name, password, verification code C, and/or generation of new key seeds and the first user 240's private and public keys through either Q-Server 230 or another registered encryption agent 204 on one of those L devices 202 of the first user 240. Therefore, by checking one or more of these consistent properties, the registered encryption agent 204 on first user device 202a can detect if changes requested by the first user 240 have indeed been made through either Q-Server 230 or another registered encryption agent 204 on one of those L devices 202 of the first user 240 (as the case may be). If yes, the registered encryption agent 204 on the first user device 202a can update its corresponding information to ensure that these consistent properties are valid again and, by doing so, also synchronize itself with these changes. To facilitate the detection process, the encryption agent 204 on the first user device 202a, once successfully registered with Q-Server 230, may be required to compare its locally stored information with the respective information at Q-Server 230 during its handshaking authentication process with Q-Server 230 whenever it wants to talk to Q-Server 230. Detecting changes and updating related information to get the registered encryption agent 204 on the first user device 202a synced with the changes will be discussed later through procedures of AVCC, VCU, ANKG, and PNKG.

Due to the difficulty of computing discrete logarithms, the server 230 may have significant difficult in determining the verification code from the encrypted server code, especially as both of the first codeword and the second codeword may be required to determine the verification code. Furthermore, a further encrypted server code e.g. generated as a randomization or keyed hash of $\hat{\beta}$, may make this task even more difficult (i.e. Q-Server 230 may have a hard time figuring out the verification code C, in particular $C_1$, from $D(\hat{\beta})$). Therefore, Q-Server 230 may not know the set of FED key seeds and first user 240's private key used by all registered encryption agents 204 of first user 240.

In the system 200, the plurality of key seeds (and the first user 240's private key or device decryption key) may only be exposed at the registered encryption agents 204 on the devices 202 of first user 240, typically in an encrypted format. The key status string S may not expose any information about the plurality of FED key seeds, the first user 240's private key, and/or verification code C in an information theoretic sense. Likewise, each registered encryption agent 204 may have difficulty determining the verification code C from the local encrypted code $\beta$ as well. As such, in some embodiments, even at the registered encryption agents 204 of first user 240, the plurality of FED key seeds (and the first user 240's private key or device decryption key) may only be available to each registered encryption agent 204 after first user 240 provides putative authentication information corresponding to the correct verification code C to that encryption agent.

Figure 6A:
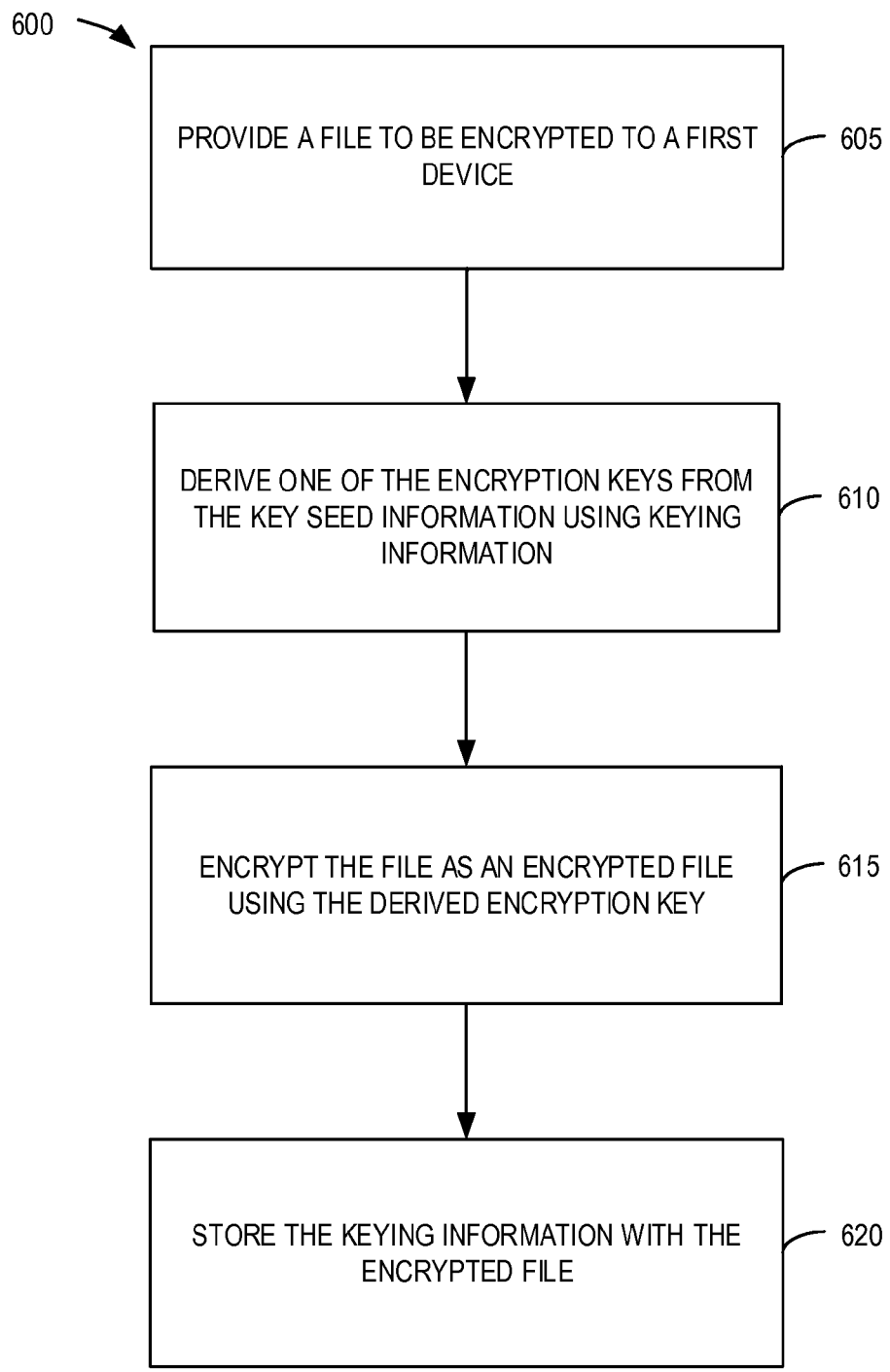
FIG. 6A shows a flowchart of an example embodiment of a method for encrypting a file.
Figure 6B:
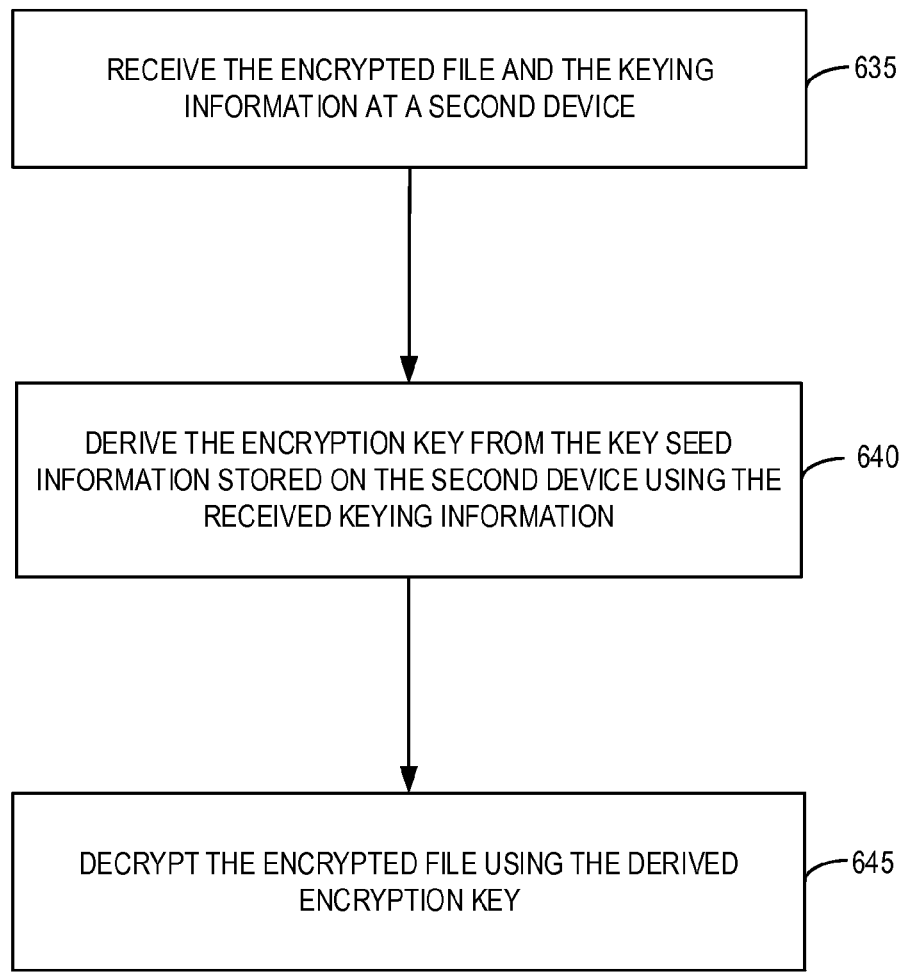
FIG. 6B shows a flowchart of an example embodiment of a method for decrypting a file.
Figure 6C:
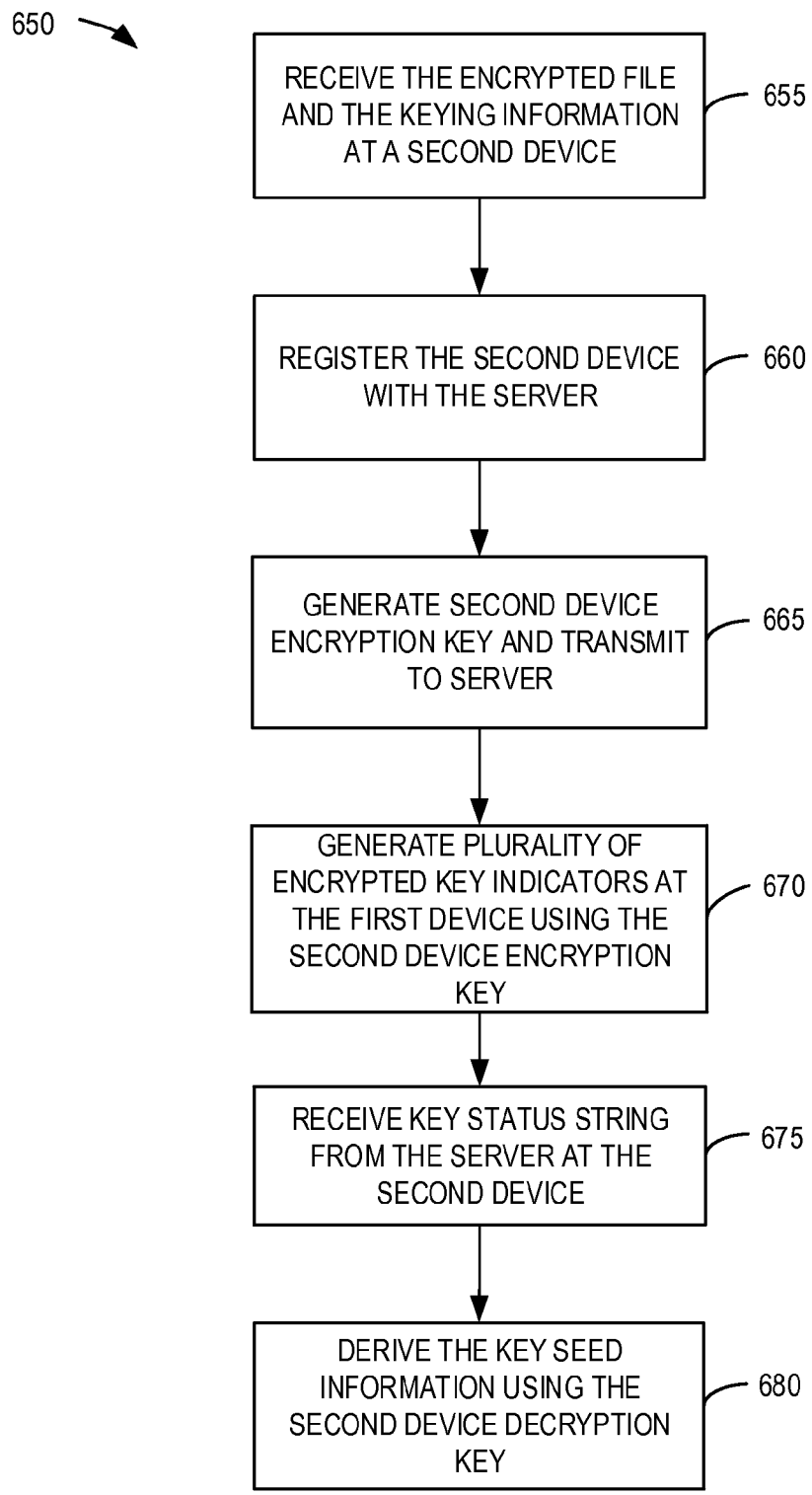
FIG. 6C shows a flowchart of another example embodiment of a method for decrypting a file.

The above description explains various embodiments of how the plurality of key indicators, plurality of key seeds, and thereby the encryption keys can be synchronized on a multiple devices using a server 230. Some example embodiments of the encryption and decryption of files using the system 200 will now be described with reference to FIGS. 6A-6C. In the description of FIGS. 6A-6C, the operations will be described with reference to the first device 202a and second device 202b for clarity. However, in general, the operations performed by each of these devices 202a and 202b may be performed by any of the plurality of devices 202 having installed thereon an encrypted agent 204.

FIG. 6 shows an example method 600 that can be used by an encryption agent 204 to encrypt and store a file provided to the first device 202a.

At 605, a file to be encrypted is provided to the first device 202a. The file to be encrypted may be encrypted for storage on the first device 202a, for transmission to a cloud server for storage, for transmission to a second device 202b (for example directly to the second device 202b through a network such as network 230, or through the cloud server, or otherwise transmitted to the second device) or other device or storage platform for encrypted storage, or decryption and review or editing.

At 610, one of the encryption keys can be derived from the key seed information stored on the first device 202a using keying information. The encryption key can be derived in various ways, as described above, such as by selecting a particular encryption key from a keystore using keying information indicating an index value of that particular encryption key, or by generating/deriving the particular encryption key from the key seeds corresponding to the key seed information stored on the first device 202a. The encryption key may be randomly selected when the encryption agent 204 receives an indication of the file to be encrypted.

At 615, the file can be encrypted using the derived encryption key. In some cases, the derived encryption key may be erased from the first device 202a after the file is encrypted.

At 620, the encrypted file can then be stored to the non-volatile memory of the first device 202a. The keying information used to derive the encrypted file can also be stored with the encrypted file.

In some cases, the encrypted file need not be stored to the first device 202a. For example, the encrypted file may be transmitted to another device 202 or to a cloud server along with the keying information. In some embodiments, the file and the encrypted file can be erased from the first device 202a after transmission.

FIG. 6B shows an example method 630 that can be used to decrypt an encrypted file in accordance with some embodiments. At 635, the encrypted file and the keying information are received at the second device 202b.

At 640, the second device 202b can derive the encryption key from the key seed information stored in the non-volatile memory of the second device 202b using the received keying information. In some embodiments, the encryption key can be derived by the second device 202b in many different ways, such as the example methods described above, depending on the nature of the key seed information stored on the second device 202b.

At 645, the second device 202b can decrypt the encrypted file using the encryption key derived at 640. The user of the second device 202b can then access the file for review and/or modification or any of the other file related actions described above. In some embodiments, the decrypted file may be stored in plaintext in the volatile memory of the second device 202b, and erased from the volatile memory when the user has completed the desired actions. The decrypted file may also be stored to the non-volatile memory of the second device 202b, after being encrypted using a derived encryption key (the same or a new key), along with keying information.

FIG. 6C shows an example method 650 for decrypting the encrypted file when a different user is in control of the second device 202b. In the description of method 650, the first user 240 may be considered to be a plurality of users. The plurality of users can include an administrative user in control of the first device 202a and a second user in control of the second device 202b.

In general, the encryption of a file prior to method 650 may proceed according to method 600 described above. The first device 202a can derive one of the encryption keys from the key seed information using keying information, encrypt the file as an encrypted file using the derived encryption, and transmit the encrypted file and keying information to the second device 202b. In some embodiments of method 650, the encrypted file and keying information may be sent to the second device 202b with a second user authorization, which will be discussed below.

At 655, the encrypted file and the keying information are received at the second device 202b. To decrypt the encrypted file, an encryption agent 204 installed on the second device 202b can derive the encryption key from key seed information stored in the non-volatile memory of the second device 202b and can then decrypt the encrypted file using the derived encryption key.

However, in some embodiments, the second device 202b may receive the encrypted file prior to key seed information being generated on the second device 202b. Nonetheless, embodiments of the systems and methods described herein may enable the second device 202b to decrypt the encrypted files even if they are received prior to installing an encryption agent and/or registering the second device 202b with the server 230.

The administrative user may transmit a second user authorization to the second user by transmitting a second user identifier to the server 230, e.g. using one of the devices associated with the administrative user, or otherwise. The server 230 may then generate a second user server authorization based on the second user identifier and a second user password. The second user password may be a temporary password assigned by the server 230 to a user associated with the second user identifier (i.e. the second user). The second user server authorization may generally indicate to the server 230 that the second user, once authenticated, can be provided with access to the first account.

The server 230 can also generate second user registration information based on the second user identifier and a second user password. The second user password can then be used by the second user when the second user registers the second device 202b with the server 230. The second user registration information can be stored in the non-volatile memory of the server 230.

At 660, the second user, after receiving the second user server authorization, can register the second device 202b with the server 230. In some cases, the second user may install an encryption agent 204 on the second device 202b during the registration process (or one may already be installed thereon). The second user may register with the server 230 in association with the first user account, and may also register the second device 202b with the first user account. This may allow the second device 202b (or other devices of the second user) to access the key status string stored in the non-volatile memory of the server 230 (after being authenticated).

The second user may then input a putative second user password (i.e. the user attempts to input the second user password) at the second device 202b. The encryption agent 204 of the second device 202b can generate putative second user registration information based on the second user identifier and the putative second user password. The putative second user registration information can then be transmitted to the server 230.

The server 230 can compare the putative second user registration information with the stored second user registration information. The server 230 may authenticate the second device 202b for the first account only if the putative second user registration information corresponds to the stored second user registration information. The server 230 may provide the second device with access to the key status string for the first account if and only if the second device 202b is authenticated for the first account.

However, if the second device 202b was not previously registered with the first account and/or the second device encryption key for the second device 202b was not previously known to the first device 202a, the key status string stored in the first account may not provide sufficient information for the second device 202b to determine the plurality of key indicators and thereby the encryption key. In some embodiments, to avoid such issues the first device 202a may generate a user-specific portion of the key status string for the second user.

At 665, the second device 202b can generate a second device encryption key. The second device 202b may generate a second device decryption key and generate the second device encryption key based on the second device decryption key. In some embodiments, the second device decryption key may be the second user's private key, also referred to as a user-specific private key (which can be generated similar to the private key $K_0$ as mentioned above), and the second device encryption key may be the second user's public key, also referred to as a user-specific public key (which can be generated similar to the public key $\gamma$ mentioned above). The second device 202b can transmit the second device encryption key to the server 230.

The server 230 can store the second device encryption key for the second device 202b in a second user account for the second user. The server 230 may also provide the second device encryption key for the second device 202b to the first device 202a to assist the encryption agent 204 on the first device 202a in generating the plurality of encrypted key indicators. For example, the server 230 may store the second device encryption key for the second device 202b in the account data of the first account as a user-specific public key for the second user.

At 670, the first device 202a can generate a plurality of encrypted key indicators from the plurality of key indicators stored thereon using the second device encryption key for the second device 202b received from the server 230. For example, the first device 202a may generate the plurality of encrypted key indicators to include a plurality of user-specific encrypted key indicators using the user-specific public key for the second device 202b.

The first device 202a can transmit the plurality of user-specific encrypted key indicators for the second user to the server 230. The server 230 can generate a user-specific string portion (for the second user) in the key status string (of the first account) based on the plurality of user-specific encrypted key indicators for the second user. The server 230 may authenticate the second device 202b, and authenticate the second user prior to providing the encryption agent 204 on the second device 202b with access to the key status string for the first account. The server 230 can provide the second device 202b with access to the user-specific portion of the key status string for the second user (stored in the first account) if and only if the second device 202b is authenticated for the first account.

At 675, once the second device 202b is registered and authenticated for the first account (and the second user has been verified/authenticated at the second device 202b, e.g. using a verification code as described above) the second device 202b can receive the key status string (or the second user-specific portion of the key status string).

At 680, the encryption agent 204 on the second device 202b can then derive the key seed information from the second user-specific portion of the key status string using the second device decryption key, in generally the same manner as described above. The encryption agent 204 on the second device 202b can then derive the encryption key from the key seed information using the received keying information, and decrypt the encrypted file.

Procedure of CRKG with Verification Code Recovery

In some embodiments of CRKG described above, if the first user 240 forgets his verification code C, the system 200 may not be able to recover it (or it may be computationally infeasible to recover). In some cases, this may be a desirable property to ensure the security of system 200. However, this may cause problems to the first user 240 if the verification code C is forgotten.

In some embodiments described in this subsection, embodiments of the CRKG process described above may be modified slightly to enable recovery of a lost or forgotten verification code C. Some embodiments allow the verification code to be recovered through collaboration between the first user 240, one or more encryption agents 204 on the devices 202, and the Q-Server 230 or a remote service provider server. These embodiments may still maintain the same level of security as before.

In some embodiments, in addition to Q-Server 230, encryption agents 204, and the first user 240, a separate remote service provider server may also be used. The remote service provider server may be associated with the service provider providing the system 200. However, in other embodiments it may not be necessary for an additional server to be used. Although for simplicity specific embodiments of the verification code recovery system and method are described below in combination with the automatic synchronization system 200, the verification code systems and methods described herein may also be used in other systems or methods for recovering a verification code defined by a user on a device controlled by the user.

Figure 9:
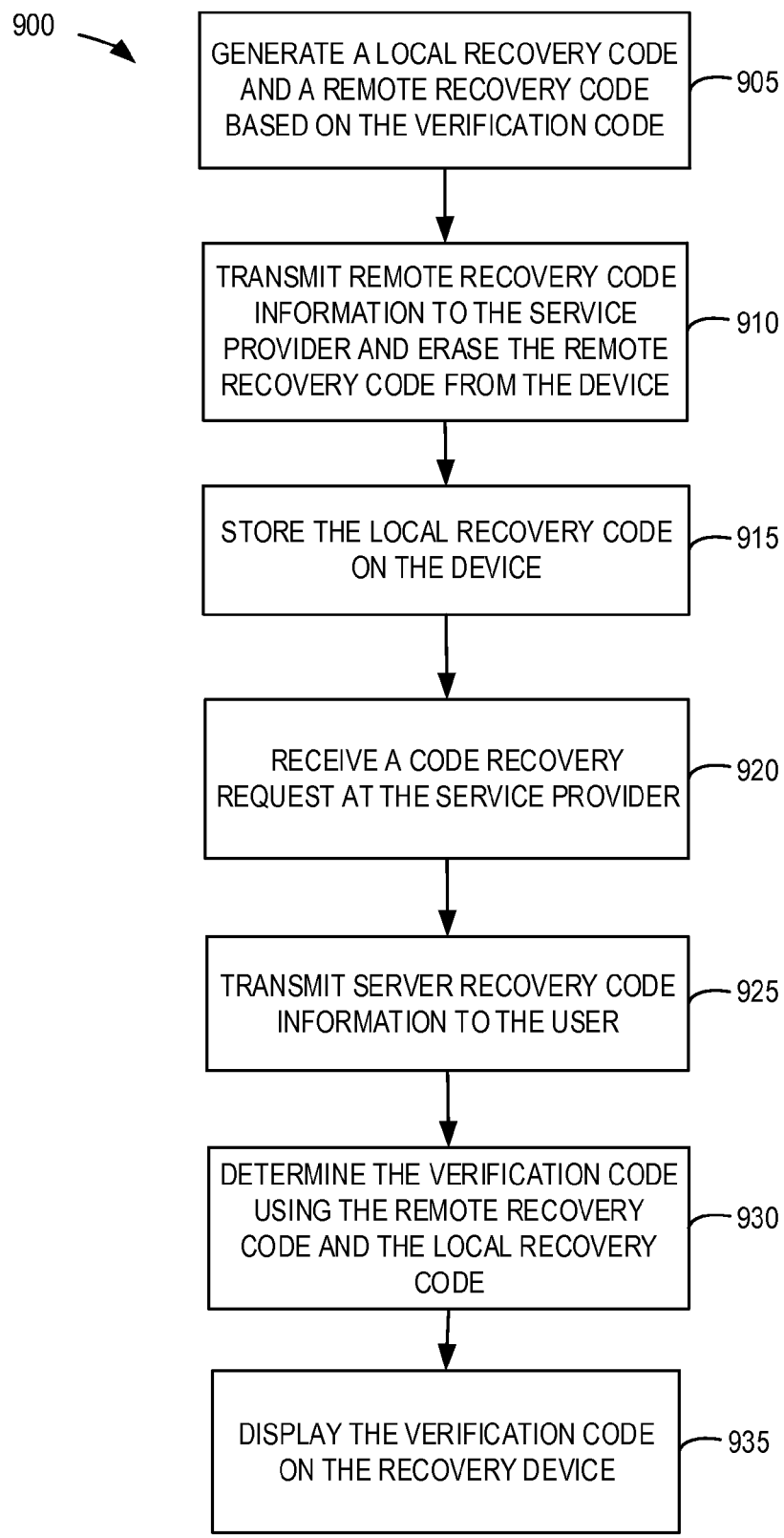
FIG. 9 shows a flowchart of an example embodiment of a method for recovering a verification code.

FIG. 9 shows an example method for recovering a verification code defined by a user in an encryption agent installed on at least one device controlled by the user. Each device can be configured for communication with a remote service provider server. For clarity of understanding the description of FIGS. 9 and 10 that follows will be described in reference to the first user 240 being a single user in control of the plurality of devices 202. As well, in the description that follows the remote service provider server may be separate from the server 230, or it may be the same server 230.

At 905, for each device the encryption agent 204 can generate a local recovery code based on the verification code and a remote recovery code based on the verification code. The verification code can be determined from a combination of the local recovery code and the remote recovery code, but is not determinable from the remote recovery code alone.

For each device 202, the encryption agent 204 installed on that device can generated a plurality of codewords from the verification code. The plurality of codewords can be generated such that the verification code is determinable from all of the codewords in the plurality of codewords, but is not determinable from less than all of the codewords. The encryption agent 204 may generate the local recovery code using the plurality of codewords. The local recovery code can include a one-way function value generated from the verification code. For example, the local recovery code may be the encrypted local code described above. Thus, in some embodiments, the encryption agent 204 may generate the local recovery code by computing $\beta=\phi(C)$, i.e. $\beta=(\beta 1, \beta 2)=(\alpha^{C_1}C_2, \alpha^{C_2})$. The encryption agent 204 may also generate the remote recovery code using the plurality of codewords.

Figure 10:
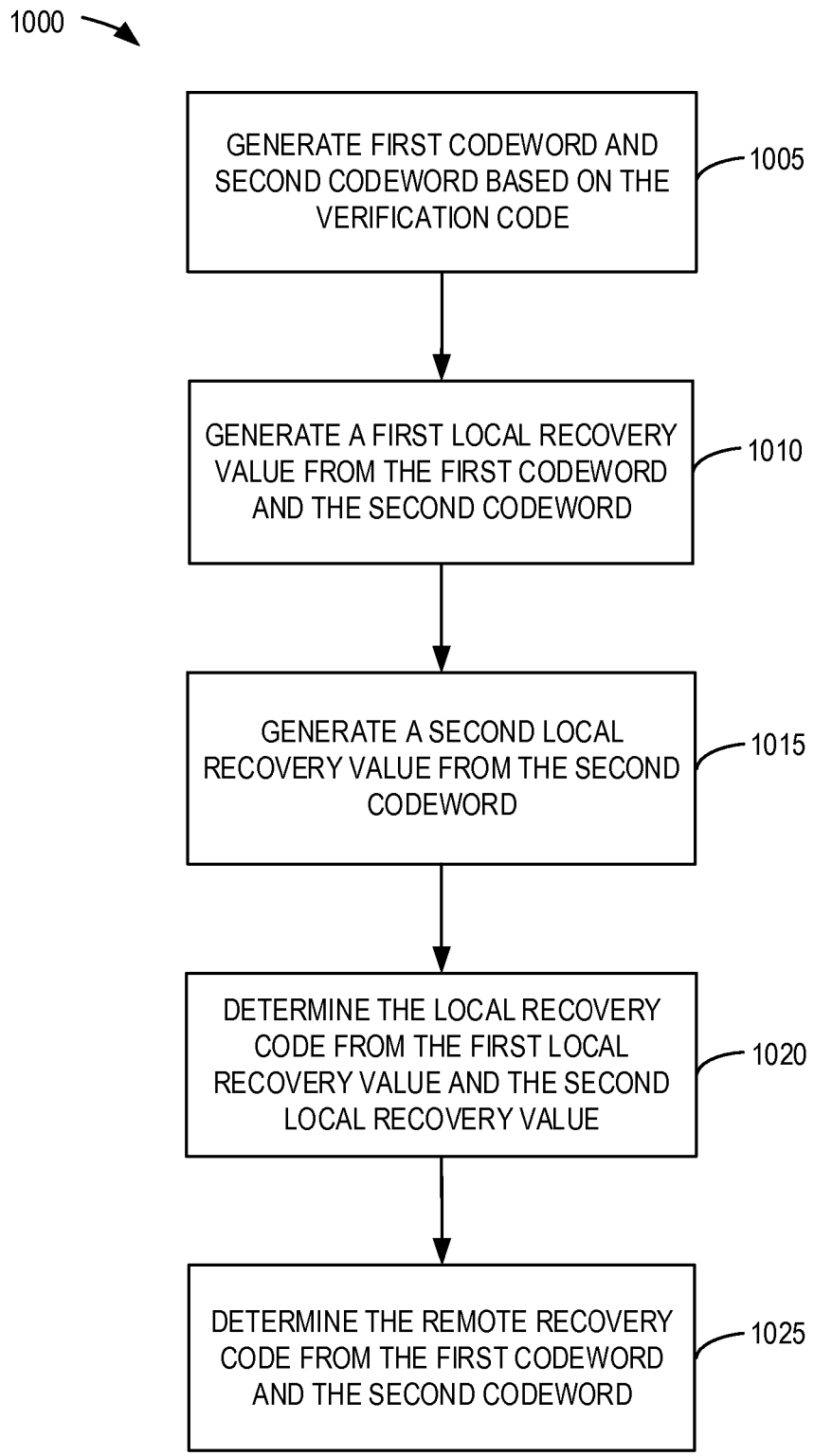
FIG. 10 shows a flowchart of an example embodiment of a method for generating local and remote recovery codes that may be used with the verification code recovery method of FIG. 9.

An example method for generating the local recovery code and the remote recovery code will now be described with reference to FIG. 10. Method 1000 is an example of a method for generating a local recovery code and a remote recovery code in accordance with an embodiment.

At 1005, the encryption agent 204 can generate a first codeword and a second codeword based on the verification code. The plurality of codewords mentioned above may include the first codeword and the second codeword. The encryption agent can generate the first and second codeword such that the verification code is determinable from a combination of the first codeword and the second codeword, but is not determinable from either of the first codeword and the second codeword alone.

In the specific example given above, the encryption agent 204 may convert the verification code C into a first codeword $C_1$ and a second codeword $C_2$ via $f(C)=(C_1, C_2)$. In some embodiments, the conversion may be done via a one to one function $f$ such that both $C_1$ and $C_2$ look like random numbers from GF(N).

At 1010, the encryption agent 204 can generate a first local recovery value from the first codeword and the second codeword. The first local recovery value can be generated such that neither of the first codeword and the second codeword is determinable from the first local recovery value alone. For example, the first local recovery value may be generated by multiplying the second codeword (e.g. $C_2$) with the integer $\alpha$ (where $\alpha$ is an integer greater than 1) raised to the power of the first code word (e.g. $\alpha^{C_1}$). Thus, in some embodiments, the first local recovery value can be generated as $\beta_1=\alpha^{C_1}C_2$.

At 1015, the encryption agent 204 can generate a second local recovery value from the second codeword. The second codeword may be a discrete logarithm of the second local recovery value with a base $\alpha$. Thus, although in some embodiments the second codeword may be determinable from the second recovery value, the second codeword may be computationally infeasible to determine as a result of the difficulty associated with calculating discrete logarithms. For example, the second local recovery value may be determined as $\beta_2=\alpha^{C_2}$.

At 1020, the encryption agent 204 may determine the local recovery code from the first local recovery value and the second local recovery value. For example, the local recovery code may include the first local recovery value and the second local recovery value.

At 1025, the encryption agent 204 may generate the remote recovery code based on the first codeword and the second codeword. The remote recovery code can be generated such that neither of the first codeword and the second codeword is determinable from the remote recovery code alone. In some embodiments, the remote recovery code can be generated by multiplying $\alpha$, raised to the power of the second codeword, with the first codeword (e.g. $\alpha^{C_2}C_1$).

Referring again to FIG. 9, at 910 the encryption agent 204 can determine remote recovery code information based on the remote recovery code. The encryption agent 204 can transmit the remote recovery code information to the remote service provider server and erase the remote recovery code from the device.

In some cases, the remote recovery code information may be a modified and/or encrypted version of the remote recovery code generated at 905. In some embodiments, the remote service provider may generate a private service provider key and a public service provider key based on the private service provider key. The service provider server can store the private service provider key in the non-volatile memory of the service provider server. The service provider can also provide the public service provider key to each of the devices 202. For example, the service provider server may generate the private service provider key by choosing a secret random number $\lambda$ from $\{1, 2, \ldots, N-1\}$ and make a public service provider key $\alpha^\lambda$ public.

The encryption agent 204 on the first device 202a can then determine the remote recovery code information by generating an encrypted remote recovery code based on the remote recovery code using the public service provider key. The encryption agent 204 can then transmit the encrypted remote recovery code to the remote service provider. For example, the encryption agent 204 may compute $\hat{\beta}_0 = (\alpha^{\lambda \cdot Y} \alpha^{C_2} C_1, \alpha^Y)$, using the public service provider key and an independent random number Y from $\{1, 2, \ldots, N-1\}$. The encryption agent 204 may send $\hat{\beta}_0$ to Q-Server 230, which can in turn pass $\hat{\beta}_0$ along with the first user identifier to the remote service provider server. In some embodiments, the server 230 may erase the remote recovery code information after transmitting the remote recovery code information to the remote service provider server that there is no mark on $\hat{\beta}_0$ on Q-Server 230. In other cases, the encryption agent 204 may send the remote recovery code information to the remote service provider server directly or through a side channel.

In some embodiments, the remote recovery code information can be a device specific recovery code. The encryption agent 204 can randomly generate a device specific remote code modifier. The encryption agent 204 can then modify the remote recovery code using the device specific remote code modifier to generate the remote recovery code information. The encryption agent can store the device specific remote code modified in the non-volatile memory of the first device 202a. In some cases, the encryption agent 204 may also encrypt the modified remote recovery code, e.g. using the process described above.

For example, the encryption agent 204 may further randomize the remote recovery code $\alpha^{C_2} C_1$ by replacing $\alpha^{C_2} C_1$ with $D(\alpha^{C_2} C_1, X)$ in $\hat{\beta}_0$. The encryption agent 204 may determine the device specific code modifier X as a random number from $\{1, 2, \ldots, N-1\}$. The device specific code modifier X can be generated independently by each encryption agent 204 and saved in the non-volatile memory of the respective device 202.

In some embodiments, where the first user 240 is in control of a plurality of devices, the service provider server may maintain several versions of device specific remote recovery codes (e.g. multiple versions of $\hat{\beta}_0$), one from each encryption agent 204 of the first user 240. The service provider server may store a device identifier for the remote recovery code information for each device, where the device identifier identifies the device 202 corresponding to that remote recovery code information.

Due to the difficulty of computing discrete logarithms, Q-Server 230 and the service provider server either alone or together may have a hard time determining the verification code C, and in particular the first recovery codeword $C_1$, from the encrypted server code (e.g. $D(\hat{\beta})$) and the remote recover code information (e.g. $\hat{\beta}_0$). As such, Q-Server 230, the encryption agent 204, and the service provider server each alone may not be able to recover C (without significant resources, rendering the recovery computationally feasible in many embodiments). In some embodiments, the verification code C can be recovered through collaboration between the encryption agent 204 on a recovery device associated with the first user 240, the service provider server, and the first user 240.

At 915, the encryption agent 204 can store the local recovery code on a non-volatile memory of the first device 202a. In general, the encryption agent 204 on each device can store the local recovery code on the non-volatile memory of that device. As well, as mentioned above, each device may also store the device-specific remote code modifier for that device in the non-volatile memory of that device.

At 920, the service provider server can receive a code recovery request. The service provider server may also authenticate the first user. An example method that can be used in some embodiments to authenticate the user will be described in detail further below with reference to FIG. 11. In response to receiving the code recovery request, and only after the authenticating the user, the service provider server can determine server recovery code information based on the remote recovery code information stored in the non-volatile memory of the service provider server.

In some embodiments, the first user 240 may send a temporary user key to the service provider server. For example, the first user 240 can send a temporary key, say K, to the service provider of the system 200. The service provider can then generate the server recovery code information by encrypting the remote recovery code information using the temporary key. For example, service provider server can use K to encrypt $\alpha^{C_2} C_1$ into $E_K(\alpha^{C_2} C_1)$, and then sends $E_K(\alpha^{C_2} C_1)$ to first user 240 in a side channel or through the channel between encryption agents 204 and the Q-Server 230.

As mentioned above, in some embodiments the remote recovery code information is an encrypted remote recovery code generated from the remote recovery code using the public service provider key. In such embodiments, the service provider server can decrypt the encrypted remote recovery code (e.g. $\hat{\beta}_0$) stored for the recovery using the private service provider key (e.g. $\lambda$). The service provider server can then determine the server recovery code information based on the decrypted remote recovery code.

As mentioned above, in some embodiments, the remote recovery code information may include a device-specific modified remote recovery code. The code recovery request received at the service provider server may include a recovery device identifier identifying the recovery device. The remote service provider server may determine the server recovery code information for the recovery device by identifying the stored remote recovery code information corresponding to the recovery device using the received recovery device identifier and the stored device identifiers. The service provider server can then determine the server recovery code information from the identifier recovery code information. As will be apparent to a skilled reader, in some embodiments, features of the various examples for generating the remote recovery code information and the server recovery code information may be used in combination with one another or with other methods for secure transmission of data.

At 925, the server 230 can transmit the server recovery code information to the first user 240. As mentioned above, the server recovery code information may be transmitted to the first user 240 in various ways, such as through a side channel or directly to the recovery device (e.g. through server 230). In some embodiments, the first user 240 can provide the server recovery code information to any of the devices 202 and use that device as the recovery device. For example, the first user 240 may input the server code information $E_K(\alpha^{C_2} C_1)$ and the temporary key K to any of his registered encryption agents 204. In other embodiments, e.g. those using device-specific remote recovery code information, the server recovery code information may only be provided to the recovery device associated with the device-specific remote recovery code information based on which the server recovery code information was generated.

At 930, the encryption agent 204 on a recovery device 202 can receive the server recovery code information. The encryption agent 204 can determine the remote recovery code from the server recovery code information and determine the verification code using the remote recovery code and the local recovery code.

In some cases, the encryption agent 204 may determine the remote recovery code from the server recovery code information using the device specific remote code modifier stored in the non-volatile memory for the recovery device. In some such embodiments, the encryption agent 204 on the recovery device should be the one containing the corresponding random number X.

For example, the encryption agent 204 can compute ($C_1$, $C_2$) from the remote recovery code (e.g. $\alpha^{C_2}C_1$) and the local recovery code ($\beta=(\beta_1, \beta_2)=(\alpha^{C_1}C_2, \alpha^{C_2})$). The encryption agent 204 can determine an inverse remote recovery code (e.g. $\alpha^{-C_2}$) from the second local recovery value (e.g. $\alpha^{C_2}$). The encryption agent 204 can then determine the first codeword ($C_1$) using the inverse remote recovery code and the remote recovery code. Multiplying the inverse remote recovery code (e.g. $\alpha^{-C_2}$) with the remote recovery code (e.g. $\alpha^{C_2}C_1$) can provide the first codeword ($C_1$). The encryption agent 204 can then determine the second codeword using the first codeword and the first local recovery value. For example, the encryption agent 204 can determine $\alpha^{-C_1}$ and determine the second codeword ($C_2$) by multiplying $\alpha^{-C_1}$ and $\alpha^{C_1}C_2$. The encryption agent 204 can then determine the verification code using the first codeword and the second codeword.

At 935, the encryption agent 204 can display the verification code on the recovery device 202. The first user 240 can then use the verification code to access files stored by the encryption agent on any of the devices 202 associated with the first user 240.

In some embodiments, the encryption agent 204 can validate the remote recovery code received from the remote service provider server. This may be useful if the first user 240 is unable to use the verification code determined at 930 to access and/or decrypt files stored in the encryption agent 204 on the devices 202. For example, this may occur if the remote recovery code is modified or corrupted by the remote service provider. This may allow the first user 240 to prove that the effective loss of data that occurs because the files cannot be decrypted is the result of fault on the part of the service provider server. Any modifications on the remote recovery code will change the value of the first codeword ($C_1$) determined at 930 and in turn the value of the second codeword ($C_2$), which will then be inconsistent with the second local recovery value $\alpha^{C_2}$ stored locally.

The encryption agent 204 may generate a putative local recovery code using the remote recovery code determined from the server recovery code information and the local recovery code. The encryption agent 204 may generate the putative local recovery code by determining a putative verification code using the example methods described above at 930. The encryption agent 204 can then compute a putative local recovery code from the putative verification code using the same method as was used to generate the stored local recovery code from the verification code.

The encryption agent 204 can compare the putative local recovery code to the local recovery code stored in the non-volatile memory of the recovery device. The encryption agent 204 may validate the remote recovery code determined from the server recover code information if and only if the putative local recovery code matches the stored local recovery code.

In some embodiments, the encryption agent 204 can generate a putative second local recovery value using the remote recovery code determined from the server recovery code information and the local recovery code. The encryption agent 204 can compare the putative second local recovery value to the second local recovery value stored in the non-volatile memory of the recovery device. The encryption agent 204 may validate the remote recovery code determined from the server recover code information if and only if the putative second local recovery value matches the stored second local recovery value.

Figure 11:
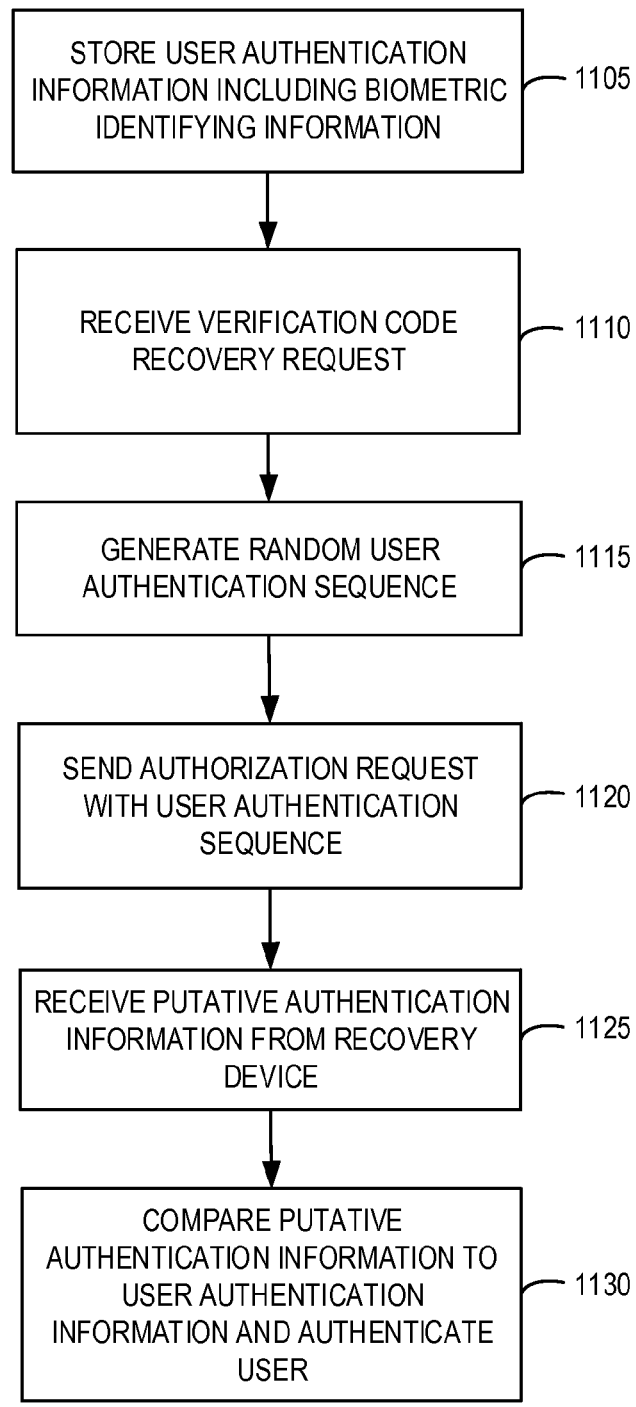
FIG. 11 shows a flowchart of an example embodiment of a method for remotely authenticating a user.

In some embodiments, the authentication of the first user 240 (or any other user) can be achieved remotely using method 1100 shown in FIG. 11. Method 1100 is an example of a method that can be used to remotely authenticate a user.

At 1105, the server 230 stores user authentication information for the first user 240 in the non-volatile memory of the service provider server. The user authentication information may include biometric identifying information of the first user 240. The first user 240 may provide the biometric identifying information through the encryption agent 204 on one of the devices 202 controlled by the first user 240. The biometric identifying information can be provided to the service provider of the system 200 through the encryption agent 204 and Q-Server 230 or through a side channel.

In some embodiments, biometric identifying information of the user may include at least one of an audio recording of the user, a video recording of the user, an image of the user, a fingerprint, a palm print, a retinal scan. In some cases, the biometric identifying information of the user 240 can include a plurality of biometric identification types. In some cases, the plurality of biometric identification types may include an audio recording of the user and at least one of an image of the user's face and a video of the user's face.

For example, during the procedure of CRKG, the first user 240 may be asked to provide a true front-facing photo or video clip of the first user 240. The first user 240 may also be asked to provide an audio clip recording the first user 240's voice. The audio clip may include a recording of the first user 240's voice for a plurality of authentication codewords. For example, the authentication codewords may be numbers 0 to 9.

At 1110, the service provider server can receive a verification code recovery request. The verification code request may be similar to the code recovery request described above at 920 of method 900.

At 1115, the service provider server may generate a user authentication sequence. The service provider server may generate the user authentication sequence randomly in response to receiving the verification code recovery request. The service provider server can also store the user authentication sequence in the user authentication information for the user. The service provider server can also determine a sequence validity period.

In some embodiments, upon receiving the first user 240's request for the recovery of verification code C, the service provider server, through one of first user 240's encryption agents 204, generate a random user authentication sequence for first user 240.

For example, the user authentication sequence may include a random sequence of codewords generated based on the plurality of authentication codewords stored at 1105. The first user 140 may then be required to perform the user authentication sequence by speaking a verbal audio code. In other examples, the user authentication sequence may include a sequence of finger orientations, and the user must perform the user authentication sequence by using fingerprints and finger orientations corresponding to the user authentication sequence. Another example user authentication sequence may be related to the typical keystroke rhythm of the user, and the user must perform the user authentication sequence by typing out a randomly generated codeword. Another example user authentication sequence may be related to the user's image, and the user must perform the user authentication sequence by waving their arms to spell out a randomly generated codeword in semaphore. Another example user authentication sequence may include a randomly generated sequence of blinks that the first user 240 could then perform while having retinal scans performed.

At 1120, prior to transmitting the sever recovery code to the first user 240, the remote service provider server may transmit an authorization request to the recovery device. The authorization request can include the user authentication sequence generated at 1115. For example, the authorization request may prompt the first user 240 to use an encryption agent 204 to take a short selfie video clip while speaking loudly the random sequence of codewords.

At 1125, the recovery device can receive putative authentication information. The recovery device can transmit the putative authentication information to the remote service provider server. The putative authentication information can comprise a performance of the user authentication sequence, by the putative user. The putative authentication information can also include putative biometric identifying information identifying the putative user as a result of the performance. For example, the putative authentication information may include a video recording of a putative user's face coincident with an audio recording of the putative user speaking a putative audio code. In other words, the user may take a short selfie video clip while speaking loudly the random sequence of codewords using the recovery device and then transmit the video clip to the remote service provider server. In other embodiments, the putative authentication information may include a short selfie video clip of the user waving the arms to spell out a randomly generated codeword in semaphore. Another example putative authentication information may include the timing of the user's keystrokes as the user types out a randomly generated codeword.

At 1130, the remote service provider server can compare the putative authentication information to the user authentication information stored on the non-volatile memory of the service provider server. The putative authentication information may correspond to stored user authentication information only if the putative authentication information includes the user authentication sequence. The service provider server may transmit the server recovery code information to the first user 240 if and only if the putative authentication information corresponds to the stored user authentication information.

In a specific embodiment described above, the putative authentication information may correspond to the stored user authentication information if and only if: the putative user's face corresponds to at least one of the image of the user's face and the video of the user's face; the audio recording of the putative user corresponds to the audio recording of the user; and the putative audio code corresponds to the verbal audio code. For example, if the uploaded audio-video clip corresponds with the random code and the photo/video and audio clip stored at the service provider server for the first user 240, the first user 240 may then be deemed authenticated.

In some embodiments, the service provider server may also generate a sequence validity period for the user authentication sequence. The sequence validity period may be provided to the first user 240 in the authorization request. The putative authentication information may correspond to the stored user authentication information only if the putative authentication information comprising the user authentication sequence is received within the sequence validity period. In effect the sequence validity period may correspond to a time-out for the particular random authentication sequence.

In the specific example given, if the audio-video recording action is completed within a limited allowed time period (the sequence validity period) immediately after the generation of the random code, the recorded audio-video clip can be deemed valid. Otherwise, a new random code (user authentication sequence) can be generated and the audio-video recording action (generation of putative authentication information) can be repeated.

Although method 1100 has been described in the context of a verification code recovery implementation, aspects of the remote authentication method 1100 can also be applied to authenticate users in various other circumstances. For example, in some embodiments step 1110 can be replaced by any request for information or registration or an authentication initiation sequence in general. Then, the remaining steps of method 1100 may be used to remotely authenticate a user.

In the description that follows, embodiments of system 200 may be referred to as QSSAS without verification code recovery (QSSAS-NR) if embodiments of the procedure of CRKG without verification code recovery are implemented, and embodiments of system 200 may be referred to as QSSAS with verification code recovery (QSSAS-R) if embodiments of the procedure of CRKG with verification code recovery are adopted.

Procedure of AVCC

Whenever the need arises, the first user 240 may change the verification code C through any running encryption agent 204 on one of those L devices 202 at the state ROU. Again, we use the encryption agent 204 on the first device 202$a$ as an example. In some embodiments, the procedure of AVCC can work as follows:

The first user 240 inputs a new verification code denoted by $C''$ into the encryption agent 204 on the first user device 202$a$. The encryption agent 204 determines an updated encrypted local code and replaces the currently stored encrypted local code (e.g. the encryption agent computes $\beta'' = (\beta_1'', \beta_2'') = (\alpha^{C_1''} C_2'', \alpha^{C_2''})$ and updates the locally saved $\beta$ into $\beta''$).

In the case of QSSAS-NR, the encryption agent 204 sends an update encrypted server code $\hat{\beta}'' = (\hat{\beta}_1'', \hat{\beta}_2'') = (\alpha^{C_1'' C_2''}, \alpha^{C_1''})$ to Q-Server 230, which in turn updates its locally saved server encrypted server code $D(\hat{\beta})$ into $D(\hat{\beta}'')$. In the case of QSSAS-R, the encryption agent 204 computes $\hat{\beta}''$ and an updated remote recovery code. In the example where the service provider provides a service provider public key, the updated remote recovery code may be determined as $\hat{\beta}_0''$, $(\alpha^{\lambda Y} \alpha^{C_2''} C_1'', \alpha^Y)$, where Y is a new independent random number from $\{1, 2, \ldots, N-1\}$ and $\lambda$ is the service provider private key. The encryption agent 204 can send $\hat{\beta}''$ and $\hat{\beta}_0''$ to Q-Server 230, which in turn updates its locally saved $D(\hat{\beta})$ into $D(\hat{\beta}'')$ and passes the updated remote recovery code $\hat{\beta}_0''$ to the service provider of the system 200 to update $\hat{\beta}_0$ into $\hat{\beta}_0''$.

The encryption agent 204 can use the existing verification code C to decrypt $E_C(X_0, X_1, \ldots, X_i)$ and generate new encrypted key indicators based on the updated verification code. The updated encrypted key indicators can be transmitted to the server 230 to update the key status string. In the ElGamal example embodiment, the encryption agent 204 can generate independently new random numbers $Y_j$, j=0, 1, 2, . . . , i, where each new random number is uniformly distributed over $\{1, 2, \ldots, N-1\}$, compute $\epsilon_j''=(\hat{\beta}_2'')^{Y_j}X_j$ and $\mu_j''=\alpha^{Y_j}$, $j=0, 1, 2, \ldots, i$, and then send $(\epsilon_j'', \mu_j'')$, $j=0, 1, 2, \ldots, i$, to Q-server, which in turn updates the key status string from $S=1\epsilon_0\mu_0 \ldots \epsilon_i\mu_i$ to $S=1\epsilon_0''\mu_0'' \ldots \epsilon_i''\mu_i''$.

The encryption agent 204 can use the existing verification code C to decrypt $E_C(K_0, K_1, \ldots, K_i)$, use the updated verification code C'' to re-encrypt $(X_0, X_1, \ldots, X_i)$ and $(K_0, K_1, \ldots, K_i)$, and finally overwrite $E_C(X_0, X_1, \ldots, X_i)$ and $E_C(K_0, K_1, \ldots, K_i)$ with $E_{C''}(X_0, X_1, \ldots, X_i)$ and $E_{C''}(K_0, K_1, \ldots, K_i)$, respectively.

At the end of AVCC procedure, the consistent properties Eq. (1) to Eq. (6) can remain valid between the encryption agent 204 on first user device 202a and Q-Server 230 with respect to the new verification code C''.

Procedure of VCU

After first user 240 changes the verification code through the encryption agent 204 on first user device 202a, the consistent properties Eq. (3) and Eq. (4) may not be valid any more between any of the other encryption agents 204 of first user 240 and Q-Server 230. If those encryption agents 204 are running and communicate with Q-Server 230, in some embodiments they can automatically log themselves out. In such cases, each encryption agent 204 may request the first user 240 to update the verification code after the verification code change is detected. Take the encryption agent 204 on the second device 202b as an example. The procedure of VCU can work as follows:

1) The encryption agent 204 on the second device 202b asks the first user 240 to input the correct user name, password, old verification code C, and PIN R.

2) The encryption agent 204 on the second device 202b uses C to decrypt $E_C(X_0, X_1, \ldots, X_i)$ and $E_C(K_0, K_1, \ldots, K_i)$.

3) The encryption agent 204 on the second device 202b asks the first user 240 to input the new verification code C''.

4) The encryption agent 204 on the second device 202b then computes $\hat{\beta}$ corresponding to C'' and sends it to Q-Server to check its consistency with $D(\hat{\beta})$ saved at Q-Server.

If the consistency test above in Step 4) is successful, then the encryption agent 204 on the second device 202b accepts the first user 240's input C'' as the correct new verification code; otherwise, Steps 3) and 4) would be repeated until the consistency test above is successful.

The encryption agent 204 on the second device 202b then computes $\hat{\beta}''=(\alpha^{C_1''}C_2'', \alpha^{C_2''})$, updates its locally saved $\beta$ into $\beta''$, uses the new verification code C'' to re-encrypt $(X_0, X_1, \ldots, X_i)$ and $(K_0, K_1, \ldots, K_i)$, and finally overwrites $E_C(X_0, X_1, \ldots, X_i)$ and $E(K_0, K_1, \ldots, K_i)$ with $E_{C''}(X_0, X_1, \ldots, X_i)$ and $E_{C''}(K_0, K_1, \ldots, K_i)$, respectively.

At the end of VCU procedure, the consistent properties Eq. (1) to Eq. (6) can be valid again between the encryption agent 204 on the second device 202b and Q-Server 230 with respect to the new verification code C'', and the encryption agent 204 on the second device 202b can also be reset to state ROU.

Procedure of ANKG

In some embodiments, whenever the need arises, the first user 240 can request to generate a new set of FED key seeds through any running encryption agent 204 on one of those L devices 202 at the state ROU. Again, we use the encryption agent 204 on first user device 202a as an example. The procedure of ANKG can work as follows:

The encryption agent 204 generates an updated plurality of key indicators. For example, the encryption agent 204 may generate independently additional random numbers $X_j$ as the updated plurality of key indicators. The encryption agent 204 can encrypted the updated plurality of key indicators and transmit the encrypted updated plurality of key indicators to the server 230. The server 230 can then update the key status indicator using the encrypted updated plurality of key indicators.

In the ElGamal example, the encryption agent 204 also generates additional random numbers $Y_j$, $j=i+1, 2, \ldots, i+J$, where each random number is uniformly distributed over $\{1, 2, \ldots, N-1\}$, computes $\epsilon_j=\hat{\beta}_2^{Y_j}X_j$ and $\mu_j=\alpha^{Y_j}$, $j=i+1, 2, \ldots, i+J$, and then sends $(\epsilon_j, \mu_j)$, $j=i+1, 2, \ldots, i+J$, to Q-server 230, which in turn updates the key status string S by appending $\epsilon_{i+1}\mu_{i+1} \ldots \epsilon_{i+J}\mu_{i+J}$ to the right end of S, i.e., extending S from $S=1\epsilon_0\mu_0 \ldots \epsilon_i\mu_i$ to $S=1\epsilon_0\mu_0 \ldots \epsilon_{i+J}\mu_{i+J}$.

In the embodiments employing server key values, encryption agent 204 can send the key indicator amount to server 230, e.g. as a pair of integers (i+1,i+J) to Q-Server 230 to request Q-Server 230's assistance to generate a new set of FED key seeds.

Upon receiving the key indicator amount (e.g. the pair of integers (i+1, i+J)), Q-Server 230 can generate the server key values as described above. For example, the server 230 can generate the server key values based on $U_r, E(P_r)$, and its own secret key v as additional independent random numbers $V_{i+1}, V_{i+2}, \ldots, V_{i+J}$, where each additional random number is uniformly distributed over $\{1, 2, \ldots, N-1\}$, and send $V_{i+1}, V_{i+2}, V_{i+J}$ back to the encryption agent 204.

Based on the server key values $V_{i+1}, V_{i+2}, \ldots, V_{i+J}$ and the updated plurality of key indicators $X_{i+1}, X_{i+2}, \ldots, X_{i+J}$, the encryption agent 204 can generate a new set of FED key seeds $K_j=A(X_j, V_j)$, $j=i+1, i+2, \ldots, i+J$.

Finally, the encryption agent 204 can store key seed information based on the updated key seeds. For example, the encryption agent 204 can use the verification code C to encrypt $(X_{i+1}, X_{i+2}, \ldots, X_{i+J})$ and $(K_{i+1}, K_{i+2}, \ldots, K_{i+J})$ into $E_C(X_{i+1}, X_{i+2}, \ldots, X_{i+J})$ and $E_C(K_{i+1}, K_{i+2}, \ldots, K_{i+J})$, respectively, and save them in the non-volatile memory of the first user device 202a.

Once again, at the end of ANKG procedure, the consistent properties Eq. (1) to Eq. (6) can remain valid between the encryption agent 204 on the first user device 202a and Q-Server 230.

Procedure of PNKG

After a new set of FED key seeds is generated via the encryption agent 204 on first user device 202a, it can be detected by any of the other encryption agents 204 of first user 240 if that encryption agent 204 is running and in communication with Q-Server 230. Consequently, that encryption agent 204 (e.g. the encryption agent on the second device 202b) can automatically generate the same new set of FED key seeds for itself through its communication with Q-Server 230 via the procedure of PNKG. In general, the procedure of PNKG operates similar to the procedure of ANKG combined with the initial key seed synchronization procedure described above with reference to FIGS. 4B and 4C.

After detecting that a new set of FED key seeds has been generated by another encryption agent, the encryption agent 204 on the second device 202b can asks Q-Server 230 to send back the key status string $S=S_0S_1S_2 \ldots S_{2(i+J+1)-1}$ $S_{2(i+J+1)}=1\epsilon_0\epsilon_0 \ldots \epsilon_{i+J}\mu_{i+J}$.

The encryption agent 204 on the second device 202b can determine the plurality of key indicators $X_j$, $j=i+1, \ldots, i+J$, out of the key status string S by computing $X_{j-1}=S_{2j-1}$, $S_{2j}^{-C_1}$, $j=i+2, \ldots, i+J+1$ The encryption agent 204 on the second device 202b can then follow the general procedure of ANKG described above to complete the generation of the new set of FED key seeds for itself.

At the end of PNKG procedure, the consistent properties Eq. (1) to Eq. (6) can be valid again between the encryption agent on the second device 202b and Q-Server 230.

Alias

The first user 240 (or any other user for that matter) may communicate with others using many different user names such as different email addresses and phone numbers. In many applications (e.g., email and mobile communications), each of these user names often corresponds to its own unique account for the respective application, even though these user names and accounts belong to the same first user 240. In the case of system 200, however, this one to one correspondence between user names and accounts may not be desirable in some cases. In some embodiments, it may be preferable to have one QSSAS account per user per device. In some other embodiments, even if multiple QSSAS accounts per user per device are allowed, first user 240's files managed under one QSSAS account cannot be decrypted in general when the first user 240 logs into another QSSAS account on the same device 202, since different QSSAS accounts typically have different sets of FED key seeds, as described in the procedure of CRKG above.

To overcome the problems mentioned above, in some embodiments the notion of alias can be introduced to QSSAS to allow first user 240's multiple user names (i.e., aliases) to share the same QSSAS account and hence the same password, verification code, set of FED key seeds, and pair of private and public keys across those L devices 202 of first user 240. The first user 240 may be a single user in control of the plurality of devices 202. However, the first user 240 may have a plurality of user alias identifiers (e.g. multiple email addresses, social media usernames, phone numbers etc.). In some embodiments, each user alias identifier in the plurality of user alias identifiers can share the same account authentication information.

Each time when first user 240 adds a new user name (i.e., an alias) into first user 240's QSSAS account through any registered encryption agent 204 on one of those L devices, that alias can be recorded on that encryption agent 204, sent to Q-Server 230, which in turn saves it in first user 240's first user account, and that alias can subsequently be synced across all other registered encryption agents 204 on other devices 202 (existing or new) of first user 240 automatically.

In such embodiments, the first user 240 can log into first user 240's QSSAS account through any registered encryption agents 204 on those L devices 202 with any first user 240's alias. This can be particularly convenient when other people share encrypted files with the first user 240 through first user 240's different aliases. No matter which of the first user 240's alias is used for sharing encrypted files, they can all be decrypted when the first user 240 logs into any of the first user 240's registered encryption agents 204 with any first user 240 alias as long as those encrypted files can be made available to that respective device 202.

Extension of QSSAS for Group Sharing of Encrypted Files

Figure 7:
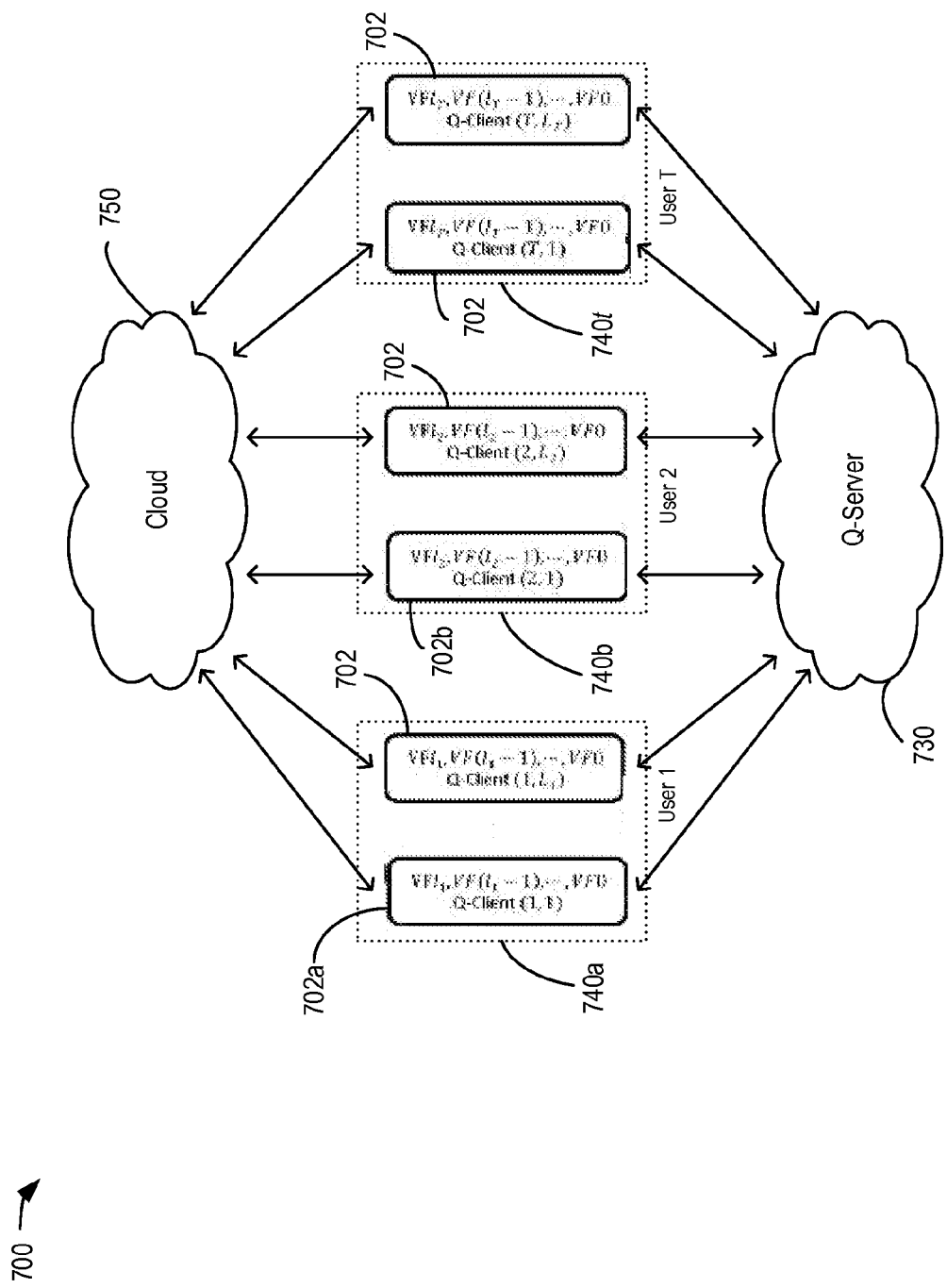
FIG. 7 shows a block diagram of a system that can be used to provide encryption and file sharing on a plurality of devices for a plurality of groups users in accordance with an embodiment.

Example embodiments will now be described that can provide group sharing of encrypted files between a plurality of groups users. FIG. 7 shows an example embodiment of a system 700 for providing encryption for a plurality of devices 702 configured for electronic communication with a server 730. System 700 is generally similar to systems 200 and 500 described above, but in system 700 the first user comprises a plurality of group users 740a-t. The plurality of group users 740 may include an administrative group user 740a and a second group user 740b.

Each of the group users 740 may have a user-specific account registered with the server 730. Each group user 740 can be in control of at least one of the devices 702. In the example shown in FIG. 7, the administrative group user 740a is in control of the first device 702a and the second group user is in control of the second device 702b. Each device 702 can have installed thereon an encryption agent 704. Each encryption agent 704 installed on a particular device 702 can be registered with Q-Server 730 for the group user 740 in control of that particular device 702.

That is, for each group user 740 in the plurality of group users, the corresponding user-specific account may include a group user identifier (i.e. that user's user name). The user-specific account may also store other account data, as described above, such as aliases for example. Each group user 740 may also have corresponding passwords, verification code, private and public key pair, and distinct set of FED key seeds. The plurality of group users 740 may be interested in sharing among themselves certain encrypted files. For example, the encrypted files may be related to a project of common interest (e.g. a Shared Project). Embodiments of system 700 can provide this group sharing of encrypted files using aspects of the systems 100, 200 and 500 described above. As well, embodiments of system 700 may also introduce new concepts such as virtual folders (VF), super users (SU), and super user accounts (SUA). In some embodiments, slightly modified processes may be used to generate and sync a new set of FED key seeds specific to each VF for the Shared Project through communication between encryption agents of the group users 740 and Q-Server 730.

In general, a virtual folder may refer to the particular set of encrypted files associated with each plurality of key seeds generated by the user. Although the example of an index is described in detail herein, it will be apparent that a virtual folder can be implemented in many different ways. The virtual folder can be in effect an identifier for a particular group of encrypted files. The virtual folder for the files corresponding to each Shared Project (or each user group) the user is involved with can be associated with the corresponding key seeds and key status string information for that user group.

The concept of a virtual folder (VF) used in some embodiments of system 700 will be described using the administrative user 740a as an example. The administrative user 740a has registered a user-specific account with the server 730, e.g. using an embodiment of the procedure of CRKG described above. The administrative user 740a may have registered one or more encryption agents 704 on the devices 702 controlled by the administrative user 740a (i.e. one encryption agent 704 per device 702 controlled by the administrative user 740a). Up to this point, the administrative user 740a may have used his user-specific account and encryption agents 704 only to protect and manage his unshared files, whether stored on his own devices 702, on cloud server 750 or transmitted through cloud server 750, or elsewhere, such as other places of the Internet. The Q-Server 730 may have stored only one key status string S in the user-specific account of the administrative user 740a, and the set of FED key seeds used by the encryption agents 704 of the administrative user 740a and synced automatically using embodiments of system 200/500 through the key status string S may be used only for encrypting and decrypting the unshared files managed by the encryption agents 704 of the administrative user 740a.

To facilitate the subsequent description, the unshared files managed by the encryption agents 704 of the administrative user 740*a* may be said to form a virtual folder indexed by 0 (VFO) for the administrative user 740*a*. Accordingly, the set of FED key seeds used by the encryption agents 704 of the administrative user 740*a* for encrypting and decrypting the unshared files contained in VFO and the corresponding key status string S recorded by Q-Server 730 in the user-specific account of the administrative user 740*a* can be said to be assigned to VFO for the administrative user 740*a*. As time goes by, the administrative user 740*a* may want to engage or be engaged by other users, such as group users 740, to share encrypted files, to participate in Shared Projects and share encrypted files related to each of Shared Projects with the respective set of other users 740.

For each Shared Project of the administrative user 740*a*, the system 700 can now assign a VF with an index l to it, where l can be increased by 1 each time the administrative user 740*a* participates in a new Shared Project. Each VFl can be associated with the lth Shared Project of the administrative user 740*a*. Assigned to VFl can be a key status string $S^l$ specific to VFl and a set of new FED key seeds used by the encryption agents 704 of the administrative user 740*a* for encrypting and decrypting files contained in VFl for the lth Shared Project of the administrative user 740*a* and generated again through communication between the encryption agents 704 on devices 702 of the administrative user 740*a* and Q-Server 730 (as described above) in conjunction with the respective super user (SU) and super-user account (SUA). Note that although the administrative user 740*a* may use different encryption agents on different devices to work on different Shared Projects, Q-Server 730 can know at all times how many Shared Projects the administrative user 740*a* has participated in, and know how to assign the indices to VFs of the administrative user 740*a*.

Associated with each Shared Project of the administrative user 740*a* can be a group of users (i.e. a plurality of group users) who participate in the Shared Project. The group users can share among themselves encrypted files related to the Shared Project. Within the group of users, one of the users may be referred to as the administrative user for the Shared Project (for simplicity, we will use administrative user 740*a* as the administrative user in the following discussion). For example, where the first user includes a plurality of group users, the first user may be referred to as the super user.

In some embodiments, the administrative user may be the initiator of the Shared Project. The administrative user and the set of other users in the group together can be called a super user. Each group user can be identified based on its group user identifier or an index in a user database recorded on Q-Server 730. On Q-Server 730, a SU may be represented by a pair $(\omega, \Omega)$, where $\omega$ is the index of the administrative user for the Shared Project in the user database, and $\Omega$ is the set of indices of other users in the group in the user database. The system 700 may further assign each SU a unique group identifier (e.g. the first user identifier) such as an ID denoted by $I_l$.

For each SU, Q-Server 730 can create a super user account. The server 730 may then generate the first user account as the super user account for that plurality of group users. The first user account (the super user account/SUA) can include the first user identifier (the ID of that SU). The first user identifier may be represented in the form of a pair $(\omega, \Omega)$, In some embodiments, the SUA may generate and store a key status string to allow the group users to determine the same plurality of key indicators, and thereby generate the same plurality of key seeds and encryption keys. This can allow the group users to securely share encrypted files while also providing each group user with access to the decrypted files.

In a manner similar to embodiments of the procedure of CRKG described above, the SUA may also generate a plurality of server key values for the first account, the server key values can be stored on the server 730 for the SUA. For example, the server key values can be a sequence of independent random numbers $V_1, V_2, \ldots, V_i$ for the first user, which in turn can be used to help the encryption agents 704 of the group users 702 within that SU generate through communication with Q-Server 730 the plurality of key indicators and a set of new FED key seeds used by the encryption agents of users within that SU for encrypting and decrypting files related to the Shared Project corresponding to that SU.

Take the administrative user 740*a* as an example again. With the introduction of the concepts of Shared Project, VF, SU, and SUA, the information stored by each encryption agent 704 of the administrative user 740*a* in the non-volatile memory of the corresponding device 702 controlled by the administrative user 740*a* can be expanded to include additional sets of key indicators encrypted based on the verification code for the administrative user 740*a* and key seed information for each VF of the administrative user 740*a*, along with the list of VF indices l and corresponding super user IDs $I_l$ recorded by that encryption agent of the administrative user 740*a*. For example, an additional set of encrypted random numbers $E_{C,l}(X_{l,1}, X_{l,2}, \ldots X_{l,i})$ and encrypted FED key seeds $E_{C,l}(K_{l,1}, K_{l,2} \ldots, K_{l,i})$, l=1, 2, ..., one additional set per VF, may be stored. $I_l$ refers to the ID of the SU associated with the Shared Project corresponding to VFl of the administrative user 740*a*. The set of FED key seeds $\{K_{l,1}, K_{l,2}, \ldots, K_{l,i}\}$ assigned to VFl of the administrative user 740*a* can be used by the encryption agent(s) 704 of the administrative user 740*a* for encrypting and decrypting files related to the Shared Project corresponding to VFl. Likewise, the information saved by Q-Server 730 in its non-volatile memory for the administrative user 740*a* can also be expanded to include the list of all VF indices I of the administrative user 740*a*, corresponding super user IDs $I_l$, and additional key status strings $S^l = S_{l,0} S_{l,1} S_{l,2} \ldots S_{l,2i}$ in the form of $\{(l, I_l, S_l): l=1, 2, \ldots\}$, where $S^l$ is the key status string assigned to VFl of the administrative user 740*a*. In some embodiments, the key status string $S^l$ assigned to VFl of the administrative user 740*a* can be initiated by the administrative user for the Shared Project corresponding to VFl of the administrative user 740*a* through a running encryption agent of the administrative user.

In some embodiments, the administrative user 740*a*, the second group user 740*b*, and the remaining group users 740 may want to participate in a Shared Project and share encrypted files related to the Shared Project through the system 700. Without loss of generality, assume that the administrative user 740*a* is the initiator of and the administrator for the Shared Project. In this case, the SU corresponding to the Shared Project consists of the administrative user 740*a* and the plurality of other group users 740. For each group user 740, the VF corresponding to the Shared Project can be VFl. Actual encrypted files related to the Shared Project can be synced with the cloud and across encryption agents 704 of all users within the SU either through the cloud computing service or other means. However, in order for users within the SU to be able to see the corresponding plaintext files, the set of FED key seeds used by encryption agents 704 of all group users 740 in the first user for encrypting and decrypting files related to the Shared Project may have to be synced by the system 700 across encryption agents 704 of all the group users 740.

Figure 8:
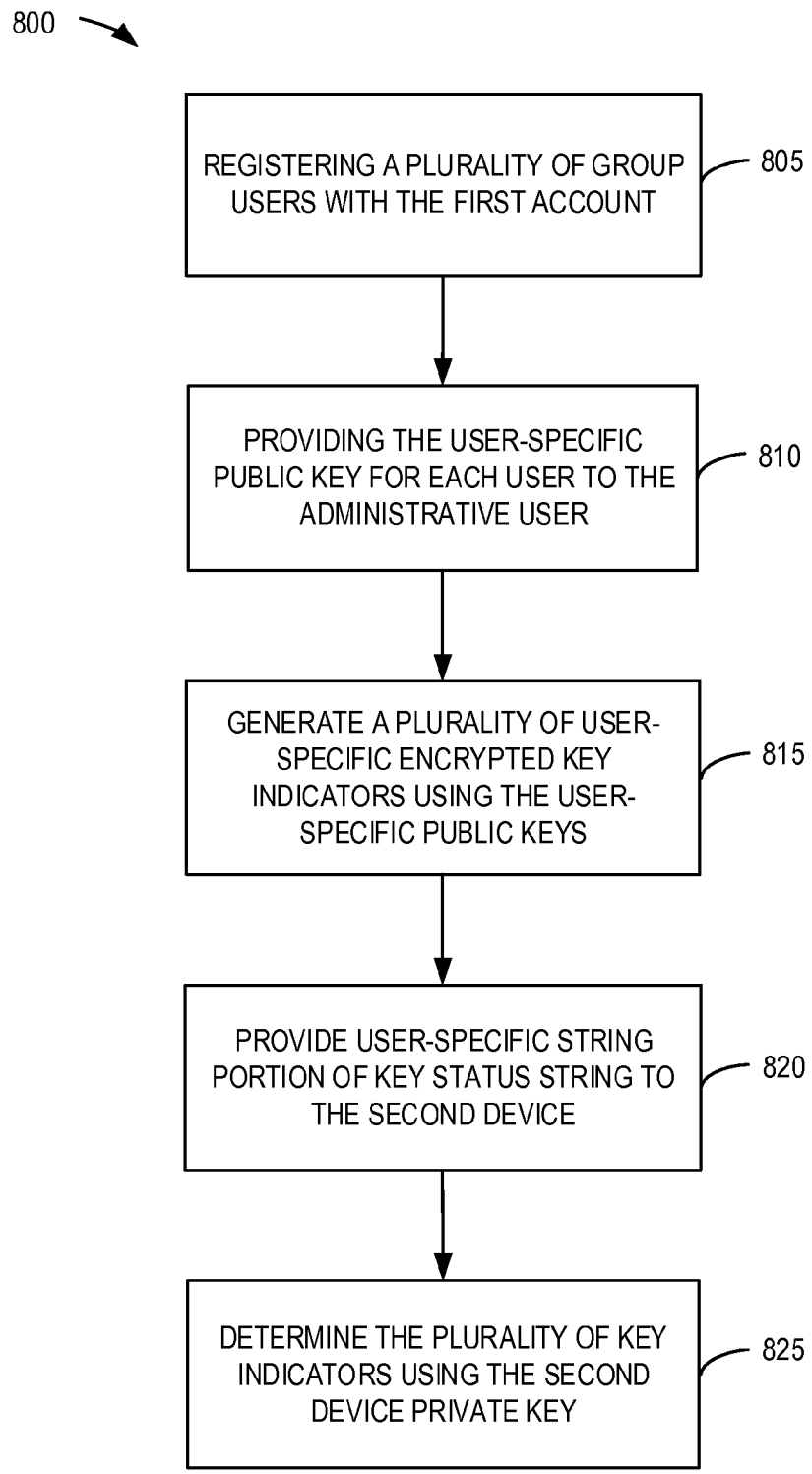
FIG. 8 shows a flowchart of an example embodiment of a method for providing encryption on a plurality of devices for the plurality group of users of FIG. 7.

With reference to FIG. 8, an example method 800 is described for generating and syncing key seeds when the first user includes a plurality of group users. The set of FED key seeds used for encrypting and decrypting files related to the Shared Project can be initially generated by the administrative user for the Shared Project, who is the administrative user 740a in the current case, in accordance with the examples described above.

At 805, a plurality of group users can be registered with the first account. The process of registering a user with the first account may be similar to that described above with reference to 660 in FIG. 6C. In some embodiments, the user identifier of each group user within the first user may be a valid email address of that user. The first administrative user 740a may use one of his encryption agents 704 to send an authorization request to the server 730. The group authorization request may include the user identifiers of all group users in the first user. The group authorization request may indicate to Q-Server 730 that a first account should be generated for the Shared Project.

The Q-Server 730 may set up the SUA and may also transmit, on behalf of the administrative user 740a, an invitation to joining the Shared Project to each of the group users 740. The invitation may be sent as an email to an email address associated with the user identifier of that group user 740. The email may also prompt each group user to set up a user-specific account with server 730 if that group user does not have one.

In some embodiments, the server 730 may generate the first account for the first user to include account authentication information corresponding to each group user. The account authentication information may include a user-specific server encrypted code for each group user 740. For each user, the user-specific server encrypted code can be generated by the encryption agent 704 on one of the devices controlled by that user. The encryption agent 704 may define a user-specific verification code and generate the user-specific server encrypted code based on the user-specific verification code. The encryption agent can transmit the user-specific server encrypted code where it can be stored in the account authentication information of the first account. In some cases, the account authentication information of the first account may simply indicate the user-specific account where the user-specific server encrypted code can be accessed to authenticate the user.

After the users within the SU respond, Q-Server 730 may further communicate, for each group user 740 who accepts the invitation, with an encryption agent 704 of that group user so that the VF corresponding to the Shared Project is set up on the encryption agent 704, of that group user and the index $I_t$ of $VFI_t$ and the ID of the SU associated with the Shared Project are recorded by Q-Server 730 in the user-specific account of user t and also by that encryption agent of user t as well.

At 810, each group user 740 may generate a user-specific public key. The user-specific public key for each user can be generated based on a user-specific private key stored in the non-volatile memory of a corresponding device 702 controlled by the group user 740. The user-specific public key for each user can then be provided to the administrative user 740a. The user-specific private key and user-specific public key can be generated as described above with reference to 470 in FIG. 4C.

For example, for each group user 740 who accepts the invitation, Q-Server 730 can send back to the encryption agent 704 of the administrative user 740a the value of $\gamma$ recorded in the user-specific account of that group user 740, where $\gamma$ is the public key of that group user 740. The server 730 may also send the index of that group user in the user database stored at Q-Server 730. The user-specific public key for a group user 740t may be denoted by $\hat{\beta}_{t,2}$ to facilitate our subsequent discussions.

At 815, the encryption agent 704 of the first device 702a can generate the plurality of encrypted key indicators for the first user by generating a plurality of user-specific encrypted key indicators. The encrypted key indicator may be generated based on key indicators generated in the same manner as described herein above. The encryption agent 704 of the first device 702a may generate, for each group user 740, a plurality of user-specific encrypted key indicators using the user-specific public key for that group user.

For example, the encryption agent 704 of the administrative user 740a can generate the key indicators as a plurality of independent random numbers j=1, 2, ..., J, where each random number is uniformly distributed over $\{1, 2, ..., N-1\}$. In some embodiments, the encryption agent 704 of the administrative user 740a can then send a pair of integers (1, J) to Q-Server 730 to request Q-Server 730's assistance to generate FED key seeds for the Shared Project. In such embodiments, upon receiving the pair of integers (1, J), Q-Server 730 can generate, based on the SUA, and its own secret key v, server key values such as independent random numbers $V_1, V_2, \ldots, V_J$, where each random number is uniformly distributed over $\{1, 2, \ldots, N-1\}$, and send $V_1, V_2, \ldots, V_J$ back to the encryption agent 704 of the administrative user 740a.

The encryption agent 704 of the administrative user 740a may then generates J independent FED key seeds $K_{I_1,j}=A(X_{I_1,j}, V_j)$, j=1, 2, ..., J, for the Shared Project based on $V_1, V_2, \ldots, V_J$ and $X_{I_1,1}, X_{I_1,2}, \ldots, X_{I_1,J}$.

The encryption agent 704 of the administrative user 740a can use the verification code C of the administrative user 740a along with the index $1_1$ of the VF corresponding to the Shared Project for the administrative user 740a to encrypt the plurality of key indicators $(X_{I_1,1}, X_{I_1,2}, \ldots, X_{I_1,J})$ into $E_{C,I_1}(X_{I_1,1}, K_{I_1,2}, \ldots, X_{I_1,J})$ and generate the key seed information by encrypting $(K_{I_1,1}, K_{I_1,2}, \ldots, K_{I_1,J})$ into $E_{C,I_1}(K_{I_1,1}, K_{I_1,2}, \ldots, K_{I_1,J})$, respectively. The encryption agent 704 can then save the plurality of key indicators $(E_{C,I_1}(X_{I_1,1}, X_{I_1,2}, \ldots, X_{I_1,J})$ and the key seed information $E_{C,I_1}(K_{I_1,1}, K_{I_1,2}, \ldots, K_{I_1,J})$ in the non-volatile memory of the first device 702a.

In some embodiments, for each group user t, 1≤t≤T, who accepts the invitation, the encryption agent 704 of the administrative user 740a can further generate a second plurality of independent random numbers $Y_{t,j}$, j=1, 2, ..., J, where each random number is uniformly distributed over $\{1, 2, \ldots, N-1\}$, determine the user-specific encrypted key indicators $\epsilon_{t,j}=\hat{\beta}_{t,2}^{Y_{t,j}} X_{I_1,j}$ and a plurality of user-specific key indicator public key $\mu_{t,j}=\alpha^{Y_{t,j}}$ j=1, 2, ..., J, and send $(\epsilon_{t,j}, \mu_{t,j})$, j=1, 2, ..., J, along with the index of user t and the ID (say I) of the SU associated with the Shared Project to Q-Server 730, where $\hat{\beta}_{t,2}$ is the public key of user t.

Upon receiving the encrypted key indicators $(\{(\epsilon_{t,j}, \mu_{t,j})\}_{j=1}^J$ in the specific implementation using ElGamal described just above together with the index of group user t and the ID I of the first user associated with the Shared Project, Q-Server 730 can uses the first user identifier ID I of the SU to determine the index $I_t$ of the VF corresponding to the Shared Project for group user t from the user-specific account information of group user t, and then update the user-specific account of user t by replacing $(l_t, I)$ with $(l_t, I, S^{l_t})$, where $S^{l_t} = S_{l_t,0} S_{l_t,1} S_{l_t,2} \ldots S_{l_t,2J} = 1\epsilon_{t,1}\mu_{t,1} \ldots \epsilon_{t,J}\mu_{t,J}$.

That is, the server key indicator portion of the key status string for the first account can include, for each group user 740, a user-specific string portion that is generated based on the plurality of user-specific encrypted key indicators for that group user 740. The user-specific string portion can also be stored in the user-specific account for that group user, along with the first user identifier.

At 820, the second device 702b can receive the user-specific string portion for the second user 740b. The encryption agent 704 on the second device 702b can use the received user-specific string portion to determine the plurality of key indicators for the first account, and thereby the key seeds and encryption keys for files of the Shared Project.

At 825, encryption agent 704 of the second device 702b can determine the plurality of key indicators from the plurality of user-specific encrypted key indicators in the user-specific portion of the server key indicator portion (received at 820) using the second device private key.

For example, assume that the encryption agent 704 of the second user 740b is at the state ROU. The set of FED key seeds generated by the administrative user for the first account can then to be automatically and safely synced to the encryption agent 704 of the second user 740b.

During the handshaking process between the encryption agent 704 of the second device 702b and Q-Server 730, which can be initiated by the encryption agent of second user 740b, Q-Server 730 can sends back to the encryption agent 704 of the second device 702b the list $\{(l, I_t, S^l): l=1, 2, \ldots\}$ of VF indices l, super user ID $I_t$, and additional key status strings $S^l = S_{l,0} S_{l,1} S_{l,2} \ldots S_{l,2J}$ contained in the user-specific account of the second user 702b.

By comparing the list $\{(l, I_t, S^l): l=1, 2, \ldots\}$ with its local information, the encryption agent 704 of the second device 702b can detect that the new virtual folder $VFl_t$ has been set up between Q-Server 730 and another encryption agent 704 of the second user 740b, if the encryption agent 704 of the second device 702b does not have any record of $VFl_t$. The encryption agent 704 of the second device 702b can also determine that the plurality of FED key seeds for the Shared Project corresponding to $VFl_t$ (i.e. for the first account associated with the first user) have been generated already by the administrative user 740a for that Shared Project.

The encryption agent 704 of the second device 702b can set up the virtual folder $VFl_t$ for itself and record the information $(l_t, I_{l_t})$ if it does not have any record on $VFl_t$. The encryption agent 704 of the second device 702b can also retrieve the corresponding key status string $S^{l_t} = S_{l_t,0} S_{l_t,1} S_{l_t,2} \ldots S_{l_t,2J}$ from the list $\{(l, I_t, S^l) l=1, 2, \ldots\}$. The encryption agent 704 of the second device 702b can then compute $$X_{l_t,j} = S_{l_t,2j-1} S_{l_t,2j}^{-K_{t,0}}, j=1,2,\ldots,J \quad (7)$$

where $K_{t,0}$ is the private key of user t.

The encryption agent 704 of the second device 702b can then send the pair of integers $(1, J)$ along with the first user identifier ID $I_{l_t}$ the first user associated with the Shared Project corresponding to $VFl_t$ to Q-Server 730 to request Q-Server 730's assistance to generate FED key seeds for that Shared Project to be used by the encryption agent 704 of the second device 702b.

Upon receiving $(1,J,l_{l_t})$, Q-Server 730 can generate, based on the SUA corresponding to the first user with first user identifier ID $I_{l_t}$, and its own secret key v, the server key values as independent random numbers $V_1, V_2, \ldots, V_J$, where each random number is uniformly distributed over $\{1, 2, \ldots, N-1\}$, and send $V_1, V_2, \ldots, V_J$ back to the encryption agent 704 of the second device 702b.

Based on the server key values $V_1, V_2, \ldots, V_J$ and the plurality of key indicators $X_{l_t,1}, X_{l_t,2}, \ldots, X_{l_t,J}$, the encryption agent 704 of the second device 702b can generate J independent FED key seeds $K_{l_t,j} = A(X_{l_t,j}, V_j)$, $j=1, 2, \ldots, J$, for that Shared Project to be used by the encryption agent 704 of the second device 702b.

The encryption agent 704 of the second device 702b may use the verification code C of the second user 740b along with the index $l_t$ of the virtual folder $VFl_t$ on the encryption agent 704 of the second device 702b to encrypt $(X_{l_t,1}, X_{l_t,2}, \ldots, X_{l_t,J})$ and $(K_{l_t,1}, K_{l_t,2}, \ldots, K_{l_t,J})$ into $E_{C,l_t}(X_{l_t,1}, X_{l_t,2}, \ldots, X_{l_t,J})$ and $E_{C,l_t}(K_{l_t,1}, K_{l_t,2}, \ldots, K_{l_t,J})$, respectively, and save $E_{C,l_t}(X_{l_t,1}, X_{l_t,2}, \ldots, X_{l_t,J})$ and $E_{C,l_t}(K_{l_t,1}, K_{l_t,2}, \ldots, K_{l_t,J})$ in the non-volatile memory of the second device 702b.

Based on the foregoing description, it follows that the random numbers $X_{l_t,j}$, $j=1, 2, \ldots, J$, computed in Eq. (7), can be the same as those generated by the administrative user 740a in the procedure of generation of FED key seeds for group sharing of encrypted files described above. As well, the above description may also imply:

$$K_{l_t,j} = K_{l_1,j}, j=1,2,\ldots,J. \quad (8)$$

Thus the set of FED key seeds $\{K_{l_1,1}, K_{l_1,2}, \ldots, K_{l_1,J}\}$ can be synced across all encryption agents 704 of all group users 740 within the first user SU.

Once the set of FED key seeds $\{K_{l_1,1}, K_{l_1,2}, \ldots, K_{l_1,J}\}$ is generated and synced, the virtual folder $VFl_t$ on any encryption agent 704 of the second user 740b can work in the same way as VFO. For example, any file created/modified inside or moved into $VFl_t$ can be automatically encrypted by the respective encryption agent 704 of group user t using a FED key randomly picked from the FED keystore corresponding to the set $\{K_{l_1,1}, K_{l_1,2}, \ldots, K_{l_1,J}\}$ unless the moved file is already in the format encrypted by another encryption agent 704 of a group user 740 within the first SU. The resulting encrypted data per file along with keying information (such as the index of the FED key used in the keystore) from which the FED key can be derived with the help of the key seeds, and the ID of the SU associated with the Shared Project corresponding to the virtual folder $VFl_t$ can then be saved as the encrypted file. Files encrypted with keys from the FED keystore corresponding to the set $\{K_{l_1,1}, K_{l_1,2}, \ldots, K_{l_1,J}\}$ can be decrypted by the respective encryption agent of group user t upon request from user t when they are placed under the virtual folder $VFl_t$. Since files managed by encryption agents of all group users 740 and stored in non-volatile memory can remain encrypted all the time, files encrypted with keys from the FED keystore corresponding to the set $\{K_{l_1,1}, K_{l_1,2}, \ldots, K_{l_1,J}\}$ for the Shared Project can be referred to as "dead" once they are out of all virtual folders $VFl_t$, $1 \leq t \leq T$.

Through the procedure of synchronization of FED key seeds for group sharing of encrypted files, the local information recorded by the encryption agents 704 of each group user 740 can also be synced with the account information of that group user 740 recorded at Q-Server 730. As well, in some embodiments there can be extended consistent properties which, in addition to the consistent properties Eq. (1) to Eq. (6), also include consistent properties involving VF indices, corresponding super user IDs, and sets of random numbers $X_{l,1}, X_{l,2}, \ldots, X_{l,J}$ and FED key seeds $K_{l,1}, K_{l,2}, \ldots, K_{l,J}$, $1 \leq l \leq l_t$, for all VFs of user t. Likewise, the procedures of AVCC, VCU, ANKG, and PNKG can be extended accordingly to cover group sharing of encrypted files.

Various other security features and components can be used in embodiments of system 700. As well, many of the examples described above for systems 100, 200, and 500 can also be used in embodiments of system 700.

In some embodiments, when an encrypted file is created for sharing within a SU through system 700, one of the group users 740 can specify the maximum number of times the encrypted file can be decrypted for viewing by any encryption agent 704 on any device 702 of the group user or other group users 740 within the SU. Once the file is decrypted that maximum number of times by that encryption agent 704, it may be refused by that encryption agent 704 for future decryption. In some embodiments, to prevent any alteration, that maximum number of times together with the original plaintext file can be encrypted and become a part of the encrypted data of the encrypted file.

In some embodiments, when an encrypted file is created for sharing within a SU through system 700, one of the group users 740 can specify an expiry period. The expiry period may define a period beyond which the encrypted file would be refused for decryption by the encryption agent 704 on any device 702 of the group user or other group users 740 within the SU. In some embodiments, to prevent any alteration, the expiry period itself together with the original plaintext file can be encrypted and become a part of the encrypted data of the encrypted file.

In some embodiments, the administrative user 740a for a Shared Project may be able to delete or remove one of the group users, say user t, from the plurality of group users (SU) associated with the Shared Project. The administrative user 740a may send a request to Q-Server 730 to update the key status string $S^{I_t}$ of user t corresponding to the Shared Project to a removal key status string. The removal key status string may indicate to the encryption agents on devices associated with the group user being removed that the group user is no longer one of the group users in the first user. For example, the key status string may be updated from $S^{I_t}=S_{I_t,0}S_{I_t,1}S_{I_t,2} \ldots S_{I_t,2J}$ to $S^{I_t}=S_{I_t,0}00 \ldots 0$, i.e., $S_{I_t,0}$, followed by 2J zeros. The removal of the user may be handled automatically by the procedure of synchronization of FED key seeds for group sharing of encrypted files, as described above. This process can be applied to change the set of FED key seeds (and random numbers) corresponding to the Shared Project and saved locally by all encryption agents of the user t to a different set so that files encrypted using FED keys for the Shared Project can no longer be decrypted by any encryption agent of user t.

In some embodiments, the administrative user 740a for a Shared Project may allow a deleted user to rejoin the SU associated with the Shared Project. To accomplish this, the administrative user can send a request to Q-Server 730 to update the key status string of the deleted user corresponding to the Shared project. For example, the request may indicate to the server 730 to update the key status string $S^{I_t}$ of user t corresponding to the Shared Project from $S^{I_t}=S_{I_t,0}00 \ldots 0$ back to $S^{I_t}=S_{I_t,0}S_{I_t,1}S_{I_t,2} \ldots S_{I_t,2J}$. The rest can be handled automatically by the procedure of synchronization of FED key seeds for group sharing of encrypted files once again.

In the example embodiments described above, the ElGamal public system has been used an example to describe embodiments of the Systems 200, 500, And 700. Other public key systems (see for example, W. Diffie and M. Hellman, "New directions in cryptography," IEEE Transactions on Information Theory, vol. 22, no. 6, pp. 644-654, November 1976.) such as RSA and ECC can be used as well. In addition, the systems described herein may also provide a desirable solution to digital rights management. For example, consider a Shared Project between a content service provider and an end user, where the content service provider acts as the administrative user for the Shared Project. With embodiments of the systems described herein, any content created/owned by the content service provider and purchased by the end user may be viewable only inside the encryption agents of the end user on the devices of the end user.

A number of example embodiments have been described herein. However, it will be understood by persons skilled in the art that other variations and modifications may be made without departing from the scope of the embodiments as defined in the claims appended hereto.

The invention claimed is:

1. A method of providing encryption on a plurality of devices configured for electronic communication with a server, the plurality of devices including at least a first device and a second device, the method comprising:

generating a first account for a first user in control of the plurality of devices, wherein the first account stores account data on a non-volatile server memory, the account data comprising a first user identifier and account authentication information;

for each device in the plurality of devices, installing an encryption agent on that device;

operating a processor of the first device under control of the encryption agent to:
randomly generate a plurality of key indicators;
use a second device encryption key to encrypt the plurality of key indicators, each encrypted key indicator corresponding to one of the key indicators in the plurality of key indicators;
transmit the plurality of encrypted key indicators to the server to impede exposure of the key indicators to the server;
generate a plurality of key seeds based on the plurality of key indicators, wherein for each key seed, the encryption agent is operable to control the processor of the first device to generate a plurality of independent encryption keys; and storing key seed information based on the plurality of key seeds in a non-volatile first device memory;

generating a key status string for the first account, the key status string including a server key indicator portion generated based on the plurality of encrypted key indicators;

storing the key status string on the non-volatile server memory;

receiving putative authentication information at the second device;

operating a processor of the second device, under control of the encryption agent installed on the second device, to generate putative server authentication information based on the putative authentication information and transmit the putative server authentication information to the server; and operating the processor of the server to compare the putative server authentication information with the account authentication information, and to provide the second device with access to the key status string if and only if the putative server authentication information corresponds to the account authentication information;

operating the processor of the second device under control of the encryption agent to:

determine the plurality of key indicators from the plurality of encrypted key indicators in the key status string using the second device decryption key;

generate the plurality of key seeds based on the plurality of key indicators, wherein for each key seed, the encryption agent is operable to control the processor of the second device to generate the same plurality of independent encryption keys as the first device, without any of the key seeds, key seed information and encryption keys being provided to the second device; and store the key seed information based on the plurality of key seeds in a non-volatile second device memory;

providing a file to be encrypted and stored to the first device;

operating the processor of the first device under the control of the encryption agent to derive one of the encryption keys from the key seed information using keying information;

encrypting and storing the file as an encrypted file using the derived encryption key; and, storing the keying information with the encrypted file.

2. The method as defined in claim 1, wherein:

generating the plurality of key seeds on the first device further comprises:

operating the server processor to randomly generate server key values for the first account, to store the server key values in the non-volatile server memory, and to transmit the server key values to the first device; and operating the processor of the first device under the control of the encryption agent to generate the plurality of key seeds based on the server key values and the plurality of key indicators;

wherein:

the processor of the server is operated to provide the second device with access to the server key values if and only if the putative server authentication information corresponds to the account authentication information; and the processor of the second device is operated, under the control of the encryption agent, to generate the plurality of key seeds based on the plurality of key indicators and the server key values.

3. The method as defined in claim 1, further comprising:

operating the processor of the first device, under the control of the encryption agent, to encrypt the plurality of key indicators by:

defining a first verification code;

defining the second device encryption key based on the first verification code; and encrypting the plurality of key indicators using the second device encryption key;

wherein the second device decryption key is generated by operating the processor of the second device under the control of the encryption agent to define a second verification code and generate the second device decryption key based on the second verification code; and the second verification code is the first verification code.

4. The method as defined in claim 3, further comprising:

operating a processor of the first device under the control of the encryption agent to:

generate an encrypted server code based on the first verification code; and transmit the encrypted server code to the server; and storing the encrypted server code in the authentication information of the first account;

wherein the putative authentication information received at the second device is a putative verification code;

the putative server authentication information is a putative encrypted server code generated based on the putative verification code; and the putative server authentication information corresponds to the account authentication information if and only if the putative encrypted server code matches the encrypted server code.

5. The method as defined in claim 3, wherein the key seed information is encrypted using the first verification code prior to storage.

6. The method as defined in claim 1, further comprising:

receiving the encrypted file and the keying information at the second device; and operating the processor of the second device under the control of the encryption agent to:

derive the encryption key from the key seed information stored in the non-volatile second device memory using the received keying information; and decrypt the encrypted file using the derived encryption key.

7. The method as defined in claim 1, wherein the keying information is randomly selected when the encryption agent receives an indication of the file to be encrypted.

8. The method as defined in claim 1, further comprising:

operating the processor of the first device under the control of the encryption agent to:

define a first verification code;

generate an encrypted local code based on the first verification code; and store the encrypted local code in the non-volatile first device memory;

subsequently receiving a request to access files and a local putative verification code at the first device, and operating the processor of the first device under the control of the encryption agent to:

generate a putative encrypted local code;

compare the putative encrypted local code to the encrypted local code to determine if the local putative verification code is the first verification code; and provide access to files encrypted by the encryption agent if and only if the putative encrypted local code matches the encrypted local code.

9. The method as defined in claim 3, wherein storing the key seed information comprises:

encrypting the plurality of key seeds using the first verification code; and storing the encrypted plurality of key seeds in the non-volatile first device memory.

10. The method as defined in claim 1, wherein the first user comprises a plurality of group users including at least an administrative group user and a second group user, each of the group users being in control of at least one of the devices in the plurality of devices, wherein the administrative group user is in control of the first device and the second group user is in control of the second device;

for each group user in the plurality of group users, the account data further comprises a user-specific public key, wherein the user-specific public key for each user is generated based on a user-specific private key stored in a non-volatile memory of a corresponding device in the plurality of devices; and the processor of the first device is operated under the control of the encryption agent to encrypt the plurality of key indicators by, for each group user in the plurality of group users:
generating a plurality of user-specific encrypted key indicators using the user-specific public key for that user;

the server key indicator portion of the key status string for the first account further comprises, for each group user in the plurality of group users, a user-specific string portion that is generated based on the plurality of user-specific encrypted key indicators for that group user; and the processor of the second device is operated under the control of the encryption agent to:
determine the plurality of key indicators from the plurality of user-specific encrypted key indicators in the user-specific portion of the server key indicator portion corresponding to the second group user using the second device private key.

11. The method as defined in claim 10, wherein the account authentication information for the first account comprises, for each group user in the plurality of group users, a user-specific server encrypted code, the user-specific server encrypted code for each user being generated by:
operating a processor of a device in the plurality of devices corresponding to that user, under the control of the encryption agent to:
define a user-specific verification code;
generate the user-specific server encrypted code based on the user-specific verification code; and
transmit the user-specific server encrypted code to the server; and
storing the user-specific server encrypted code in the account authentication information of the first account.

12. The method as defined in claim 1, wherein the first user comprises a plurality of users including an administrative user in control of the first device and a second user in control of the second device, the method further comprising transmitting a second user authorization to the second user by:
transmitting a second user identifier of the second user from the first device to the server;
operating the processor of the server to generate second user registration information based on the second user identifier and a second user password, store the second user registration information on the non-volatile server memory, and transmit a second user server authorization to the second user;
receiving, by the second user, the second user server authorization and subsequently installing an encryption agent on the second device;
receiving a putative second user password at the second device;
operating the processor of the second device under the control of the encryption agent to generate putative second user registration information based on the second user identifier and putative second user password and transmit the putative second user registration information to the server;
operating the processor of the server to:
compare the putative second user registration information with the stored second user registration information;
authenticate the second device for the first account only if the putative second user registration information corresponds to the stored second user registration information;

operating the processor of the authenticated second device under the control of the encryption agent to:
generate the second device decryption key;
generate the second device encryption key based on the second device decryption key; and
transmit the second device encryption key to the server;
receiving the second device encryption key at the first device; and
operating the processor of the first device under the control of the encryption agent to encrypt the plurality of key indicators using the received second device encryption key.

13. The method as defined in claim 12, wherein the second device decryption key is a user-specific private key of the second user, the user-specific private key stored in the non-volatile memory of the second device, and the second device encryption key is a corresponding user-specific public key generated based on the user-specific private key.

14. The method as defined in claim 1, wherein the first user comprises a plurality of users including an administrative user in control of the first device and a second user in control of the second device, the method further comprising:
providing a file to be encrypted to the first device;
operating the processor of the first device under the control of the encryption agent to:
derive one of the encryption keys from the key seed information using keying information; and
encrypt the file as an encrypted file using the derived encryption key;
transmitting the encrypted file, the keying information, and a second user authorization to the second user;
receiving, by the second user, the second user authorization and subsequently installing an encryption agent on the second device;
receiving the encrypted file and the keying information at the second device; and
operating the processor of the second device under the control of the encryption agent to:
derive the encryption key from the key seed information stored in the non-volatile second device memory using the received keying information; and
decrypt the encrypted file using the derived encryption key.

15. The method as defined in claim 1, wherein:
the first user is a single user in control of the plurality of devices; and
the first user identifier comprises a plurality of user alias identifiers, each user alias identifier sharing the account authentication information.

16. The method as defined in claim 1, wherein:
the first user comprises a plurality of users, each user being in control of at least one of the devices in the plurality of devices and having a user-specific identifier; and
for at least one of the users in the plurality of users, the user-specific identifier for that user comprises a plurality of user-specific alias identifiers, each user-specific alias identifier sharing the account authentication information for that user.

17. A computer program product for use on a plurality of devices to provide encryption for the plurality of devices, the plurality of devices being configured for electronic communication with a server and including at least a first device having a first device processor and a non-volatile first device memory and a second device, the server having stored thereon a first account for a first user in control of the plurality of devices, the first account storing account data comprising a first user identifier and account authentication information on a non-volatile server memory, the computer program product comprising:

a non-transitory recording medium; and
instructions recorded on the recording medium, the instructions for configuring the first device processor to:
randomly generate a plurality of key indicators;
use a second device encryption key to encrypt the plurality of key indicators, each encrypted key indicator corresponding to one of the key indicators in the plurality of key indicators, the second device encryption key corresponding to a second device decryption key unknown to the server;
transmit the plurality of encrypted key indicators to the server to impede exposure of the key indicators to the server, the server being operable to generate a key status string for the first account including a server key indicator portion based on the plurality of encrypted key indicators and to provide the second device with access to the key status string if and only if putative server authentication information received from the second device corresponds to the account authentication information;
generate a plurality of key seeds based on the plurality of key indicators, wherein for each key seed, the first device processor is operable to generate a plurality of independent encryption keys;
store key seed information based on the plurality of key seeds in the non-volatile first device memory;
receive a file to be encrypted;
derive one of the encryption keys from the key seed information using keying information;
encrypt and store the file as an encrypted file in the non-volatile first device memory using the derived encryption key;
store the keying information with the encrypted file in the non-volatile first device memory;
wherein:
the plurality of key indicators is determinable at the second device from the plurality of encrypted key indicators in the key status string using the second device decryption key such that the same plurality of key seeds can be generated based on the plurality of key indicators, and for each key seed, a processor of the second device can generate the same plurality of independent encryption keys as the first device, without any of the key seeds, key seed information and encryption keys being provided to the second device.

18. The computer program product as defined in claim 17, further comprising instructions for configuring the first device processor to generate the plurality of key seeds by:
receiving a plurality of randomly generated server key values from the server, the server key values being stored in the first account; and
generating the plurality of key seeds based on the server key values and the plurality of key indicators.

19. The computer program product as defined in claim 17, further comprising instructions for configuring the first device processor to:

define a first verification code;
define the second device encryption key based on the first verification code; and
encrypt the plurality of key indicators using the second device encryption key;
wherein the second device decryption key is also generated based on the first verification code.

20. The computer program product as defined in claim 19, further comprising instructions for configuring the first device processor to:
generate an encrypted server code based on the first verification code; and
transmit the encrypted server code to the server for storage in the account authentication information of the first account;
wherein the server is configured to provide access to the key status string if and only if the putative server authentication information received from the second device corresponds to the encrypted server code stored in the account authentication information of the first account.

21. The computer program product as defined in claim 19, further comprising instructions for configuring the first device processor to:
encrypt the key seed information using the first verification code prior to storage.

22. The computer program product as defined in claim 17, further comprising instructions for configuring the first device processor to:
receive an encrypted file and keying information;
derive the encryption key from the key seed information stored in the non-volatile first device memory using the received keying information; and
decrypt the encrypted file using the derived encryption key.

23. The computer program product as defined in claim 17, further comprising instructions for configuring the first device processor to randomly select the keying information after receiving an indication of the file to be encrypted.

24. The computer program product as defined in claim 17, further comprising instructions for configuring the first device processor to:
define a first verification code;
generate an encrypted local code based on the first verification code;
store the encrypted local code in the non-volatile first device memory;
subsequently receive a request to access files and a local putative verification code;
generate a putative encrypted local code;
compare the putative encrypted local code to the encrypted local code to determine if the local putative verification code is the first verification code; and
provide access to files encrypted by the encryption agent if and only if the putative encrypted local code matches the encrypted local code.

25. The computer program product as defined in claim 19, further comprising instructions for configuring the first device processor to store the key seed information by:
encrypting the plurality of key seeds using the first verification code; and
storing the encrypted plurality of key seeds in the non-volatile first device memory.

26. The computer program product as defined in claim 17, wherein:
the first user comprises a plurality of group users including at least an administrative group user and a second group user, each of the group users being in control of at least one of the devices in the plurality of devices, wherein the administrative group user is in control of the first device and the second group user is in control of the second device;

for each group user in the plurality of group users, the account data further comprises a user-specific public key, wherein the user-specific public key for each user is generated based on a user-specific private key stored in a non-volatile memory of a corresponding device in the plurality of devices; and the computer program product further comprises instructions for configuring the first device processor to:
encrypt the plurality of key indicators by, for each group user in the plurality of group users, generating a plurality of user-specific encrypted key indicators using the user-specific public key for that user; and
transmit the plurality of user-specific encrypted key indicators to the server, the server being operable to generate the server key indicator portion of the key status string by generating, for each group user in the plurality of group users, a user-specific string portion based on the plurality of user-specific encrypted key indicators for that group user; and the plurality of key indicators is determinable at the second device from the plurality of user-specific encrypted key indicators in the user-specific portion of the server key indicator portion corresponding to the second group user using the second device private key.

27. The computer program product as defined in claim 26, wherein:

the account authentication information for the first account comprises, for each group user in the plurality of group users, a user-specific server encrypted code;

the computer program product further comprises instructions for configuring a processor of a device in the plurality of devices corresponding to that group user to:
define a user-specific verification code;
generate the user-specific server encrypted code based on the user-specific verification code; and
transmit the user-specific server encrypted code to the server for storage in the account authentication information of the first account.

28. The computer program product as defined in claim 17, wherein:

the first user comprises a plurality of users including an administrative user in control of the first device and a second user in control of the second device; and the computer program product further comprises instructions for configuring the first device processor to transmit a second user authorization to the second user by transmitting a second user identifier of the second user from the first device to the server, the server being operable to generate second user registration information based on the second user identifier and a second user password, store the second user registration information on the non-volatile server memory, and transmit a second user server authorization to the second user; and the computer program product further comprises instructions for configuring a processor of the second device, when installed thereon, to:
receive a putative second user password;
generate putative second user registration information based on the second user identifier and the putative second user password;
transmit the putative second user registration information to the server, the server being operable to compare the putative second user registration information with the stored second user registration information, and authenticate the second device for the first account only if the putative second user registration information corresponds to the stored second user registration information; and once the second device is authenticated,
generate the second device decryption key;
generate the second device encryption key based on the second device decryption key; and
transmit the second device encryption key to the server; and the computer program product further comprises instructions for configuring the first device processor to receive the second device encryption key and to encrypt the plurality of key indicators using the received second device encryption key.

29. The computer program product as defined in claim 28, wherein the second device decryption key is a user-specific private key of the second user and the second device encryption key is a corresponding public key of the second user.

30. The computer program product as defined in claim 17, wherein:

the first user comprises a plurality of users including an administrative user in control of the first device and a second user in control of the second device; and the computer program product further comprises instructions for configuring the first device processor to:
receive a file to be encrypted;
derive one of the encryption keys from the key seed information using keying information;
encrypt the file as an encrypted file using the derived encryption key;
transmit the encrypted file, the keying information, and a second user authorization to the second user; and the computer program product further comprises instructions for configuring a processor of the second device, when installed thereon, to:
register the second device with the server based on the second user authorization;
determine the plurality of key indicators based on the plurality of encrypted key indicators in the key status string using the second device decryption key;
generate the plurality of key seeds based on the plurality of key indicators;
store key seed information based on the key seeds in a non-volatile second device memory;
receive the encrypted file and the keying information;
derive the encryption key from the key seed information stored in the non-volatile second device memory using the received keying information; and
decrypt the encrypted file using the derived encryption key.

31. The computer program product as defined in claim 17, wherein the first user is a single user in control of the plurality of devices, and the first user identifier comprises a plurality of user alias identifiers, each user alias identifier sharing the account authentication information.

32. The computer program product as defined in claim 17, wherein the first user comprises a plurality of users, each user being in control of at least one of the devices in the plurality of devices and having a user-specific identifier; and for at least one of the users in the plurality of users, the user-specific identifier for that user comprises a plurality of user-specific alias identifiers, each user-specific alias identifier sharing the account authentication information of that user.

33. A device for providing encryption for a plurality of devices including the device, each device configured for electronic communication with a server, the server having stored thereon a first account for a first user in control of the plurality of devices, the first account storing account data comprising a first user identifier and account authentication information on a non-volatile server memory, the device comprising:

a processor; and a non-volatile device memory having stored thereon instructions for configuring the processor to:

randomly generate a plurality of key indicators;

use a second device encryption key to encrypt the plurality of key indicators, each encrypted key indicator corresponding to one of the key indicators in the plurality of key indicators, the second device encryption key corresponding to a second device decryption key unknown to the server;

transmit the plurality of encrypted key indicators to the server to impede exposure of the key indicators to the server, the server being operable to generate a key status string for the first account including a server key indicator portion based on the plurality of encrypted key indicators and to provide a second device in the plurality of devices with access to the key status string if and only if putative server authentication information received from that device corresponds to the account authentication information;

generate a plurality of key seeds based on the plurality of key indicators, wherein for each key seed, the processor is operable to generate a plurality of independent encryption keys;

store key seed information based on the plurality of key seeds in the non-volatile device memory;

receive a file to be encrypted;

derive one of the encryption keys from the key seed information using keying information;

encrypt and store the file as an encrypted file in the non-volatile device memory using the derived encryption key;

store the keying information with the encrypted file in the non-volatile device memory;

wherein the plurality of key indicators is determinable at the second device from the plurality of encrypted key indicators in the key status string using the second device decryption key such that the same plurality of key seeds can be generated based on the plurality of key indicators, and for each key seed, a processor of the second device can generate the same plurality of independent encryption keys as the device, without any of the key seeds, key seed information and encryption keys being provided to the second device.

* * * * *